(12) United States Patent
Breed

(10) Patent No.: US 6,715,790 B2
(45) Date of Patent: Apr. 6, 2004

(54) SIDE CURTAIN AIR BAG

(75) Inventor: David S. Breed, Boonton Township, NJ (US)

(73) Assignee: Automotive Technologies International, Inc., Denville, NJ (US)

( * ) Notice: Subject to any disclaimer, the term of this patent is extended or adjusted under 35 U.S.C. 154(b) by 41 days.

(21) Appl. No.: 09/888,575

(22) Filed: Jun. 25, 2001

(65) Prior Publication Data

US 2001/0035634 A1 Nov. 1, 2001

Related U.S. Application Data

(63) Continuation-in-part of application No. 09/535,198, filed on Mar. 27, 2000, now Pat. No. 6,250,668, which is a continuation-in-part of application No. 09/071,801, filed on May 4, 1998, now Pat. No. 6,149,194, which is a continuation-in-part of application No. 08/795,418, filed on Feb. 4, 1997, now Pat. No. 5,863,068, which is a continuation-in-part of application No. 08/626,493, filed on Apr. 2, 1996, now Pat. No. 5,746,446, which is a continuation-in-part of application No. 08/571,247, filed on Dec. 12, 1995, now Pat. No. 5,772,238, and a continuation-in-part of application No. 08/539,676, filed on Oct. 5, 1995, now Pat. No. 5,653,464, and a continuation-in-part of application No. 08/247,763, filed on May 23, 1994, now Pat. No. 5,505,485.

(51) Int. Cl.$^7$ .............................................. B60R 21/22
(52) U.S. Cl. ................................................. 280/730.2
(58) Field of Search ........................... 280/730.2, 730.1, 280/728.1, 749

(56) References Cited

U.S. PATENT DOCUMENTS

| | | | |
|---|---|---|---|
| 2,052,869 A | 9/1936 | Coanda | 406/181 |
| 2,834,606 A | 5/1958 | Bertrand | 280/730.1 |
| 3,158,314 A | 11/1964 | Young et al. | 417/191 |
| 3,204,862 A | 9/1965 | Hadeler | 230/95 |
| 3,370,784 A | 2/1968 | Day | 230/95 |
| 3,451,693 A | 6/1969 | Carey | 280/739 |
| 3,473,824 A | 10/1969 | Carey et al. | 280/150 |
| 3,511,519 A | 5/1970 | Martin | 280/150 |
| 3,527,475 A | 9/1970 | Carey | 280/739 |
| 3,573,885 A | 4/1971 | Brawn | 280/150 |
| 3,614,127 A | 10/1971 | Glance | 280/729 |
| 3,632,133 A | 1/1972 | Hass | 280/150 |
| 3,638,755 A | 2/1972 | Sack | 280/729 |
| 3,675,942 A | 7/1972 | Huber | 280/738 |
| 3,702,706 A | 11/1972 | Sobkow | 280/730 R |
| 3,731,949 A * | 5/1973 | Radke | 280/743.1 |
| 3,733,091 A | 5/1973 | Fleck et al. | 280/729 |
| 3,747,952 A * | 7/1973 | Graebe | 137/67 |
| 3,752,501 A | 8/1973 | Daniel et al. | 280/729 |

(List continued on next page.)

FOREIGN PATENT DOCUMENTS

JP   05038993 A   *  2/1993   ........... B60R/21/16

*Primary Examiner*—Eric Culbreth
*Assistant Examiner*—Faye M. Fleming
(74) *Attorney, Agent, or Firm*—Brian Roffe

(57) ABSTRACT

Air bag for a vehicle formed from sections of material joined to one another such that interconnected compartments receivable of an inflating medium are formed. The sections of material may be fabric or discrete sheets of film with optional tear propagation arresting devices. Two or more of the sections of material may be at least partially in opposed relationship to one another and then joined to one another at locations other than at a periphery of any of the sections to thereby form the interconnected compartments between the sections of material. The sections of material may also be joined to one another along parallel lines such that the interconnected compartments formed between the sections of material are elongate, i.e., substantially straight, and when inflated will be tubular. The air bag may be sized to deploy along an entire side of a vehicle and also along a portion of the dashboard.

51 Claims, 32 Drawing Sheets

U.S. PATENT DOCUMENTS

| | | | |
|---|---|---|---|
| 3,762,741 A | 10/1973 | Fleck et al. ................. 280/729 |
| 3,774,936 A | 11/1973 | Barnett et al. ........... 280/730.1 |
| 3,791,667 A | * 2/1974 | Haviland ................ 280/730.2 |
| 3,791,669 A | 2/1974 | Hamilton .................... 280/150 |
| 3,795,412 A | 3/1974 | John ....................... 280/730.1 |
| 3,801,127 A | 4/1974 | Katter et al. ................ 280/150 |
| 3,820,814 A | 6/1974 | Allgaier et al. ........ 280/150 AB |
| 3,888,504 A | 6/1975 | Bonn et al. ............ 280/150 AB |
| 3,897,961 A | 8/1975 | Leising et al. ........... 280/730.1 |
| 3,909,037 A | 9/1975 | Stewart ....................... 280/150 |
| 3,910,595 A | 10/1975 | Katter et al. ................ 280/150 |
| 3,938,826 A | 2/1976 | Giorgini et al. ............ 280/150 |
| 4,043,572 A | 8/1977 | Hattori et al. .............. 280/736 |
| 4,227,717 A | * 10/1980 | Bouvier ................... 280/730.2 |
| 4,262,931 A | 4/1981 | Strasser et al. ............. 280/729 |
| 4,360,223 A | 11/1982 | Kirchoff ...................... 280/729 |
| 4,394,033 A | 7/1983 | Goetz et al. ................ 280/736 |
| 4,536,008 A | 8/1985 | Brown, Jr. ............... 280/730.1 |
| 4,657,516 A | 4/1987 | Tassy ......................... 280/729 |
| 4,805,930 A | 2/1989 | Takada ....................... 280/739 |
| 4,833,996 A | 5/1989 | Hayashi et al. ............. 102/530 |
| 4,877,264 A | 10/1989 | Cuevas ....................... 280/731 |
| 4,909,549 A | 3/1990 | Pool et al. .................. 280/738 |
| 4,928,991 A | 5/1990 | Thorn ......................... 280/738 |
| 4,963,412 A | 10/1990 | Kokeguchi .............. 280/743 R |
| 4,964,652 A | 10/1990 | Karlow ....................... 280/739 |
| 4,966,388 A | 10/1990 | Warner et al. .............. 280/730 |
| 5,004,586 A | 4/1991 | Hayashi et al. ............. 422/164 |
| 5,060,973 A | 10/1991 | Giovanetti .................. 280/736 |
| 5,085,465 A | 2/1992 | Hieahim ..................... 280/738 |
| 5,093,163 A | * 3/1992 | Krummheuer et al. ...... 139/389 |
| 5,100,172 A | 3/1992 | VanVoorhies et al. ...... 280/738 |
| 5,129,674 A | 7/1992 | Levosinski .................. 280/738 |
| 5,188,558 A | 2/1993 | Barton et al. ............... 446/224 |
| 5,193,847 A | 3/1993 | Nakayama .................. 280/738 |
| 5,207,450 A | 5/1993 | Pack, Jr. et al. ............ 280/738 |
| 5,222,761 A | 6/1993 | Kaji et al. ................... 280/732 |
| 5,248,275 A | 9/1993 | McGrath et al. ............ 446/224 |
| 5,273,309 A | 12/1993 | Lau et al. ................ 280/730 A |
| 5,279,873 A | 1/1994 | Oike ......................... 428/35.4 |
| 5,280,953 A | * 1/1994 | Wolanin et al. ............. 280/736 |
| 5,286,054 A | 2/1994 | Cuevas ....................... 280/738 |
| 5,295,892 A | 3/1994 | Felton ......................... 446/224 |
| 5,310,215 A | 5/1994 | Wallner ...................... 280/739 |
| 5,322,322 A | 6/1994 | Bark et al. .................. 280/730 |
| 5,322,326 A | 6/1994 | Ohm ........................... 280/737 |
| 5,332,259 A | 7/1994 | Conlee et al. .............. 280/738 |
| 5,333,899 A | 8/1994 | Witte ...................... 280/730 A |
| 5,390,950 A | 2/1995 | Barnes et al. ........... 280/728 B |
| 5,406,889 A | 4/1995 | Letendre et al. ............ 102/201 |
| 5,423,571 A | 6/1995 | Hawthorn ................... 280/738 |
| 5,435,594 A | 7/1995 | Gille ......................... 280/728.2 |
| 5,439,247 A | * 8/1995 | Kolb ........................... 280/729 |
| 5,464,246 A | 11/1995 | Castro et al. ............ 280/730.2 |
| 5,470,103 A | 11/1995 | Vaillancourt et al. .... 280/730.1 |
| 5,480,181 A | 1/1996 | Bark et al. ................ 280/730.2 |
| 5,505,485 A | 4/1996 | Breed ......................... 280/729 |
| 5,533,753 A | 7/1996 | Abraham .................... 280/739 |
| 5,540,459 A | 7/1996 | Daniel ..................... 280/730.2 |
| 5,588,672 A | 12/1996 | Karlow et al. ........... 280/730.2 |
| 5,599,042 A | 2/1997 | Shyr et al. ............... 280/730.1 |
| 5,603,526 A | 2/1997 | Buchanan .................. 280/739 |
| 5,605,346 A | 2/1997 | Cheung et al. .......... 280/728.2 |
| 5,653,464 A | 8/1997 | Breed et al. ............. 280/743.1 |
| 5,660,414 A | 8/1997 | Karlow et al. .............. 280/749 |
| 5,704,639 A | 1/1998 | Cundill et al. .............. 280/739 |
| 5,725,244 A | 3/1998 | Cundill ...................... 280/739 |
| 5,746,446 A | 5/1998 | Breed et al. ............. 280/743.1 |
| 5,752,713 A | 5/1998 | Matsuura et al. ........ 280/730.2 |
| 5,788,270 A | 8/1998 | Holand et al. .............. 280/729 |
| 5,811,506 A | 9/1998 | Slagel ......................... 528/64 |
| 5,839,755 A | 11/1998 | Turnbull ..................... 280/739 |
| 5,865,462 A | 2/1999 | Robins et al. ........... 280/730.2 |
| 5,884,937 A | 3/1999 | Yamada ................... 280/730.2 |
| 5,899,489 A | 5/1999 | Jost .......................... 280/730.2 |
| 5,924,723 A | 7/1999 | Brantman et al. ....... 280/730.2 |
| 5,957,485 A | 9/1999 | Hirai ....................... 280/743.1 |
| 5,957,487 A | 9/1999 | Stutz ....................... 280/730.2 |
| 6,000,715 A | 12/1999 | Tschaeschke ............ 280/730.2 |
| 6,010,149 A | 1/2000 | Riedel et al. ............ 280/730.2 |
| 6,070,902 A | 6/2000 | Kowalski et al. ........ 280/730.2 |
| 6,073,960 A | 6/2000 | Viano et al. ............. 280/730.1 |
| 6,073,961 A | 6/2000 | Bailey et al. ............ 280/730.2 |
| 6,079,732 A | 6/2000 | Nakajima et al. ........ 280/728.2 |
| 6,079,735 A | 6/2000 | Fallmann et al. ........ 280/730.2 |
| 6,099,029 A | 8/2000 | Haland et al. .............. 280/729 |
| 6,129,377 A | 10/2000 | Okumura et al. ........ 280/730.2 |
| 6,135,490 A | 10/2000 | Spary ...................... 280/730.2 |
| 6,135,491 A | 10/2000 | Olson et al. ............. 280/730.2 |
| 6,135,492 A | 10/2000 | Zimmerbeutel et al. . 280/730.2 |
| 6,135,493 A | 10/2000 | Jost et al. ................ 280/730.2 |
| 6,149,195 A | 11/2000 | Faigle ........................ 280/749 |
| 6,168,191 B1 | 1/2001 | Webber et al. ........... 280/730.2 |
| 6,168,193 B1 | 1/2001 | Shirk et al. .............. 280/730.2 |
| 6,168,194 B1 | 1/2001 | Cuevas et al. ........... 280/730.2 |
| 6,170,860 B1 | 1/2001 | Denz et al. .............. 280/730.2 |
| 6,173,989 B1 | 1/2001 | Stutz ....................... 280/730.2 |
| 6,176,513 B1 | 1/2001 | Neidert ....................... 280/729 |
| 6,176,515 B1 | 1/2001 | Wallner et al. .......... 280/730.2 |
| 6,206,412 B1 | 3/2001 | Swann et al. ............ 280/730.2 |
| 6,209,907 B1 | 4/2001 | Fischer .................... 280/728.3 |
| 6,217,060 B1 | 4/2001 | Mangold et al. ......... 280/730.2 |
| 6,220,625 B1 | 4/2001 | Wallner et al. .......... 280/730.2 |
| 6,224,091 B1 | 5/2001 | Etrainer et al. .......... 280/730.2 |
| 6,231,073 B1 | 5/2001 | White, Jr. ................ 280/730.2 |
| 6,234,516 B1 | 5/2001 | Boxey ..................... 280/730.2 |
| 6,237,938 B1 | 5/2001 | Boxey ..................... 280/730.2 |
| 6,237,939 B1 | 5/2001 | Resh ....................... 280/730.2 |
| 6,237,940 B1 | 5/2001 | Shirk et al. .............. 280/730.2 |
| 6,237,941 B1 | 5/2001 | Bailey et al. ............ 280/730.2 |
| 6,237,942 B1 | 5/2001 | Swann .................... 280/730.2 |
| 6,238,438 B1 | 5/2001 | Fischer et al. ........... 730/728.2 |
| 6,264,234 B1 | 7/2001 | Hill et al. ................ 280/730.2 |

* cited by examiner

SIDE CURTAIN AIR BAG

CROSS-REFERENCE TO RELATED APPLICATIONS

This application is a continuation-in-part of U.S. patent application Ser. No. 09/535,198 filed Mar. 27, 2000, now U.S. Pat. No. 6,250,668, which is a continuation-in-part of U.S. patent application Ser. No. 09/071,801, filed May 4, 1998, now U.S. Pat. No. 6,149,194, which in turn is a continuation-in-part of: 1) U.S. patent application Ser. No. 08/626,493 filed Apr. 2, 1996, now U.S. Pat. No. 5,746,446, which in turn is a continuation-in-part of U.S. patent application Ser. No. 08/571,247 filed Dec. 12, 1995, now U.S. Pat. No. 5,772,238, U.S. patent application Ser. No. 08/539,676 filed Oct. 5, 1995, now U.S. Pat. No. 5,653,464, U.S. patent application Ser. No. 08/247,763 filed May 23, 1994, now U.S. Pat. No. 5,505,485; and 2) U.S. patent application Ser. No. 08/795,418 filed Feb. 4, 1997, now U.S. Pat. No. 5,863,068. All of these patent applications are incorporated by reference herein.

BACKGROUND OF THE INVENTION

1. Field of the Invention

The present invention relates to a side curtain air bag arranged to deploy along the side of a vehicle to protect occupants during a crash involving the vehicle, including a rollover. The side curtain air bag may even wrap around a front-seated occupant, i.e., have a frontal portion designed to deploy between a front-seated occupant and the dashboard.

The present invention also relates to an air bag having a number of interconnected compartments for use in vehicular crashes whereby the air bag deploys before or during the crash to cushion the occupant of the vehicle and prevent injury to the occupant. The invention also relates to a method for making an air bag having interconnected compartments and an occupant protection system including an air bag with interconnected compartments.

The present invention also relates to a vehicular air bag having a low mass and made substantially from thin plastic film which is designed to deploy in a collision involving the vehicle so that if it impacts the occupant of the vehicle wherever he/she is located, it will not cause significant injury to the occupant. In order to make a film air bag of sufficiently low mass so as not to injure the occupant, it has been recognized that the film air bag must contain means to arrest the propagation of a tear so that a small hole or break in the film does not result in a catastrophic failure, i.e., cause the air bag to burst like a balloon or otherwise prevent the air bag from deploying properly. One particular method of arresting the propagation of a tear of this invention is to use a combination of an elastomeric film and reinforcement means which in certain embodiments may be the elastomeric material itself constructed in a variable thickness pattern, i.e., have thinner and thicker sections, or in a manner so that it has strategically placed thicker sections, i.e., relative to remaining portions of the material, in view of stress considerations during deployment.

2. Description of Prior Art

A conventional driver side air bag (also referred to herein as a driver air bag) is made from pieces of either Nylon or polyester fabric that are joined together, e.g., by sewing. The air bag is usually coated on the inside with neoprene or silicone for the purposes of (i) capturing hot particles emitted by the inflator in order to prevent holes from being burned in the fabric, and (ii) sealing the air bag to minimize the leakage of an inflating gas through the fabric. These air bags are conventionally made by first cutting two approximately circular sections of a material having a coating on only one side and which will form a front panel and a back panel, and sewing them together with the coated side facing out. The back panel is provided with a hole for attachment to an inflator. Fabric straps, called tethers, are then sewn to the front panel. Afterwards, the air bag is turned inside out by pulling the fabric assembly through the inflator attachment hole placing the coated side on the inside. Assembly is completed by sewing the tethers to the back panel adjacent the inflator attachment hole.

If a conventional driver air bag is inflated without the use of tethers, the air bag will usually take an approximately spherical shape. Such an inflated air bag would protrude significantly into the passenger compartment from the steering wheel and, in most cases, impact and injure the driver. To prevent this possible injury, the tethers are attached to the front and rear panels of the air bag to restrict the displacement of the front panel relative to the back panel. The result of the addition of such tethers is an air bag that has the shape of a flat ellipsoid with a ratio of the thickness of the air bag to its diameter of approximately 0.6. In the conventional air bag, the tethers are needed since the threads that make up the air bag fabric are capable of moving slightly relative to each other. The air bag is elastic for stresses that are not aligned with the warp or woof of the fabric. As a result, the fabric would distort to form an approximate sphere in the absence of such tethers.

Moreover, the above-mentioned method of manufacturing an air bag involves a great deal of sewing and thus is highly labor intensive and, as a result, a large percentage of all driver air bags are presently manufactured in low labor cost countries such as Mexico.

Many people are now being injured and some killed by interaction with the deploying air bag (See, e.g., "Warning: Too Much Safety May Be Hazardous", New York Times, Sunday, Dec. 10, 1995, Section F, Page 8). One of the key advantages of the film air bag described in the current assignee's above-referenced patents and patent applications is that, because of its much lower mass than conventional Nylon or polyester fabric air bags, the injury caused by this interaction with the deploying air bag is substantially reduced. In accordance with the teachings of those patents and patent applications mentioned above, the driver air bag system can be designed to permit significant interaction with the driver. In other words, the film air bag can be safely designed to intrude substantially further into the passenger compartment without fear of injuring the driver. Nevertheless, in some cases, as described in U.S. Pat. No. 5,653,464, it may be desirable to combine the properties of a film air bag, which automatically attains the conventional driver air bag shape, with a fabric air bag. In such cases, interaction with the driver needs to be minimized.

Air bag systems today are designed so that ideally the air bag is fully inflated before the occupant moves into the space that is occupied by the air bag. However, most occupants are not positioned at the ideal location assumed by the air bag system designer, and also may not have the dimensions, e.g., size and weight, in the range considered for optimum air bag deployment by the air bag system designer. Many occupants sit very close to the air bags, or at least closer than expected by the air bag system designer, and as mentioned above, are injured by the air bag deployment. On the other hand, others sit far from the air bag, or at least farther away from the air bag than expected, and therefore must travel some distance, achieving a significant relative velocity, before receiving the benefit of the air bag. See for example "How People Sit in Cars: Implications For Driver and Passenger Safety in Frontal Collisions—The Case for Smart Restraints.", Cullen, E., et al 40$^{th}$ Annual Proceedings, Association For the Advancement of Automotive Medicine, pp. 77–91.

With conventionally mounted air bags such as those mounted in the steering wheel or instrument panel, severe out-of-position occupant situations, where the occupant is resting against the air bag when deployment begins, can probably only be handled using an occupant position sensor, such as disclosed in the current assignee's U.S. Pat. No. 5,653,462 (corresponding to published WO 94/22693), which is incorporated herein by reference, which prevents an air bag from deploying if an occupant is more likely to be seriously injured by the air bag deployment than from the accident itself. In many less severe accidents, the occupant will still interact with the deploying air bag and sustain injuries ranging from the mild to the severe. In addition, as mentioned above, some occupants sit very far from the steering wheel or instrument panel and, with conventional air bags, a significant distance remains between the occupant and the inflated air bag. Such occupants can attain a significant kinetic energy relative to the air bag before impacting it, which must be absorbed by the air bag. This effect serves to both increase the design strength requirements of the air bag and increase the injury induced in the occupant by the air bag. For these reasons, it would be desirable to have an air bag system that adjusts to the location of the occupant and which is designed so that the impact of the air bag causes little or no injury to the occupant.

It is conventional in the art that air bags contain orifices or vent holes for exhausting or venting the gas generated by the inflation means. Thus, typically within one second after the bag is inflated (and has provided its impact absorbing function), the gas has been completely exhausted from the bag through the vent holes. This imposes several limitations on the restraint system that encompasses the air bag system. Take for example the case where an occupant is wearing a seatbelt and has a marginal accident, such as hitting a small tree, which is sufficient to deploy the air bag, but where it is not really needed since the driver is being restrained by his seatbelt. If the driver has lost control of the car and is traveling at 30 MPH, for example, and has a secondary impact one second or about 50 feet later, this time with a large tree, the air bag will have become deflated and thus is not available to protect the occupant in this secondary life threatening impact.

In other situations, the occupant might be involved in an accident that exceeds the design capability of the restraint system. These systems are typically designed to protect an average-size male occupant in a 30-MPH barrier impact. At higher velocities, the maximum chest deceleration experienced by the occupant can exceed 60 G's and become life threatening. This is particularly a problem in smaller vehicles, where air bag systems typically only marginally meet the 60-G maximum requirement, or with larger or more frail occupants.

There are many cases, particularly in marginal crashes, where existing crash sensors will cause the air bag to deploy late in the crash. This can also result in an "out-of-position occupant" for deployment of the air bag that can cause injuries and possibly death to the occupant. Other cases of out-of-position occupants are standing children or the forward motion of occupants during panic braking prior to impact especially when they are not wearing seatbelts. The deploying air bag in these situations can cause injury or death to the out-of-position occupant. Approximately one hundred people have now been killed and countless more seriously injured by the deployment of the air bag due to being out-of-position.

It is recognized in the art that the air bag must be available to protect an occupant for at least the first 100–200 milliseconds of the crash. Since the air bag contains large vents, the inflator must continue to supply gas to the air bag to replace the gas flowing out of these vents. As a result, inflators are usually designed to produce about twice as much gas than is needed to fill the air bag. This, of course, increases the cost of the air bag system as well as its size, weight and total amount of contaminants resulting from the gases that are exhausted into the automobile environment.

This problem is compounded when the air bag becomes larger, which is now possible using the film materials of this invention, so as to impact with the occupant wherever he/she is sitting, without causing significant injury, as in the preferred implementation of the design of this invention. This then requires an even larger inflator which, in many cases, cannot be accommodated in conjunction with the steering wheel, if conventional inflator technology is utilized.

Furthermore, there is a great deal of concern today for the safety of a child in a rear facing child seat when it is used in the front passenger seat of a passenger air bag equipped vehicle. Currently used passenger side air bags have sufficient force to cause significant injury to a child sitting in such a seat and parents are warned not to use child seats in the front seat of a vehicle having a passenger side air bag. Additionally, several automobile companies are now experimenting with rear seat air bags in which case, the child seat problem would be compounded.

Air bags made of plastic film are disclosed in the patents and patent applications referenced above. Many films have the property that they are quite inelastic under typical stresses associated with an air bag deployment. If an air bag is made from a pair of joined flat circular sections of such films and inflated, instead of forming a spherical shape, it automatically forms the flat ellipsoidal shape required for driver air bags as described in U.S. Pat. No. 5,653,464. This unexpected result vastly simplifies the manufacturing process for driver air bags since tethers are not required, i.e., the film air bag is made from two pieces of film connected only at their peripheral edges. Furthermore, since the air bag can be made by heat-sealing two flat circular sections together at their peripheral edges without the need for tethers, the entire air bag can be made without sewing, reducing labor and production costs. In fact, the removal of the requirement for tethers permits the air bag to be made by a blow molding or similar process. Indeed, this greatly reduces the cost of manufacturing driver air bags. Thus, the use of film for making an air bag has many advantages that are not obvious.

Films having this inelastic quality, that is films with a high modulus of elasticity and low elongation at failure, tend to propagate tears easily and thus when used alone are not suitable for air bags. This problem can be solved through the addition of reinforcement in conjunction with the inelastic films such as a net material as described in the above-referenced patents and patent applications. Other more elastic films such as those made from the thermoplastic elastomers, on the other hand, have a low modulus of elasticity and large elongation at failure, sometimes 100%, 200% or even 400%, and naturally resist the propagation of tears. Such films, on the other hand, do not form the flat ellipsoidal shape desired for steering wheel-mounted driver side air bags. As discussed in greater detail below, the combination of the two types of film through attachment using lamination, successive casting or coating, or through the use of adhesives applied in a pattern can produce a material having both the self shaping and the resistance to tear propagation properties.

In addition to the above-referenced patents and patent applications, film material for use in making air bags is described in U.S. Pat. No. 4,963,412 to Kokeguchi, which is incorporated herein by reference. The film air bag material described in the Kokeguchi patent is considerably different in concept from that disclosed in the above-referenced patents and patent applications or the instant invention. The prime feature of the Kokeguchi patent is that the edge tear resistance, or notch tear resistance, of the air bag film material can be increased through the use of holes in the plastic films, i.e., the film is perforated. Adding holes, however, reduces the tensile strength of the material by a factor of two or more due to the stress concentration effects of the hole. It also reduces the amount of available material to resist the stress. As such, it is noteworthy that the Kokeguchi steering wheel mounted air bag is only slightly thinner than the conventional driver side fabric air bag (320 micrometers vs. the conventional 400 micrometers) and is likely to be as heavy or perhaps heavier than the conventional air bag. Also, Kokeguchi does not disclose any particular shapes of film air bags or even the air bag itself for that matter. Since his air bag has no significant weight advantage over conventional air bags, there is no teaching in Kokeguchi of perhaps the most important advantage of film air bags of the present invention, that is, in reducing injuries to occupants who interact with a deploying air bag.

As discussed in detail below, the air bags constructed in accordance with the present teachings attain particular shapes based on the use of the inelastic properties of particular film materials and reduce tear propagation through a variety of novel methods including the use of elastic films. It is also noteworthy that Kokeguchi discloses that vacuum methods can be used to form the air bag into the desired shape and thus fails to realize that the properties of inelastic film results in the air bag automatically forming the correct shape upon deployment. Also noteworthy is that Kokeguchi states that polymeric films do not have sufficient edge tear resistance and thus fails to realize that films can be so formulated to have this property, particularly those made from the thermoplastic elastomers. These limitations of the Kokeguchi patent results in a very thick air bag that although comprised of film layers no longer qualifies as a true film air bag as defined herein. A "film air bag" for the purposes herein is one wherein the film thickness is generally less than about 250 micrometers, and preferably even below about 100 micrometers, for use as a driver protection air bag. As the size of the air bag increases, the thickness must also increase in order to maintain an acceptable stress within the film. A film air bag so defined may also contain one or more sections that are thicker than about 250 micrometers and which are used primarily to reinforce the thinner film portion(s) of the air bag. A film air bag as defined herein may also include a layer or layers of inelastic material and a layer or layers of elastic material (i.e., thermoplastic elastomers).

The neoprene or silicone coating on conventional driver air bags, as mentioned above, serves to trap hot particles that are emitted from some inflators, such as a conventional sodium azide inflator. A film air bag may be vulnerable to such particles, depending on its design, and as a result cleaner inflators that emit fewer particles are preferred over sodium azide inflators. It is noteworthy, however, that even if a hole is burned through the film by a hot particle, the use of an thermoplastic elastomer in the film material prevents this hole from propagating and causing the air bag to fail. Also, new inflators using pyrotechnic, hybrid or stored gas technologies, are now available which do not produce hot particles and produce gases which are substantially cooler than gases produced by sodium azide inflators. Also, not all sodium azide inflators produce significant quantities of hot particles.

One interesting point that also is not widely appreciated by those skilled in the art heretofore, is that the gas temperature from the inflator is only an issue in the choice of air bag materials during the initial stages of the inflation. The total thermal energy of the gas in an air bag is, to a first order approximation, independent of the gas temperature which can be shown by application of the ideal gas laws. When the gas initially impinges on the air bag material during the early stages of the inflation process, the temperature is important and, if it is high, care must be taken to protect the material from the gas. Also, the temperature of the gas in the air bag is important if the vent holes are located where the out-flowing gas can impinge on an occupant. The average temperature of the air bag itself, however, will not be affected significantly by the temperature of the gas in the air bag.

In certain conventional air bag deployments, the propellant which is used to inflate the air bag also is used to force open a hole in the vehicle trim, called the deployment door, permitting the air bag to deploy. Since the mass of a film air bag is substantially less than the mass of a conventional fabric air bag, much less energy is required to deploy the air bag in time. However, substantial pressure is still required to open the deployment door. Also, if the pressure now used to open the deployment door is used with film air bags, the air bag velocity once the door has been opened may be substantially higher than conventional air bags. This rapid deployment can put excessive stresses on the film air bag and increases the chance that the occupant will be injured thereby. For most implementations of the film air bag, an alternate less energetic method of opening the deployment door may be required.

One such system is described in Barnes et al. (U.S. Pat. No. 5,390,950) entitled "Method and arrangement for forming an air bag deployment opening in an auto interior trim piece". This patent describes a method " . . . of forming an air bag deployment opening in an interior trim piece having a vinyl skin overlying a rigid substrate so as to be invisible prior to operation of the air bag system comprising an energy generating linear cutting element arranged in a door pattern beneath the skin acting to degrade or cut the skin when activated."

The goal of the Barnes et al. patent is to create an invisible seam when the deployment door is located in a visible interior trim panel. This permits greater freedom for the vehicle interior designer to create the particular aesthetic effect that he or she desires. The invisible seam of the Barnes et al. patent is thus created for aesthetic purposes with no thought toward any advantages it might have to reduce occupant injury or advantages for use with a film air bag, or to reduce injuries at all for that matter. One unexpected result of applying the teachings of this patent is that the pressure required to open the deployment door, resulting from the force of the inflating air bag, is substantially reduced. When used in conjunction with a film air bag, this result is important since the inflator can be designed to provide only sufficient energy to deploy and inflate the very light film air bag thereby significantly reducing the size of the inflator. The additional energy required to open a conventional deployment door, above that required to open a deployment door constructed in accordance with the teachings of the Barnes et al. patent, is not required to be generated by the inflator. Furthermore, since a film air bag is more vulnerable to being injured by ragged edges on the deployment door than a conventional fabric air bag, the device of the Barnes et al. patent can be used to pyrotechnically cut open the deployment door permitting it to be easily displaced from the path of the deploying air bag, minimizing the force of the air bag against the door and thus minimizing the risk of damage to the film air bag from the deployment door. Since Barnes et al. did not contemplate a film air bag, advantages of its use with the pyrotechnically opening deployment door could not have been foreseen. Although the Barnes et al. patent discloses one deployment door opening method which is suitable for use with an air bag made from plastic film as disclosed herein, that is one which requires substantially less force or pressure to open than conventional deployment doors, other methods can be used in accordance with the invention without deviating from the scope and spirit thereof.

The discussion of the self-shaping air bag thus far has been limited to film air bags. An alternate approach is to make an air bag from a combination of fabric and film. The fabric provides the tear resistance and conventional air bag appearance. The film forces the air bag to acquire the flat ellipsoidal shape desired for driver air bags without the use of tethers and permits the air bag to be assembled without sewing using heat and/or adhesive sealing techniques. Such a hybrid air bag is made from fabric and film that have been laminated together prior to the cutting operation. Naturally, the combination of a film and net, as described in the above referenced patents and patent applications, is equally applicable for the air bag described here and both will be referred to herein as hybrid air bags and belong to the class of composite air bags.

A finite element analysis of conventional driver side air bags (made of fabric) shows that the distribution of stresses is highly unequal. Substantial improvements in conventional air bag designs can be made by redesigning the fabric panels so that the stresses are more equalized. Today, conventional air bags are designed based on the strength required to support the maximum stress regardless of where that stress occurs. The entire air bag must then be made of the same thickness material as that chosen to withstand maximum stress condition. Naturally, this is wasteful of material and attempts have been made to redesign the air bag to optimize its design in order to more closely equalize the stress distribution and permit a reduction in fabric strength and thus thickness and weight. However, this optimization process when used with conventional fabric air bags can lead to more complicated assembly and sewing operations and more expensive woven materials and thus higher overall manufacturing costs. An example of such an air bag is that marketed by Precision Fabrics of Greensboro, N.C. Thus, there is a tradeoff between manufacturing cost and air bag optimization.

As discussed in the above-referenced patents and patent applications as well as below, with a film air bag manufactured using blow molding techniques, for example, greater freedom is permitted to optimize the air bag vis-à-vis equalization of the stress. First, other than tooling cost, the manufacturing cost of an optimized air bag is no greater than for a non-optimized air bag. Furthermore, the thickness of the film can be varied from one part of the air bag to another to permit the air bag to be thicker where the stresses are greater and thinner where the stresses are less. A further advantage of blow molding is that the film can be made of a single constituent material. When the air bag is fabricated from sheet material, the outside layer of the material needs to be heat sealable, such as is the case with polyethylene or other polyolefin, or else a special adhesive layer is required where the sealing occurs.

As discussed in greater detail below in connection with the description of the invention, when the film for the air bag is manufactured by casting or coating methods, techniques familiar to those skilled in the art of plastics manufacturing are also available to produce a film where the thickness varies from one part to another in a predetermined pattern. This permits a film to be made that incorporates thicker sections in the form of a lattice, for example, which are joined together with thin film. Thus, the film can be designed so that reinforcing ribs, for example, are placed at the optimum locations determined by mathematical stress analysis.

One example of an inflatable film product which partially illustrates the self-shaping technology of this invention is the common balloon made from metalized "Mylar"™ plastic film found in many stores. Frequently these balloons are filled with helium. They are made by heat-sealing two flat pieces of film together as described in U.S. Pat. Nos. 5,188,558 (Barton), 5,248,275 (McGrath), 5,279,873 (Oike), and 5,295,892 (Felton). Surprisingly, the shape of these balloons, which is circular in one plane and elliptical in the other two planes, is very nearly the shape which is desired for a driver side air bag. This shape is created when the pressure within the balloon is sufficiently low such that the stresses induced into the film are much smaller than the stresses needed to significantly stretch the film. The film used is relatively rigid and has difficulty adjusting to form a spherical shape. In contrast, the same air bag made from woven material more easily assumes an approximate spherical shape requiring the use of tethers to create the shape which comes naturally with the Mylar balloons.

One problem with film balloons is that when a hole is punctured in the balloon it fails catastrophically. One solution to this problem is to use the combination of a film and net as described in the current assignee's above-referenced patents and patent applications. Such materials have been perfected for use as sail material for lightweight high performance sails for sailboats. One example is marketed under the trade name Bainbridge Sailcloth SL Series™, and in particular SL 500-P™, 1.5 mill. This material is a laminate of a film and a net. Such materials are frequently designed to permit heat-sealing thereby eliminating threads and the stress concentrations associated therewith. Heat-sealing also simplifies the manufacturing process for making sails. Another preferable solution is to make the air bags from a film material which naturally resists tears, that is, one which is chemically formulated to arrest a tear which begins from a hole, for example. Examples of films which exhibit this property are those from the thermoplastic elastomer (TPE) families such as polyurethane, Ecdel elastomer from Eastmen, polyester elastomers such as HYTREL™ and some metallocene catalyzed polyolefins. For the purposes herein, a thermoplastic elastomer will include all plastic films which have a relatively low modulus of elasticity and high elongation at failure, including but not limited to those listed above.

Applications for the self shaping air bag described herein include all air bags within the vehicle which would otherwise required tethers or complicated manufacturing from several separate panels. Most of these applications are more difficult to solve or unsolvable using conventional sewing technology. The invention described herein solves some of the above problems by using the inelastic properties of film, and others by using the elastic properties of thermoplastic elastomers plus innovative designs based on analysis including mathematical modeling plus experimentation. In this manner, the problems discussed above, as well as many others, are alleviated or solved by the air bags described in the paragraphs below. Films for air bags which exhibit both the self-shaping property and also formulated to resist the propagation of a tear are made by combining a layer of high modulus material with a layer of a thermoplastic elastomer. Then if a tear begins in the combined film it will be prevented from propagating by the elastomer yet the air bag will take the proper shape due to the self-shaping effect of the high modulus film.

Other relevant prior art includes the following, with a brief explanation of the pertinence of the reference to the present invention:

U.S. Pat. No. 3,511,519 (Martin) describes a large fabric air bag which is shown impacting the occupant. It does not discuss the problem of injury to the occupants due to the impact of the air bag.

U.S. Pat. No. 3,573,885 (Brawn) shows a blowout patch assembly but not variable exhaust orifices.

U.S. Pat. No. 3,820,814 (Allgaier) discloses variable exhaust vents located within the fabric air bag material.

U.S. Pat. No. 3,888,504 (Bonn) illustrates an inflatable occupant restraint air bag which is comprised at least in part of a woven stretch fabric which is permeable to fluid used to inflate the bag, the bag having a variable porosity which increases and decreases in relation to the fluid pressure within the bag.

U.S. Pat. No. 4,262,931 (Strasser) illustrates two air bags joined together to cover right and center seating positions.

U.S. Pat. No. 4,360,223 (Kirchoff) discloses a low-mount, air bag module for the passenger side of an automobile that uses two bags that are folded within a housing that is open at one end. One of the bags is for restraining the knees of the passenger to prevent forward sliding in the event of a crash, the other bag being for restraining the torso. The knee bag is inside the torso bag and they are both attached directly to the inflator, the knee bag being arranged to be inflated first. The torso bag then is inflated to prevent forward rotation of the passenger from the hips.

Further, in accordance with the Kirchoff invention, a pressure responsive orifice means is provided in a second opening in the wall of the knee bag. This orifice means controls the flow of gas through the opening in the wall of the knee bag thereby to insure a predetermined gas pressure within the knee bag, while permitting subsequent inflation of the torso bag by gases passing into the torso bag through the orifice means. Thus, a knee bolster air bag is described but it is positioned inside of the main torso air bag and inflated by the same inflator.

U.S. Pat. No. 4,394,033 (Goetz) discloses a temperature compensation system. The claimed inflatable occupant-restraint system in a vehicle includes a generator for producing fluid under pressure placed such that a portion of the generator is outside the cushion and has a resilient venting means for dumping increasing fractions of gas volume outside the cushion at increasing operating temperatures.

U.S. Pat. No. 4,805,930 (Takada) discloses a temperature compensation system. Further, it describes stitched thread seams between fabric elements of the envelope of a vehicle safety air bag which induce localized distension and opening up of the envelope fabrics along the seams, thereby causing the film coatings of the envelope fabric to rupture along the seam and allow gas to escape and maintain a substantially constant overall maximum pressure, regardless of variations in ambient temperature.

U.S. Pat. No. 3,451,693 (Carey) does not disclose plastic film, merely plastic. The distinguishable properties of film are numerically described in the instant specification and basically are thinner and less weight. Carey does disclose variable exhaust orifice means at col. 3, lines 63+ to maintain constant pressure in the air bag as the occupant is thrown into the air bag. However, the material is not plastic film with means to arrest the propagation of a tear. In fact, it is unclear in Carey as to whether the orifice means therein is repeatable/reusable and no mention is made as to whether the stretching of the orifice means area is permanent or temporary.

U.S. Pat. No. 3,638,755 (Sack) discloses a two-bag air bag combination, with one bag contained within the other.

U.S. Pat. No. 3,675,942 (Huber) discloses a unidirectional valve which permits air to enter the bag, but prevents its escape in the event the pressure within the bag exceeds that of the atmosphere within the vehicle, such as by the impact of a person with the bag.

U.S. Pat. No. 3,752,501 (Daniel) discloses an inflatable cushion device for protective interposition between a vehicle operator and the rim and hub of a vehicle steering wheel assembly. The cushion is compartmented to provide, when inflated, peripheral ring compartmentation in juxtaposition to the steering wheel rim and center compartmentation in overlying juxtaposition to the steering wheel hub. The peripheral ring compartmentation when pressurized provides greater resistance to collapse than the center compartmentation, whereby the peripheral ring compartmentation is adapted to guide the vehicle operator upon contact of the latter with the cushion toward the center compartmentation thereby to maintain the vehicle operator in substantially centered cushioned relationship to the steering wheel assembly under vehicle impact conditions. This air bag contains two compartments; an outer, donut-shaped ring or torus and an inner compartment of somewhat larger volume. This is an example of a bag within a bag where an outer bag is connected to an inner bag by flapper valves.

U.S. Pat. No. 4,964,652 (Karlow) discloses a system for venting excessively high pressure gas incident to deployment of an air bag comprising a diaphragm that is rupturable upon the occurrence of a threshold pressure internally of the air bag to instantaneously release the pressure. This is a pressure relief system through the center of the module.

Japanese Patent No. 89-090412/12 describes fabricated cloths are laminated in layers at different angles to each other's warp axis to be integrated with each other. Strength and isotropy are improved. The cloth is stated as being useful for automotive air bags for protecting the passenger's body.

U.S. Pat. No. 5,322,326 (Ohm) describes a small limited protection air bag manufactured in Korea. Although not disclosed in the patent, it appears to use a plastic film air bag material made from polyurethane. It is a small air bag and does not meet the United States standards for occupant protection (FMVSS-208). The film has a uniform thickness and if scaled to the size necessary for meeting U.S. Standards it would likely become of comparable thickness and weight as the current fabric air bags.

Of particular interest, FIG. 6 shows an air bag 33 having a shape that conforms to the human body by forming a two-fold pocket bag. Junction points are provided such that after inflation, the head of a passenger is protected by an inflated part around the upper junction point while the upper part of the passenger is covered with the other inflated part around the middle junction points and a U-shaped junction line. In contrast to pertinent inventions disclosed below, the junction points and lines do not enable the formation of an air bag having a plurality of substantially straight or elongate compartments which can be deploy along the side of a vehicle in order to protect the occupant(s) from injury. Rather, the junction points and lines result in the formation of a limited-use air bag which will conform only to the human body, i.e., having a section for engaging the head and a section for engaging the upper body. Other applications of junction points and lines are not contemplated by Ohm.

U.S. Pat. No. 5,811,506 (Slagel) describes a thermoplastic, elastomeric polyurethane for use in making vehicular air bags. The polyurethane is extrudable so that air bags of various shapes and sizes can be formed therefrom.

OBJECTS AND SUMMARY OF THE INVENTION

A principal object of this invention is to form a tubular air bag from flat sheets of film or composite material, or by blow molding or a similar process in order to create an air bag for use to protect occupants in the event of a crash of the vehicle, which may be substantially larger than current air bags and which may be designed to interact with the occupant regardless of where he/she is positioned without causing significant injury and thereby to improve the protection provided by the air bag. One of the materials for the air bag is chosen from the class of plastic materials known as thermoplastic elastomers which includes, among others, polyurethane, polyester elastomer and metallocene-catalyzed polyolefin. A plastic material is called an elastomer when its elongation prior to failure is large, sometimes as large as 100%, 200%, 400% or more. The driver air bag version uses the inelastic properties of a layer of the film material to cause the air bag to attain the desired shape without requiring the use of tethers. As a driver side air bag, for example, it can be substantially elliptical in two orthogonal planes and circular in a third orthogonal plane. If a composite material composed of film and a net, an inelastic film and an elastic film, or film and a fabric, is used to form a hybrid design, the relatively inelastic properties of the film are used to create the desired flat elliptical shape, for example, while the net, elastic film or fabric is used to provide other desirable features including tear resistance.

Other objects and advantages of this invention, or other disclosed inventions, include:
1. To provide an air bag which can be manufactured without the use of sewing or other manually intensive operations.
2. To provide an air bag which is considerably lighter and smaller, when folded in the inoperative condition, than current fabric air bags.
3. To provide a driver air bag which does not require the use of tethers.
4. To provide an air bag for use on the front passenger side of the vehicle which can be easily manufactured from a minimum number of parts without the use of sewing.
5. To provide a substantially conventional driver fabric air bag which can be manufactured without the use of tethers.
6. To provide an air bag which can be manufactured using a low cost blow molding or similar technology.
7. To provide an air bag which has been optimized to substantially equalize the stresses in the material thereof.
8. To provide an air bag where the material thickness is varied to reduce the stress in the high stress areas of the air bag.
9. To provide an air bag where optimization procedures have been used to substantially eliminate folds and wrinkles in the surface of the inflated air bag.
10. To provide an air bag comprising film where the thickness to diameter ratio is less than 0.7 without the use of tethers and, in some cases, less than 0.6.
11. To provide a very low cost air bag, with respect to the fabrication thereof.
12. To provide a method of manufacturing an air bag permitting any desired shape air bag to the manufactured from flat panels.
13. To provide an air bag where at least one layer is made from a thermoplastic elastomer which is substantially lighter than conventional fabric air bags.
14. To provide an air bag module which is substantially less injurious to out-of-position occupants during air bag deployment.
15. To utilize thin film air bags in a manner which eliminates the catastrophic bursting of the film in the event of an inadvertent puncture.
16. To provide a plastic film air bag where the thickness is varied in a desired pattern, e.g., a pattern of thicker reinforcement sections and spanning sections of thin film.
17. To provide an air bag system which automatically adjusts to the presence of a child seat.
18. To reduce the injury potential to an out-of-position occupant from the deploying air bag.
19. To provide an air bag module utilizing the combination of an air bag made substantially of film and a pyrotechnically opening deployment door.
20. To provide an occupant restraint air bag system for a single occupant which is composed of a plurality of air bags.
21. To provide an air bag system for the protection of an occupant which automatically adjusts to the occupant's seating position.
22. To provide an air bag system which exhausts back through the inflator structure thereby eliminating the need for vent holes in the air bag.
23. To provide a method of containing a plurality of air bags through the use of a net structure.
24. To provide an air bag system having a variable exit orifice to reduce occupant injury including chest and head maximum accelerations, to reduce the amount of propellant required, and to permit more efficient use of the air bag deflation.
25. To provide a simple construction method for an air bag composed of several air bags.
26. To provide an air bag design which will be available in the event of multiple impacts where the air bag is not fully utilized during the initial impact.
27. To retain the gas in the air bag for a substantial period of time until it is impacted by an occupant.
28. To minimize the total amount of gas and contaminants produced by all of the inflators in the vehicle.
29. To provide an air bag having a plurality of interconnected gas-receiving compartments.
30. To provide an air bag designed to inflate in the passenger compartment alongside the side door of the vehicle.
31. To provide an air bag which provides front to side coverage for a front-seated vehicle occupant which would prevent the occupant from impacting the A-pillar in a crash.

In order to achieve at least some of these objects, an air bag for a vehicle in accordance with the invention comprises a plurality of sections of material joined to one another, e.g., heat-sealed or adhesively-sealed, to form a plurality of substantially straight, interconnected compartments receivable of an inflating medium. The sections of material may be discrete sheets of film with optional tear propagation arresting means. Two or more of the sections of material may be at least partially in opposed relationship to one another and then joined to one another at locations other than at a periphery of any of the sections to thereby form the interconnected compartments between the sections of material. The sections of material may be joined to one another along parallel lines or links to thereby form the straight interconnected compartments between the sections of material, which when inflated, will be tubular.

An inflatable occupant protection system in accordance with the invention includes a housing mounted in the vehicle and having an interior, a deployable inflatable element or air bag contained within the housing interior prior to deployment, inflation means coupled to the housing for inflating the air bag (such as a gas generator for supplying a gas into the interior of the air bag), the air bag being attached to and in fluid communication with the inflation means, and initiation means for initiating the gas generator to supply the gas into the interior of the air bag in response to a crash of the vehicle, i.e., a crash sensor. The air bag may be as described in the paragraph above.

The housing may be elongate and extends substantially along the entire side of the vehicle such that the air bag is arranged to inflate between a side of the vehicle and the respective spaces above both the front and rear seats. In another implementation, the housing is arranged in the front seat and extends between sides of the vehicle such that the air bag is arranged to inflate outward from the front seat toward the rear seat.

Also disclosed is a method for manufacturing an air bag for a vehicle in which a plurality of sections of material are joined together to form a plurality of substantially straight, interconnected compartments, e.g., by applying an adhesive between opposed surfaces of the sections of material to be joined together or heating the sections of material to be joined together. The sections of material may be joined together along parallel lines to form the straight, elongate interconnected compartments which become tubular when inflated with a gas.

Other objects and advantages of the present invention will become apparent from the following description of the preferred embodiments taken in conjunction with the accompanying drawings.

The tear propagation arresting means for the film sheets may be (i) the incorporation of an elastomeric film material, a laminated fabric, or net, which are connected to each of the pieces of plastic film (e.g., the inelastic film which provides the desired shape upon deployment of the air bag), or (ii) means incorporated into the formulation of the plastic film material itself. Also, the two pieces of film may be formed as one integral piece by a blow molding or similar thermal forming process.

BRIEF DESCRIPTION OF THE DRAWINGS

The following drawings are illustrative of embodiments of the invention and are not meant to limit the scope of the invention as encompassed by the claims.

DETAILED DESCRIPTION OF THE PREFERRED EMBODIMENTS

Figure 1:
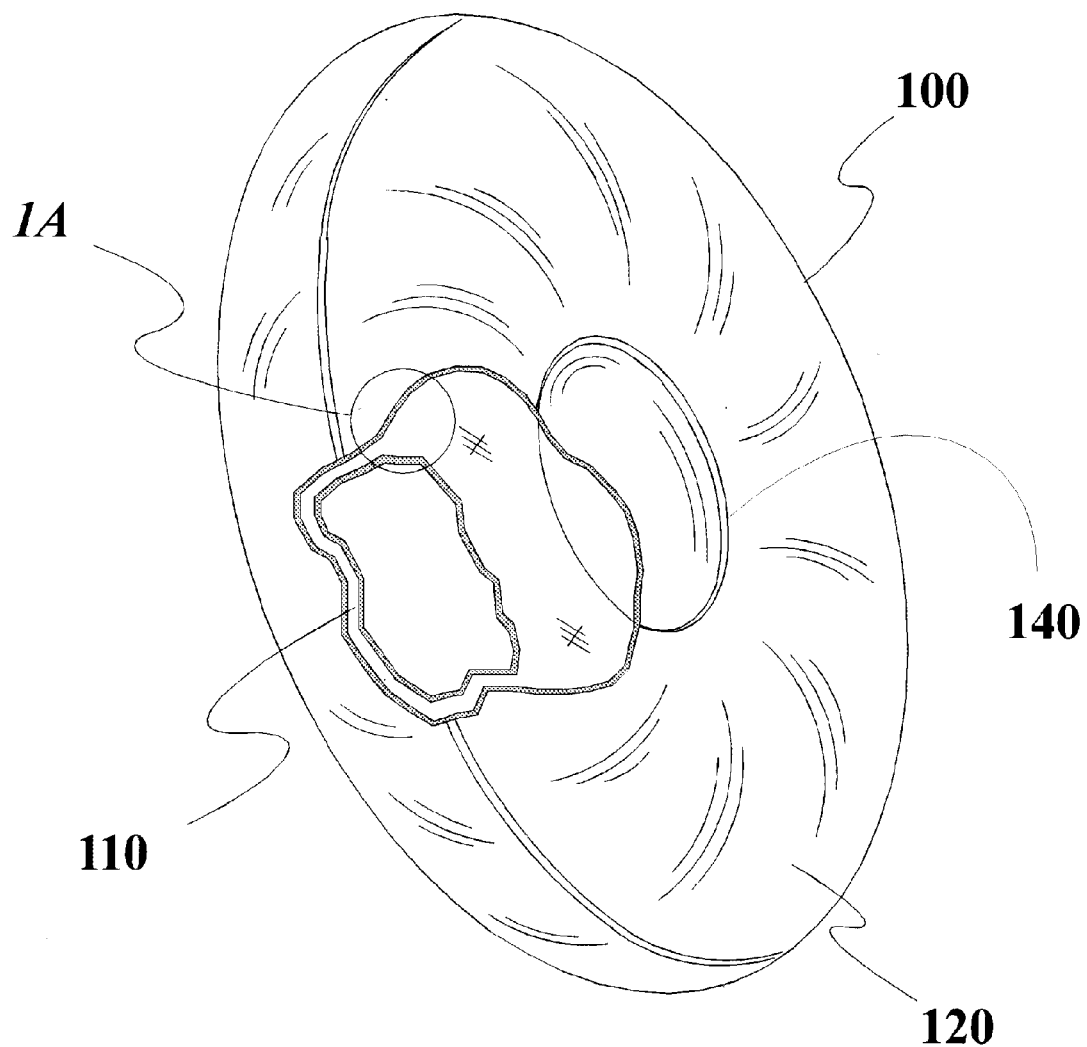
FIG. 1 is a perspective view with portions cut away and removed of a film air bag wherein the film is comprised of at least two layers of material which have been joined together by a process such as co-extrusion or successive casting or coating.

A fundamental problem with the use of plastic films for air bags is that when a single conventional plastic film is used and a tear is introduced into the film, the tear propagates easily and the air bag fails catastrophically upon deployment. As noted above, this invention is concerned with various methods of eliminating this problem and thus of permitting the use of films for air bags with the resulting substantial cost and space savings as well as a significant reduction in injuries to occupants. The reduction in occupant injury arises from the fact that the film is much lighter than the fabric in a conventional air bag and it is the mass of the air bag traveling at a high velocity which typically injures the out-of-position occupant. Also, since the air bag is considerably smaller than conventional air bags, the module is also smaller and the total force exerted on the occupant by the opening of the deployment door is also smaller further reducing the injuries to severely out-of-position occupants caused by the initial stages of the air bag deployment. Finally, in some preferred implementations of this invention the air bag is mounted onto the ceiling of the vehicle making it very difficult for an occupant to get into a position as to be injured by the opening of the deployment door. Ceiling mounting of conventional fabric air bags is not practical due their excessive size. Ceiling mounting of full protection film air bags, on the other hand, is practical based on the use of the materials and particularly the reinforcements disclosed here.

One method of solving the tear problem is to use two film air bags or two air bag layers, one inside the other, where the air bags or layers are attached to each other with an adhesive which is strong enough to hold the two air bags or layers closely together but not sufficiently strong to permit a tear in one air bag or layer to propagate to the other. If a tear is initiated in the outer air bag or layer, for example, and the material cannot support significant tensile stresses in the material close to the tear, the inner air bag or layer must accommodate the increased tensile stress until it can be transferred to the outer layer at some distance from the tear. If the tear is caused by a small hole, this increased stress in the inner bag may only occur for a few hole diameters away from the hole. If the inner air bag is also made from a thermoplastic elastomer and the outer air bag layer is made from a less elastic material, the outer material can cause the air bag to take on a particular desired shape and the inner air bag is used to provide the tear resistance.

The problem which arises with this system when both film layers have high elastic moduli and the cause of the tear in one air bag also causes a tear in the second air bag is solved if one of the materials used for the two air bags has a low modulus of elasticity, such a thermoplastic elastomer. In this case, even though a tear starts in both air bags at the same time and place, the tear will not propagate in the thermoplastic elastomer and thus it will also be arrested in the high modulus material a short distance from the hole initiation point. An example of a two layer air bag construction is illustrated in FIG. 1 which is a perspective view with portions cut away and removed of a film air bag made from two layers or sheets of plastic film material, which are preferably substantially coextensive with one another.

Figure 1A:
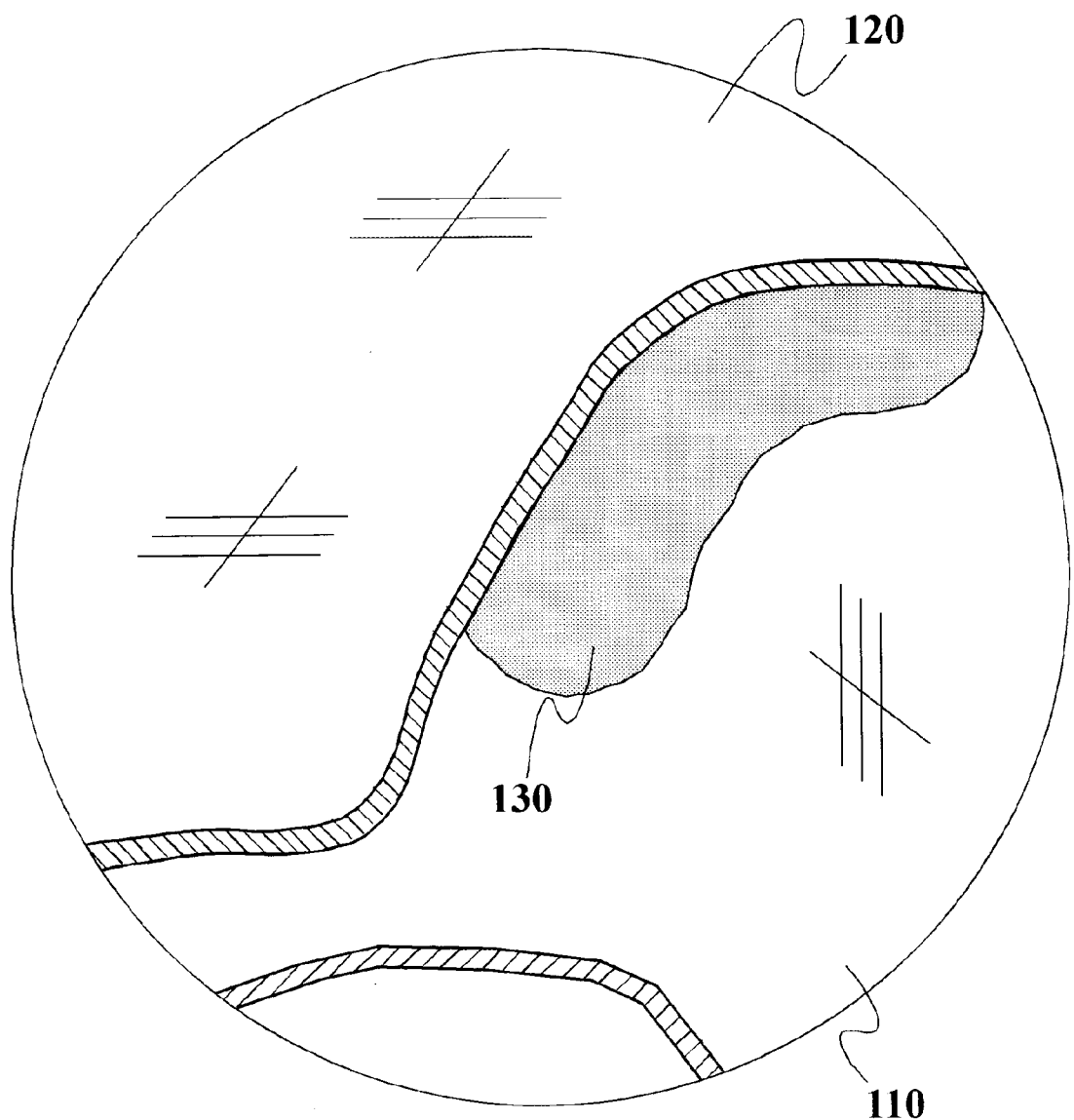
FIG. 1A is an enlarged view of the inner film air bag layer and outer film air bag layer taken within circle 1A of FIG. 1.

In FIG. 1, the driver air bag is shown in the inflated condition generally at 100 with one film layer 110 lying inside a second film layer 120. The film layers 110, 120, or sheets of film laminated or otherwise attached together, are non-perforated and are also referred to as air bags herein since they constitute the same. FIG. 1A is an enlarged view of the material of the inner layer 110 and outer layer 120 taken within circle 1A of FIG. 1. When manufactured, the film of the inner layer may be made from a thermoplastic elastomer such as polyurethane, for example, as shown in FIG. 1A, and the outer layer may be made from a more rigid material such as nylon or polyester. The two film layers are held together along their adjacent regions by adhesive means such as an adhesive 130 applied in a manner sufficient to provide adherence of the two film layers together. In FIG. 1 a driver side air bag is illustrated where the bag is formed from two flat pieces of material and a center cylindrical piece 140 all of which are joined together using heat sealing with appropriate reinforcement at the heat sealed joints. Heat sealing entails the application of heat to one or both of the surfaces to be joined. In most implementations, the center cylindrical piece 140 is not required as taught in U.S. Pat. No. 5,653,464 cross-referenced above.

The example of FIG. 1 is meant to be illustrative of a general technique to minimize the propagation of tears in a composite film air bag. In an actual air bag construction, the process can be repeated several times to create a composite air bag composed of several layers, each adjacent pair of layers optionally joined together with adhesives. For the purposes of this disclosure, the term "composite air bag" will mean a film air bag composed of two or more layers which may or may not be joined together including cases where the layers are joined during an extrusion processing step such as in coextrusion, by a casting process, progressive coating process, or where a film layer is combined with another reinforcing material such as fibers or a woven or molded net.

The materials used for the various film layers can be the same or different and are generally made from nylon, polyethylene or polyester, for the high modulus component and from polyurethane, polyester elastomer such as HYTREL™ or other thermoplastic elastomers for the low modulus component, although other materials could also be used. The use of different materials for the different layers has the advantage that tear propagation and strength properties can complement each other. For example, a material which is very strong but tears easily can be used in conjunction with a weaker material which requires a greater elongation before the tear propagates. Alternately, for those cases where self-shaping is not necessary, all layers can be made from thermoplastic elastomers which expand upon inflation and do not maintain any set shape.

In the implementation of FIG. 1, the adhesive 130 has been applied in a uniform coating between the film layers. In some cases, it is preferable to place the adhesive in a pattern so as to permit a tear to propagate a small distance before the stress is transferred between layers. This permits the stress concentration points to move a small distance away from each other in the two films and further reduces the chance that a catastrophic failure will result. Thus, by selecting the pattern of the application of the adhesive and/or the location(s) of application of the adhesive, it is possible to control the propagation of a tear in the composite air bag.

Figure 1B:
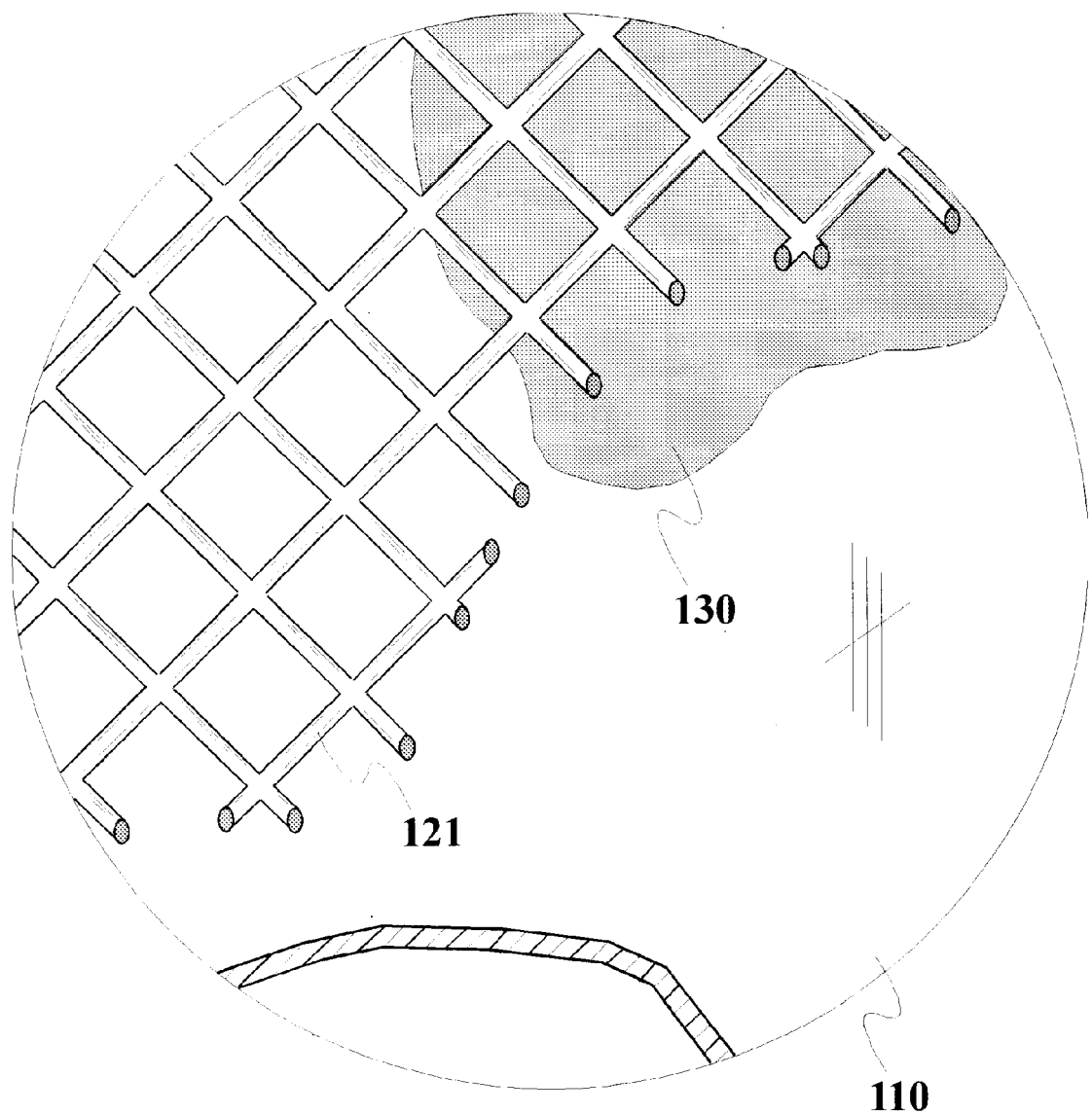
FIG. 1B is an enlarged view of the material of the inner film air bag and outer film air bag taken within circle 1A of FIG. 1 but showing an alternate configuration where the outer air bag layer has been replaced by a net.

FIG. 1B illustrates an alternate configuration of a composite air bag where the outermost air bag has been replaced by a net 121. There may be additional film layers beneath the layer 110 in this embodiment. A "net" is defined for the purposes of this application as an interlaced or intercrossed network of material, e.g., strips of material which cross one another. The interlacing may be generated, e.g., by weaving discrete elongate strips of material together or by molding, casting, progressive coating or a similar process in which case the material is molded into the network to provide an intercrossed structure upon formation. Additionally, the net may be formed integrally with the film material in which case it appears as a substantial change in material thickness from the net and film portions of the material to the only film portions of the material. The strips of material may be joined at the intersection points in the event that discrete material strips are woven together. In the illustrated embodiment, the material strips which constitute the net are oriented in two directions perpendicular to one another. However, it is within the scope of the invention to have a net comprising material strips oriented in two, non-perpendicular directions (at an angle to one another though) or three or more directions so long as the material strips are interlaced with each other to form the net. Additionally, the net pattern can vary from one portion of the air bag to another with the particular location and orientation determined by analysis to minimize stress concentrations, eliminate wrinkles and folds, or for some other purpose. Also, it is understood that the net has openings surrounded by material having a thickness and width substantially smaller than the openings.

The net 121 may be an integral part of the air bag 110 or it can be attached by an adhesive 130, or by another method such as heat sealing, to the inner air bag 110 or it can be left unattached to the inner air bag 110 but nevertheless attached to the housing of the air bag system. In this case, the stress in the inner air bag 110 is transferred to the net 121 which is designed to carry the main stress of the composite air bag and the film is used mainly to seal and prevent the gas from escaping. Since there is very little stress in the inner film layer 110, a tear will in general not propagate at all unless there is a failure in the net structure. The net 121 in this illustration has a mesh structure with approximately square openings of about 0.25 inches. Naturally this dimension will vary from design to design. The adhesive also serves the useful purpose of minimizing the chance that the net 121 will snag buttons or other objects which may be worn by an occupant. The design illustrated in FIG. 1B shows the net on the outside of the film. Alternately, the net may be in the inside, internal to the film layer 110, especially if it is created by variations in thickness of one continuous material.

In one embodiment, the net 121 is attached to the housing of the air bag 110 and is designed to enclose a smaller volume than the volume of the air bag 110. In this manner, the air bag will be restrained by the net 121 against expansion beyond the volumetric capacity of the net 121. In this way, stresses are minimized in the film permitting very thin films to be used, and moreover, a film having a higher elastic modulus can be used.

Figure 1C:
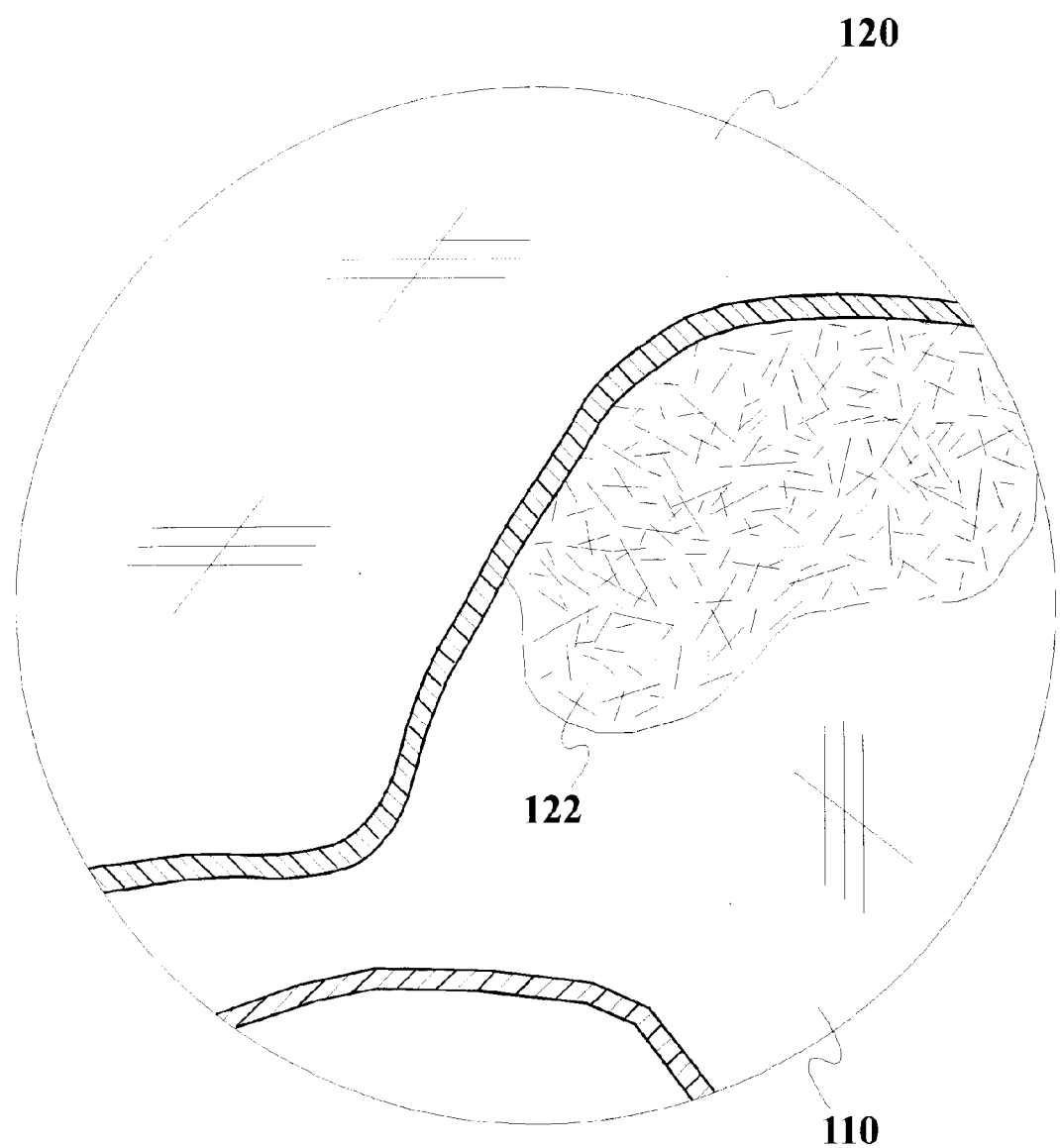
FIG. 1C is an enlarged view of the material of the inner film air bag layer and outer film air bag layer taken within circle 1A of FIG. 1 but showing an alternate configuration where fibers of an elastomer are incorporated into an adhesive layer between the two film layers.

Many other variations are possible. In one alternative embodiment, for example, the net 121 is placed between two layers of film so that the outer surface of the composite air bag is smooth, i.e., since the film layer is generally smooth. In another embodiment shown in FIG. 1C, fibers 122 of an elastomer or other suitable material, are randomly placed and sealed between two film layers 110,120 possibly in conjunction with the adhesive). In this illustrated embodiment, the fibers 122 act to prevent the propagation of tears in much the same manner as a net. The net 121 may also be constructed from fibers.

Figure 1D:
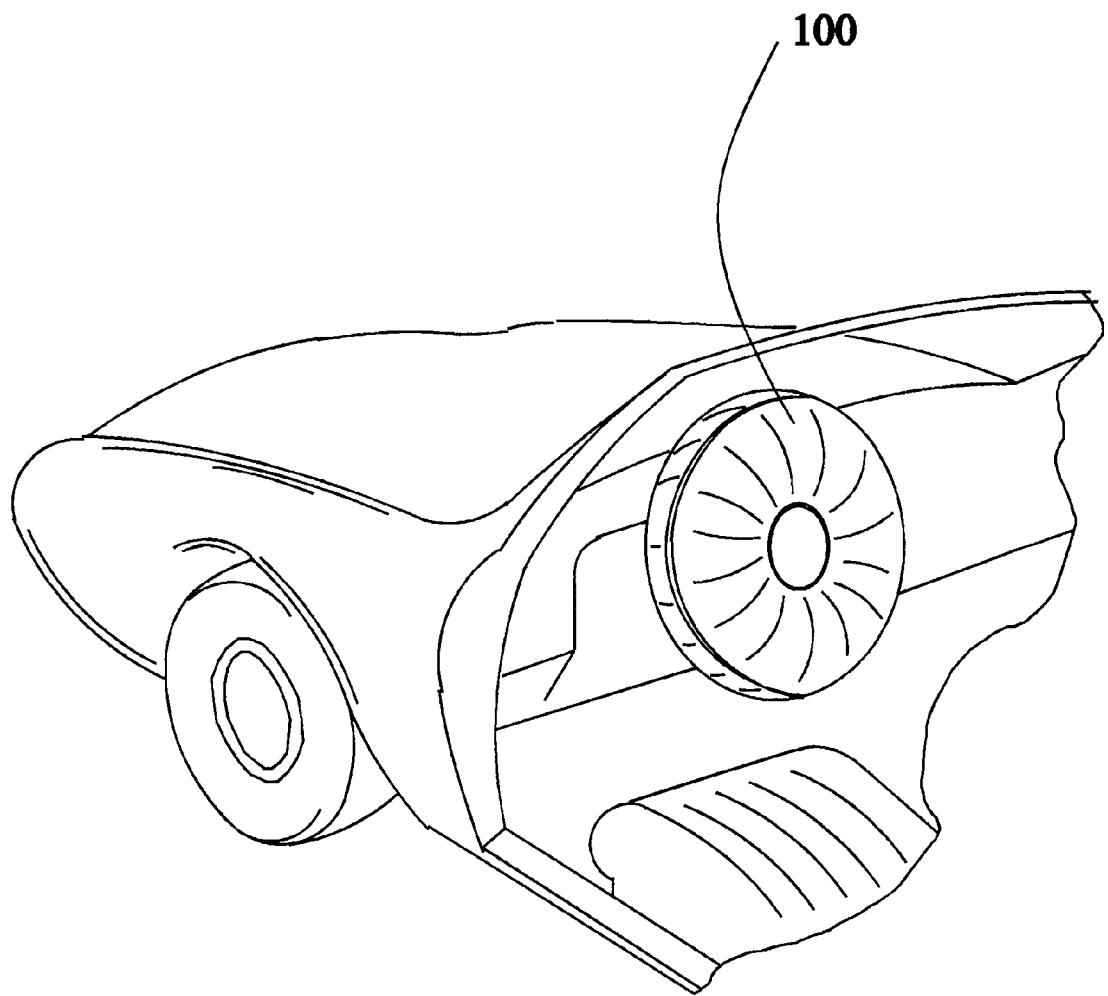
FIG. 1D is a perspective view with portions cut away of a vehicle showing the driver air bag of FIG. 1 mounted on the steering wheel and inflated.

The driver air bag 100 of FIG. 1 is shown mounted on a vehicle by conventional mounting means (not shown) in the driver side position and inflated in FIG. 1D.

It is understood that the air bag 100 is arranged prior to deployment in a module or more specifically in a housing of the module and further that the interior of the air bag is adapted to be in fluid communication with inflation means for inflating the air bag, e.g., gas generation means. Thus, the inflation means are coupled in some manner to the housing. Also, the module includes initiation means for initiating the gas generation means in response to a crash of the vehicle. This structure is for the most part not shown in the drawings but is included in connection with all of the air bag concepts disclosed herein.

Figure 2:
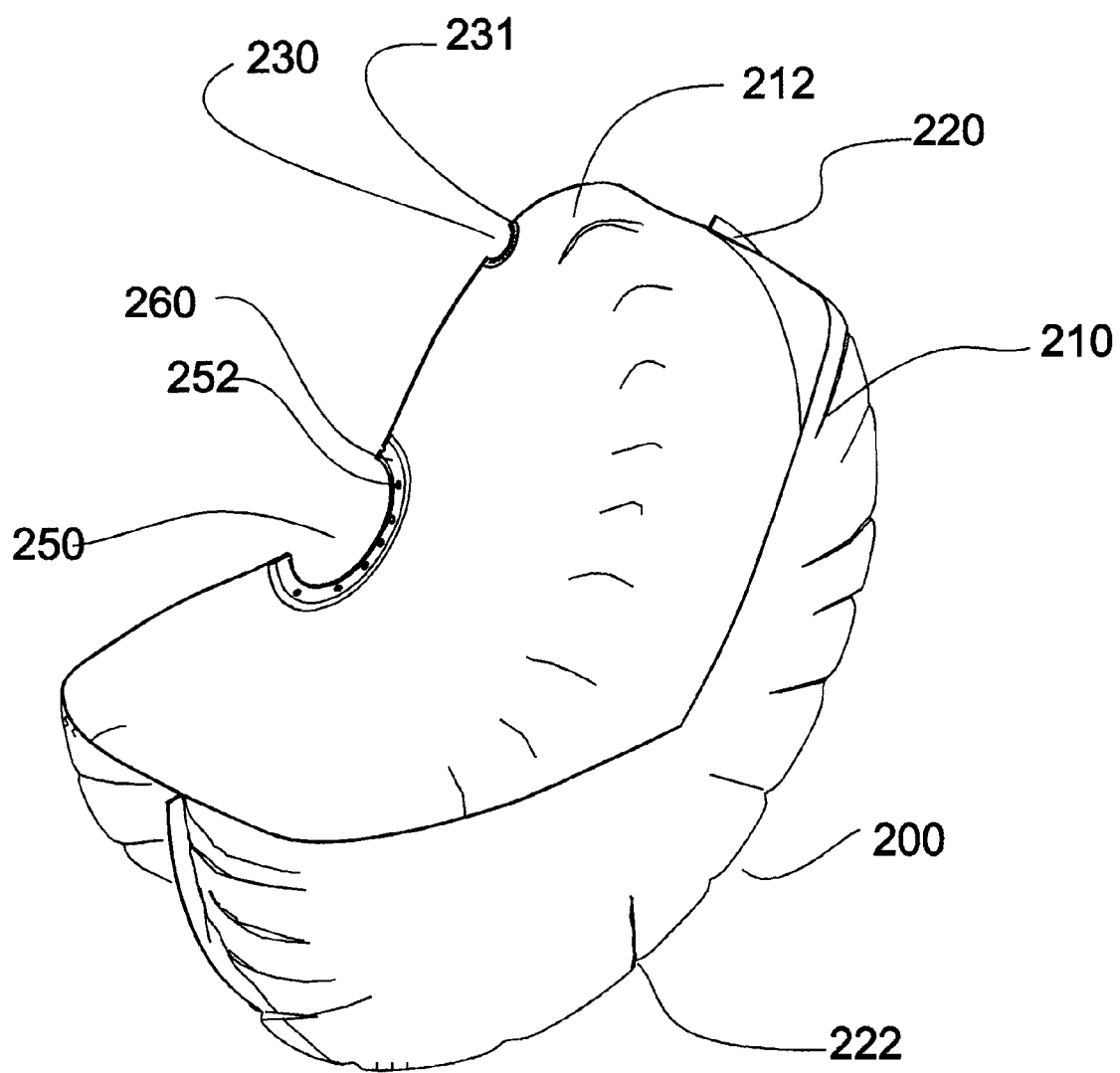
FIG. 2 is a partial cutaway perspective view of a driver side air bag made from plastic film.

An air bag made from plastic film is illustrated in FIG. 2 which is a partial cutaway perspective view of a driver side air bag 200 made from film. This film air bag 200 is constructed from two flat disks or sheets of film material 210 and 212 which are sealed together by heat welding or an adhesive to form a seam 220. A hole 250 is provided in one of the disks 212 for attachment to an inflator (not shown). This hole 250 is reinforced with a ring of plastic material 260 and holes 252 are provided in this ring 260 for attachment to the inflator. A vent hole 230 is also provided in the disk 212 and it is surrounded by a reinforcing plastic disk 231. Since this air bag is formed from flat plastic sheets 210 and 212, an unequal stress distribution occurs causing the customary wrinkles and folds 222.

Several different plastic materials are used to make plastic films for balloons as discussed in U.S. Pat. Nos. 5,188,558, 5,248,275, 5,279,873, and 5,295,892, which are incorporated by reference herein. These films are sufficiently inelastic that when two flat disks of film are joined together at their circumferences and then inflated, they automatically attain a flat ellipsoidal shape. This is the same principle used herein to make a film air bag, although the particular film materials chosen are different since the material for an air bag has the additional requirement that it cannot fail during deployment when punctured.

When the distinction is made herein between an "inelastic" film air bag and an elastic air bag, this difference in properties is manifested in the ability of the untethered elastic air bag to respond to the pressure forces by becoming approximately spherical with nearly equal thickness and diameter while the inelastic film air bag retains an approximate ellipsoidal shape, or other non-spherical shape in accordance with the design of the inelastic film air bag, with a significant difference between the thickness and diameter of the air bag.

An analysis of the film air bag shown in FIG. 2 shows that the ratio of the thickness to the diameter is approximately 0.6. This ratio can be increased by using films having greater elasticity. A completely elastic film, rubber for example, will form an approximate sphere when inflated. This ratio can also be either increased or decrease by a variety of geometric techniques some of which are discussed below. The surprising fact, however, is that without resorting to complicated tethering involving stitching, stress concentrations, added pieces of reinforcing material, and manufacturing complexity, the air bag made from inelastic film automatically provides nearly the desired shape for driver air bags upon deployment (i.e., the roughly circular shape commonly associated with driver side air bags). Note that this air bag still has a less than optimum stress distribution which will be addressed below.

Figure 3A:
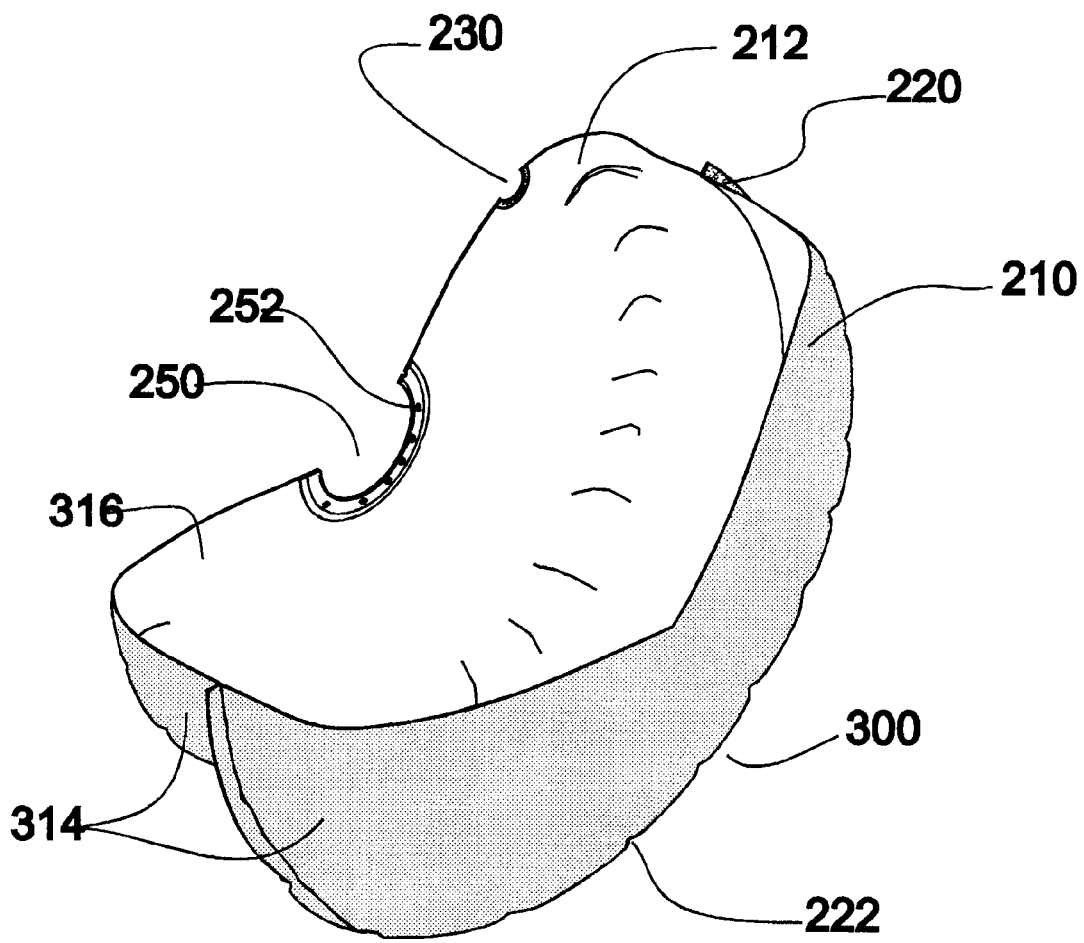
FIG. 3A is a partial cutaway perspective view of an inflated driver side air bag made from plastic film and a fabric to produce a hybrid air bag.

Although there are many advantages in making the air bag entirely from film, there is unfortunately reluctance on the part of the automobile manufacturers to make such a change in air bag design until the reliability of film air bags can be satisfactorily demonstrated. To bridge this gap, an interim design using a lamination of film and fabric is desirable. Such a design is illustrated in FIG. 3A which is a partial cutaway perspective view of a driver side air bag made from film 316 laminated with fabric 314 to produce a hybrid air bag 300. The remaining reference numbers represent similar parts as in FIG. 2. In all other aspects, the hybrid air bag acts as a film air bag. The inelastic nature of the film 316 causes this hybrid air bag 300 to form the proper shape for a driver air bag. The fabric 314, on the other hand, presents the appearance of a conventional air bag when viewed from the outside. Aside from the lamination process, the fabric 314 may be attached to the film 316 directly by suitable adhesives, such that there are only two material layers, or by heat sealing or any other convenient attachment and bonding method.

Figure 3B:
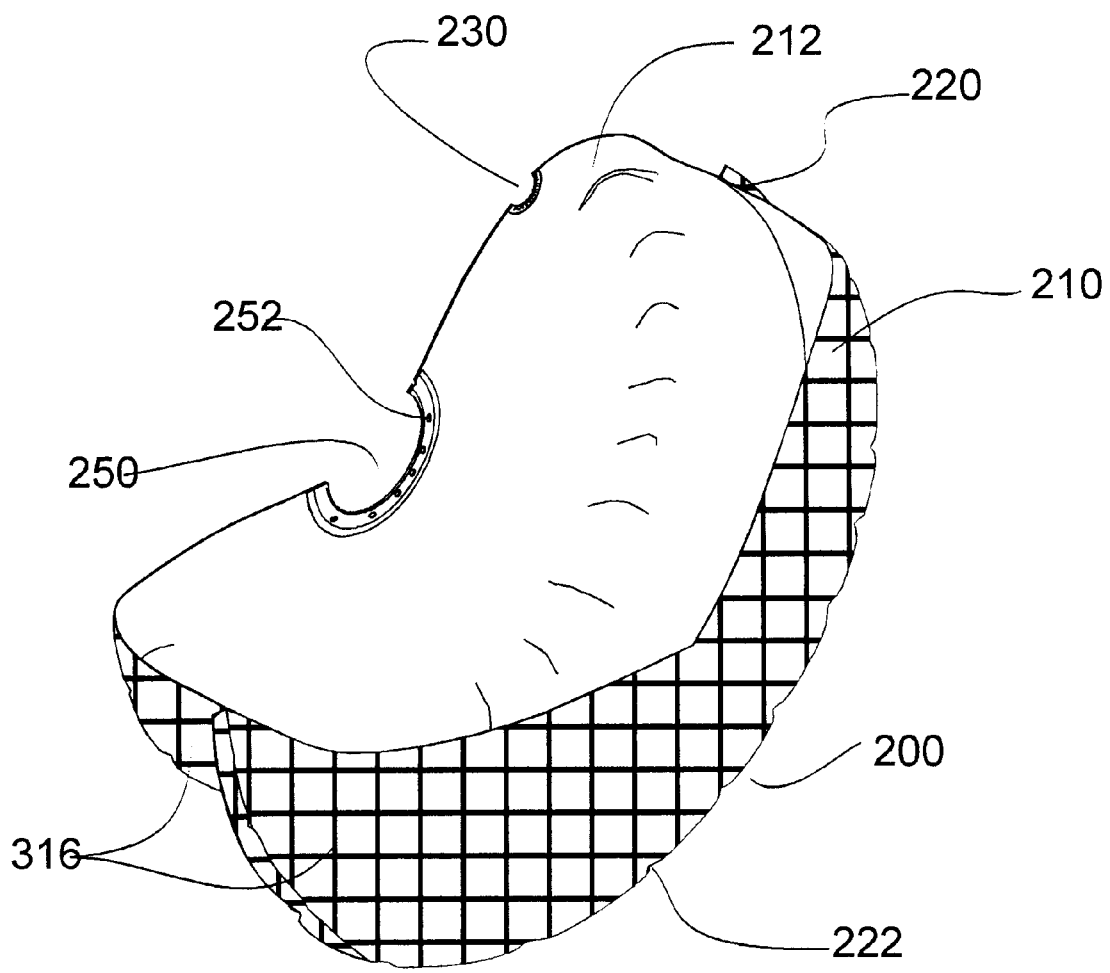
FIG. 3B is a partial cutaway perspective view of an inflated driver side air bag made from plastic film and a net to produce a hybrid air bag.

Analysis, as described in the above-referenced U.S. Pat. No. 5,505,485, has shown that a net is much stronger per unit weight than a fabric for resisting tears. This is illustrated in FIG. 3B which is a partial cutaway perspective view of a driver side air bag 200 made from film 212 and a net 316, which is preferably laminated to the film or formed from the same material as the film and is integral with it, to produce a hybrid air bag. The analysis of this system is presented in the above-referenced patent which is included herein by reference and therefore will not be reproduced here. The reference numerals designating the element in FIG. 3B correspond to the same elements as in FIG. 3A.

Figure 3C:
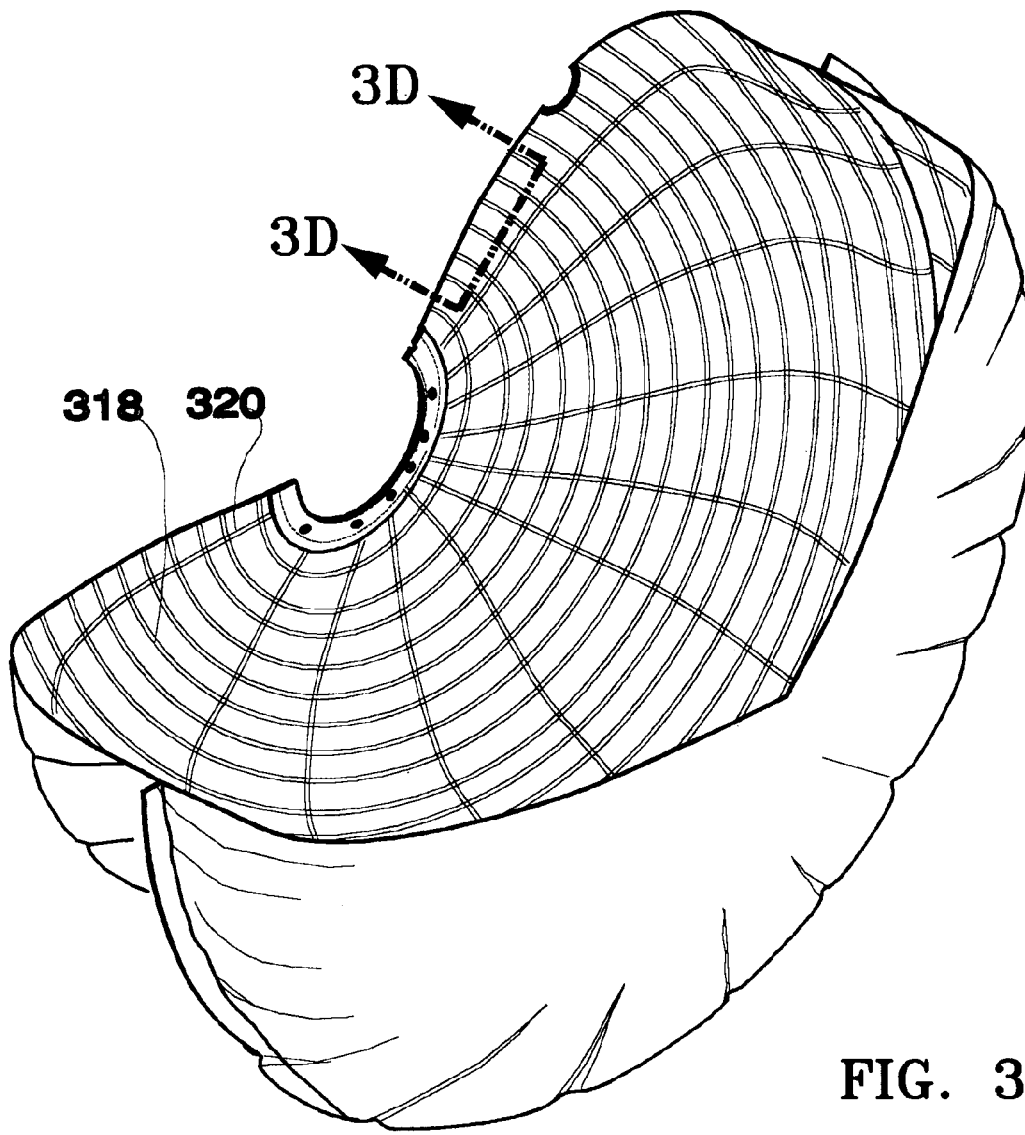
FIG. 3C is a partial cutaway perspective view of an inflated driver side air bag made from plastic film having a variable thickness reinforcement in a polar symmetric pattern with the pattern on the inside of the air bag leaving a smooth exterior.
Figure 3D:
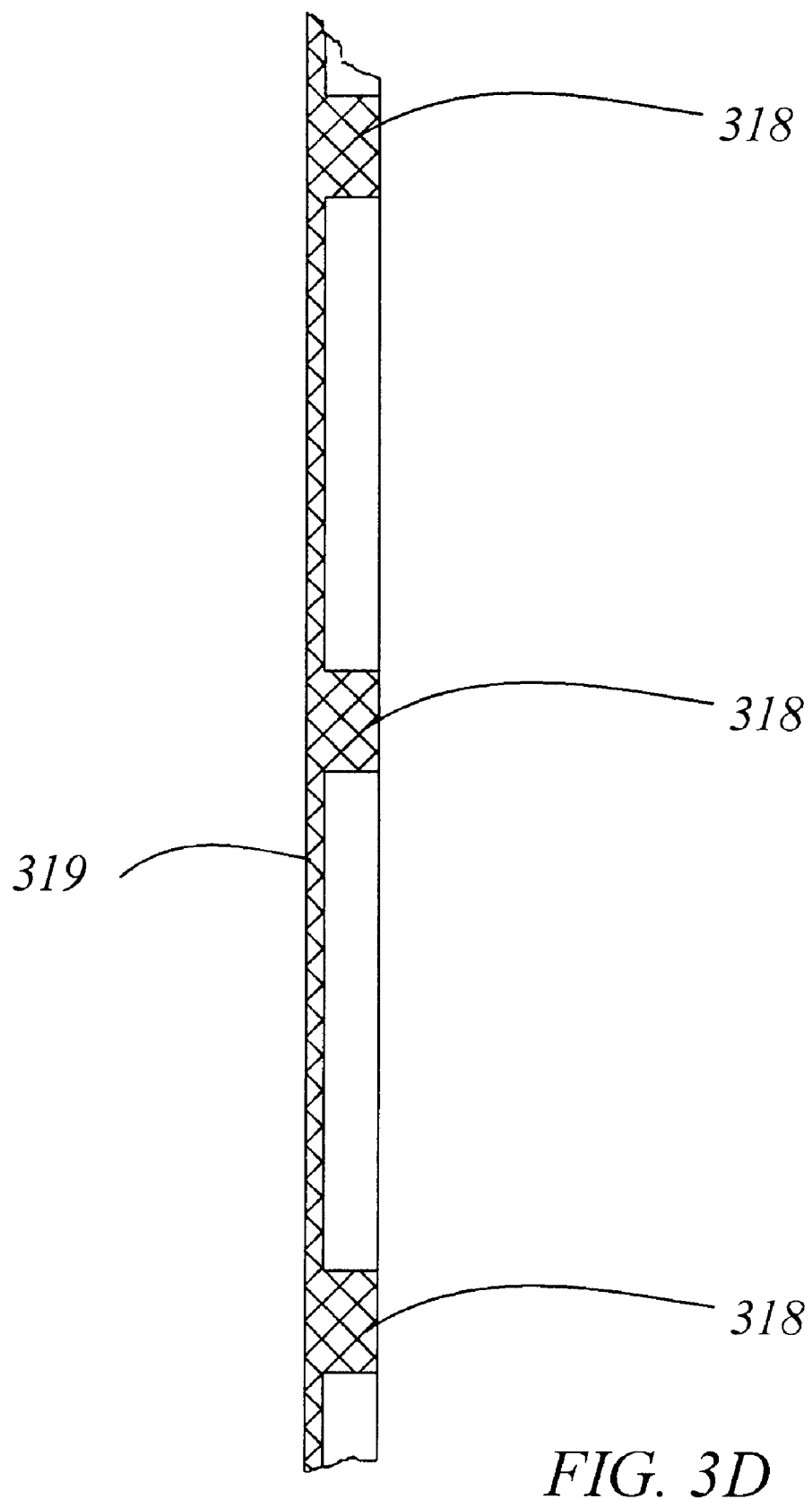
FIG. 3D is an enlarged cross sectional view of the material of the film air bag taken at 3D—3D of FIG. 3C showing the thickness variation within the film material.

For axisymmetric air bag designs such as shown in FIGS. 3A–3D, a more efficient reinforcement geometry is to place the reinforcements in a pattern of circular rings 318 and ribs 320 (FIG. 3C). A cross-sectional view of the material taken along line 3D—3D in FIG. 3C is shown in FIG. 3D. In this case, the reinforcement has been made by a progressive coating process from a thermoplastic elastomeric material such a polyurethane. In this case, the reinforcing rings and ribs 318,320 are many times thicker than the spanning thin film portions 319 and the reinforcing ribs 320 have a variable spacing from complete contact at the center or polar region to several centimeters at the equator. The reinforcements may comprise the laminated net as discussed above. Since the rings and ribs 318,320 are formed in connection with the inner surface of the air bag 200, the outer surface of the air bag 200 maintains its generally smooth surface.

In this regard, it should be stated that plastic manufacturing equipment exists today which is capable of performing this progressive coating process, i.e., forming a multi-layer plastic sheet (also referred to as a material sheet) from a plurality of different plastic layers. One such method is to provide a mold having the inverse form of the predetermined pattern and apply the specific plastic materials in individual layers into the mold, all but the initial layer being applied onto a preexisting layer. The mold has depressions having a depth deeper than a remaining portions of the mold which will constitute the thicker regions, the thinner portions of the mold constituting the spanning regions between the thicker regions. Also, it is possible and desirable to apply a larger amount of the thermoplastic elastomer in the depressions in the mold so that the thicker regions will provide a reinforcement effect. In certain situations, it is foreseeable that only the thermoplastic elastomer can be coated into the depressions whereas a plastic material which will form an inelastic film layer is coated onto the spanning regions between the depressions as well as in the depressions in order to obtain an integral bond to the thermoplastic elastomer. The mold can have the form of the polar symmetric pattern shown in FIG. 3C.

Figure 4A:
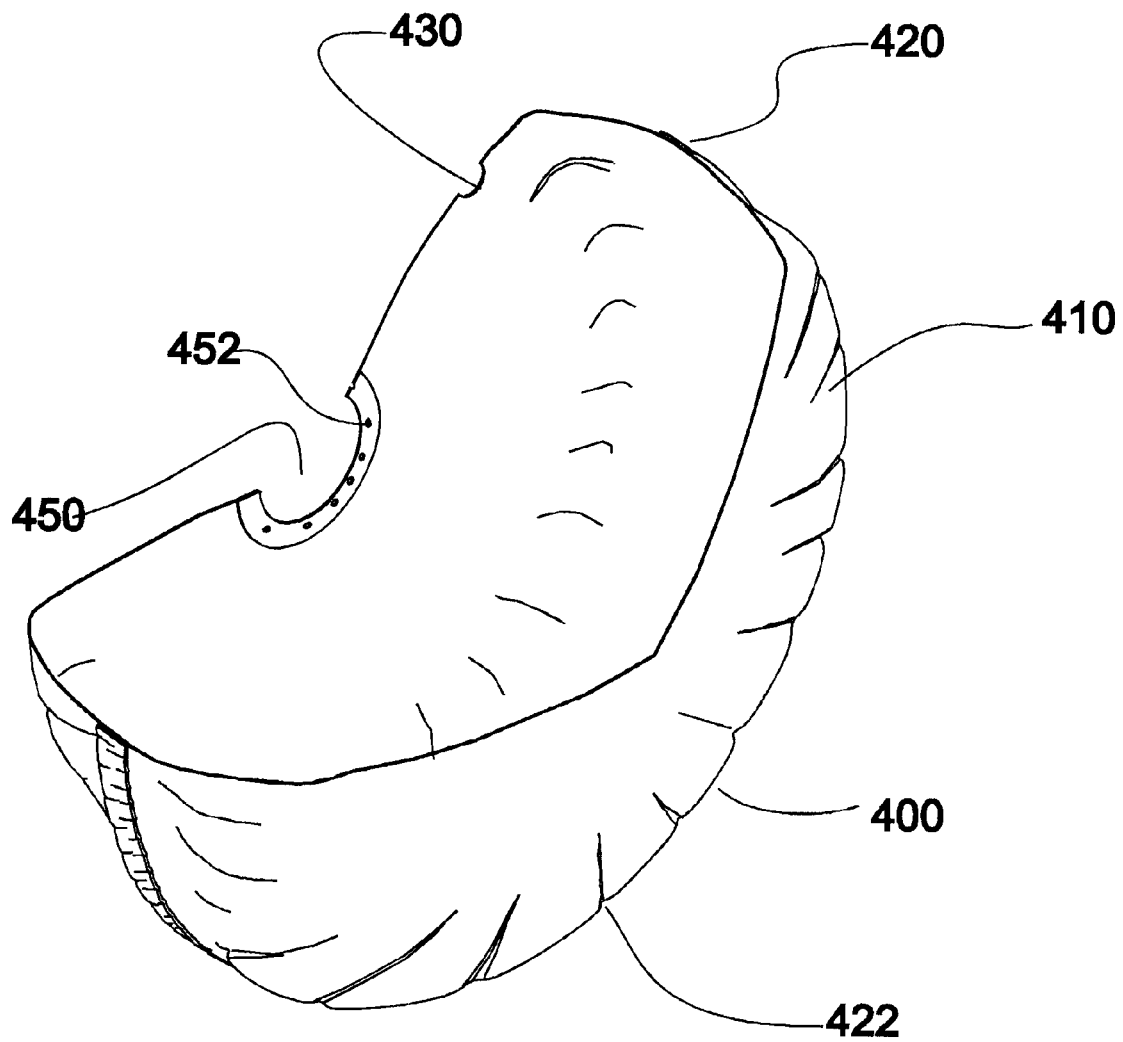
FIG. 4A is a partial cutaway perspective view of an inflated driver side air bag made from plastic film using a blow molding process.

The film air bag designs illustrated thus far were constructed from flat plastic sheets which have been sealed by heat welding, adhesive, or otherwise. An alternate method to fabricate an air bag is to use a molding process to form an air bag 400 as illustrated in FIG. 4A which is a partial cutaway perspective view of a driver side air bag made from film using blow molding (a known manufacturing process). Blow molding permits some thickness variation to be designed into the product, as does casting and progressive coating methods molding (other known manufacturing processes). In particular, a thicker annular zone 420 is provided on the circumference of the air bag 400 to give additional rigidity to the air bag in this area. Additionally, the material surrounding the inflator attachment hole 450 has been made thicker removing the necessity for a separate reinforcement ring of material. Holes 452 are again provided, usually through a secondary operation, for attachment of the air bag 400 to the inflator.

The vent hole 430 is formed by a secondary process and reinforced, or, alternately, provision is made in the inflator for the gases to exhaust therethrough, thereby removing the need for the hole 430 in the bag material itself. Since this design has not been stress optimized, the customary wrinkles and folds 422 also appear.

Figure 4B:
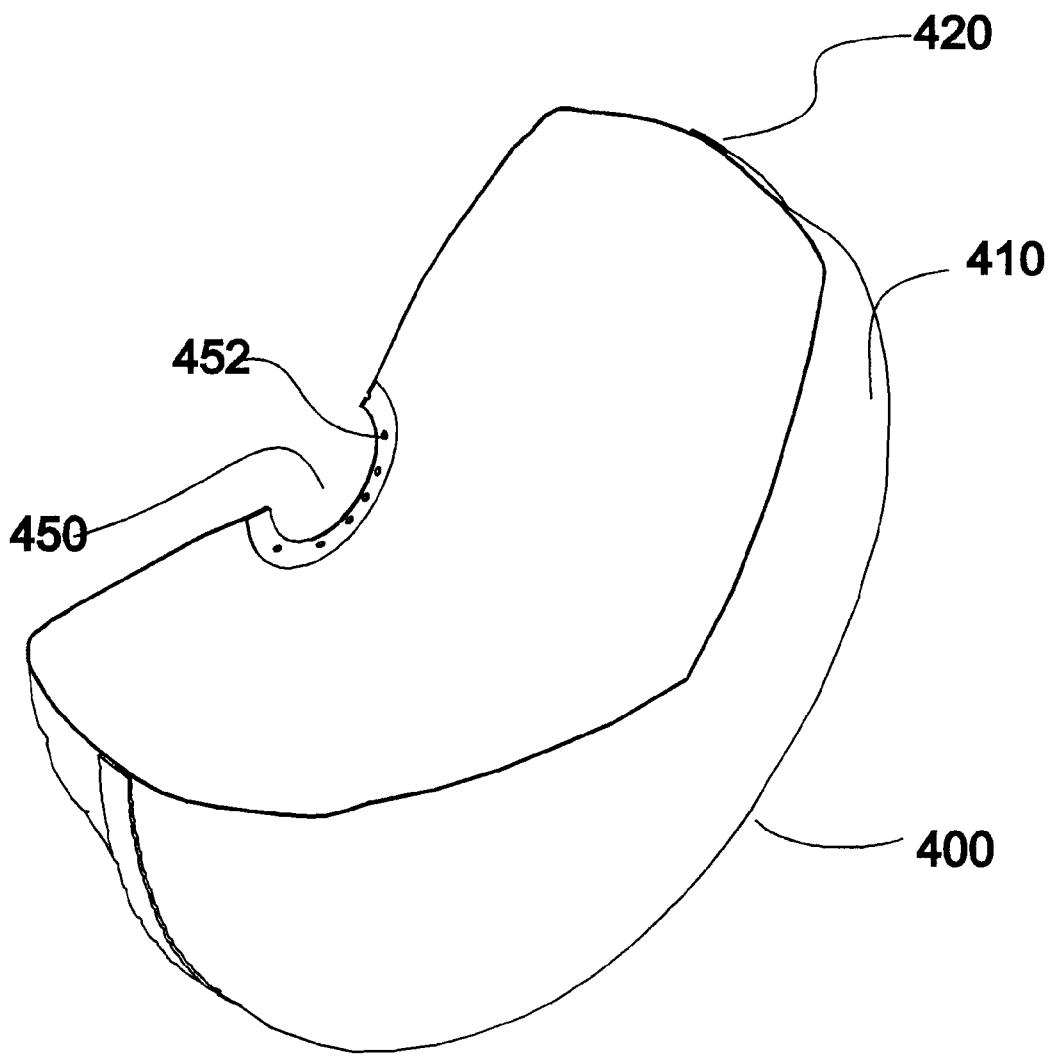
FIG. 4B is a partial cutaway perspective view of an inflated driver side air bag made from plastic film using a blow molding process so that the air bag design has been partially optimized using finite element air bag model where the wrinkles have been eliminated and where the stresses within the film are more uniform.

One advantage of the use of the blow molding process to manufacture air bags is that the air bag need not be made from flat sheets. Through careful analysis, using a finite element program for example, the air bag can be designed to substantially eliminate the wrinkles and folds seen in the earlier implementations. Such a design is illustrated in FIG. 4B which is a partial cutaway perspective view of a driver side air bag made from film using a blow molding process where the air bag design has been partially optimized using a finite element air bag model. This design has a further advantage in that the stresses in the material are now more uniform permitting the air bag to be manufactured from thinner material.

Figure 4C:
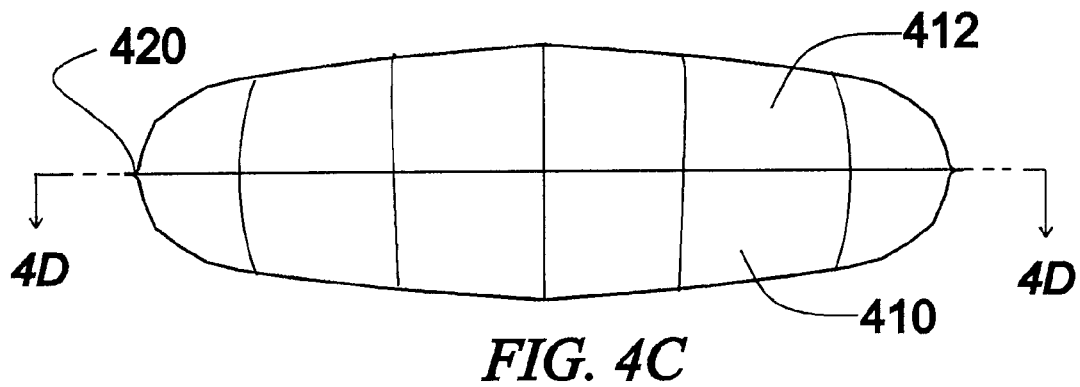
FIG. 4C is a cutaway view of an inflated driver side air bag made from plastic film showing a method of decreasing the ratio of thickness to effective diameter.
Figure 4D:
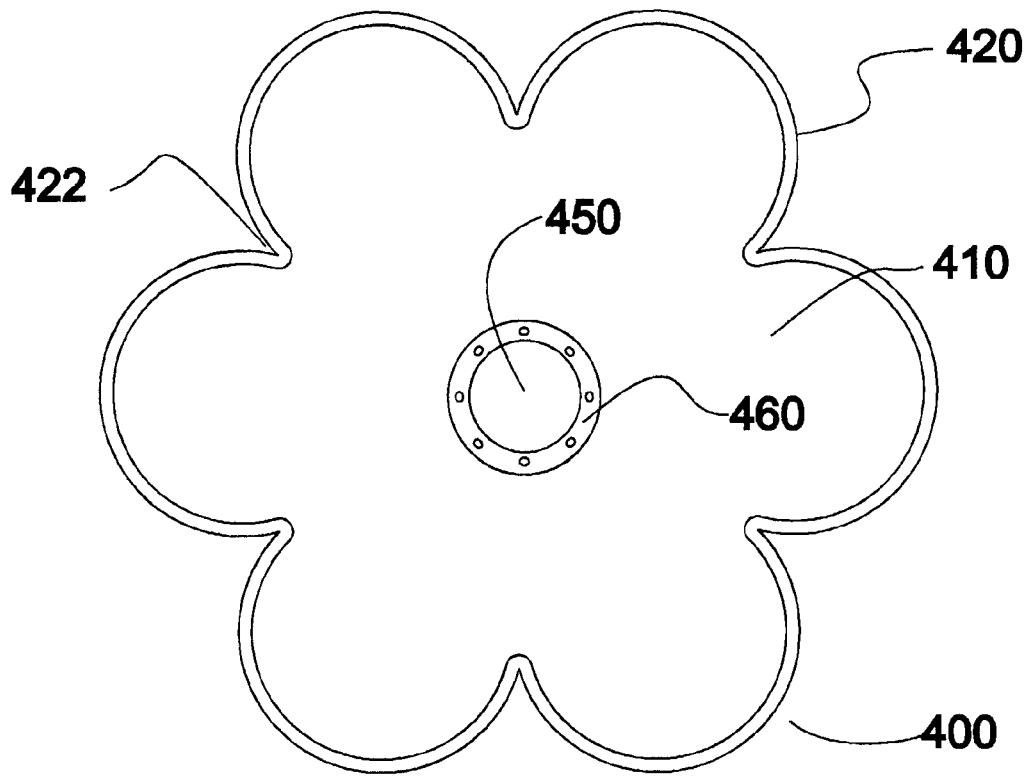
FIG. 4D is a view of a driver side air bag of FIG. 4C as viewed along line 4D—4D.

In some vehicles, and where the decision has been made not to impact the driver with the air bag (for example if a hybrid air bag is used), the inflated air bag comes too close to the driver if the ratio of thickness to diameter is 0.6. In these applications, it is necessary to decrease this ratio to 0.5 or less. For this ratio, thickness means the dimension of the inflated air bag measured coaxial with the steering column, assuming the air bag is mounted in connection with the steering column, and diameter, or average or effective diameter, is the average diameter measured in a plane perpendicular to the thickness. This ratio can be obtained without resorting to tethers in the design as illustrated in FIG. 4C which is a side view of a driver side air bag made from film where the ratio of thickness to effective diameter decreases. FIG. 4D is a view of the air bag of FIG. 4C taken along line 4D—4D. This air bag 400 is manufactured from two sheets of material 410 and 412 which are joined together by sealing means to form seal 420. Inflator attachment hole 450 is reinforced with a ring of plastic material 460 as described above. Many circumferential geometries can be used to accomplish this reduction in thickness to diameter ratio, or even to increase this ratio if desired. The case illustrated in FIG. 4C and FIG. 4D is one preferred example of the use of a finite element design method for an air bag.

Figure 5:
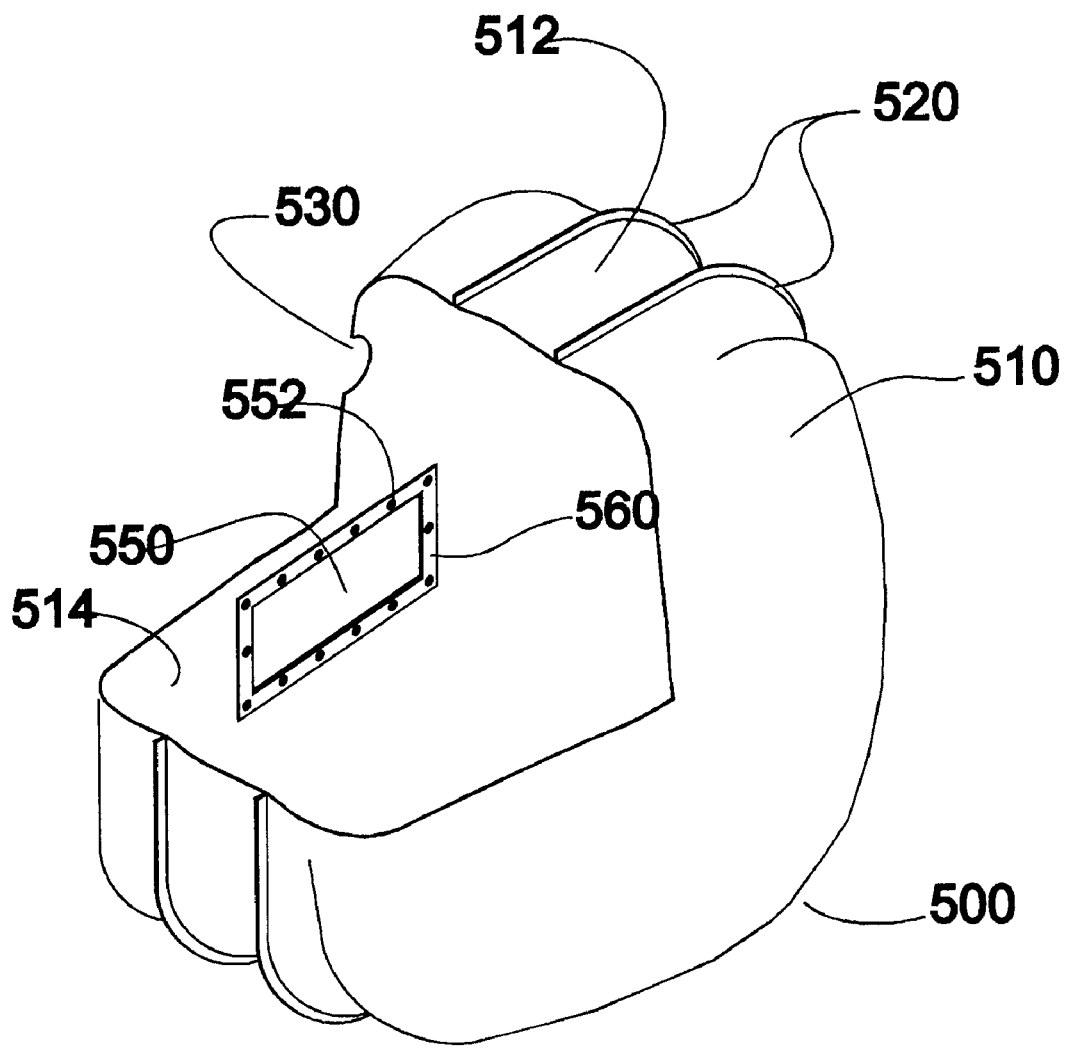
FIG. 5 is a partial cutaway perspective view of a passenger side air bag made from plastic film.

The discussion above has been limited for the most part to the driver side air bag which is attached to the vehicle steering wheel or otherwise arranged in connection therewith. This technology is also applicable to a passenger side air bag, which is generally attached to the instrument panel, as illustrated in FIG. 5 which is a partial cutaway perspective view of a passenger side air bag 500 made from three pieces of flat film 510, 512 and 514 which have joined seams 520 between adjacent pieces of film 510, 512, 514. The passenger side air bag, as well as rear seat air bags and side impact air bags, generally have a different shape than the driver side air bag but the same inventive aspects described above with respect to the driver side air bag could also be used in connection with passenger side air bags, rear seat air bags and side impact air bags. Although illustrated as being constructed from a plurality of sheets of plastic film, this air bag can also be made by blow molding or other similar molding process, i.e., as one unitary sheet. Also, for many vehicles, the sheet 512 is unnecessary and will not be used thereby permitting the air bag to once again be manufactured from only two flat sheets. The inflator attachment hole 550 is now typically rectangular in shape and is reinforced by a rectangular reinforcement plastic ring 560 having inflator-mounting holes 552. A vent hole 530 is also provided to vent gases from the deploying air bag 500.

Figure 6:
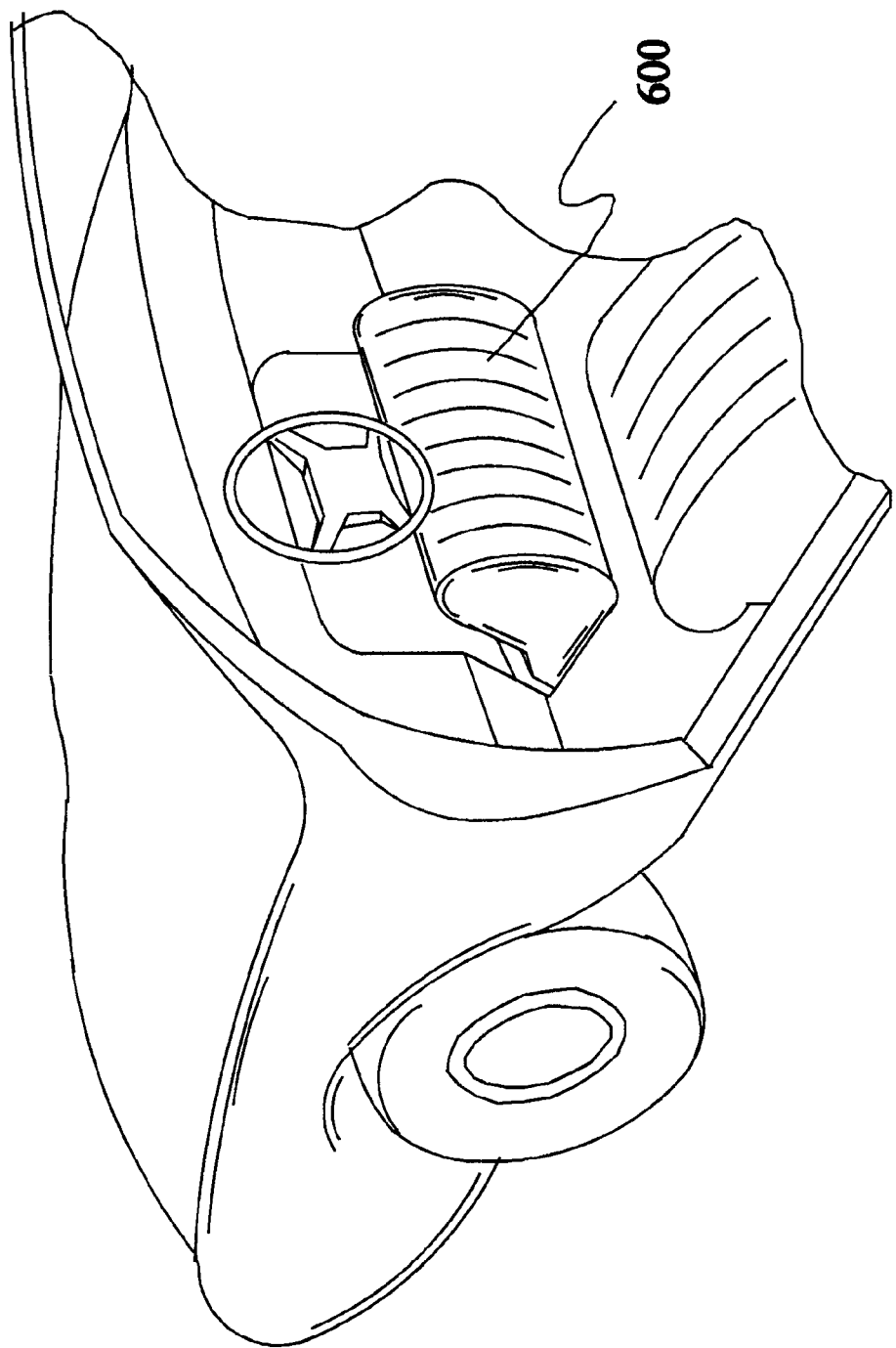
FIG. 6 is a perspective view with portions cut away of a vehicle showing the knee bolster air bag in an inflated condition mounted to provide protection for a driver.

In FIG. 6, a knee protection air bag for the front driver is shown generally at 600. Since the air bag fills the entire space between the knee and the instrument panel and since the instrument panel is now located at a substantial distance from the occupant's knees, there is substantially more deflection or stroke provided for absorbing the energy of the occupant. Since the distance of deployment of the knee air bag can be designed large enough to be limited only by the interaction with an occupant or some other object, the knee air bag can be designed so that it will inflate until it fills the void below the upper air bag, not illustrated in this figure. The knee protection air bag 600 can take the form of any of the composite air bag disclosed above, e.g., include a plastic film layer and an overlying net, or two or more plastic film layers, at least one inelastic to provide the shape of the knee bolster and at least one elastic to control the propagation of a tear.

Figure 13:
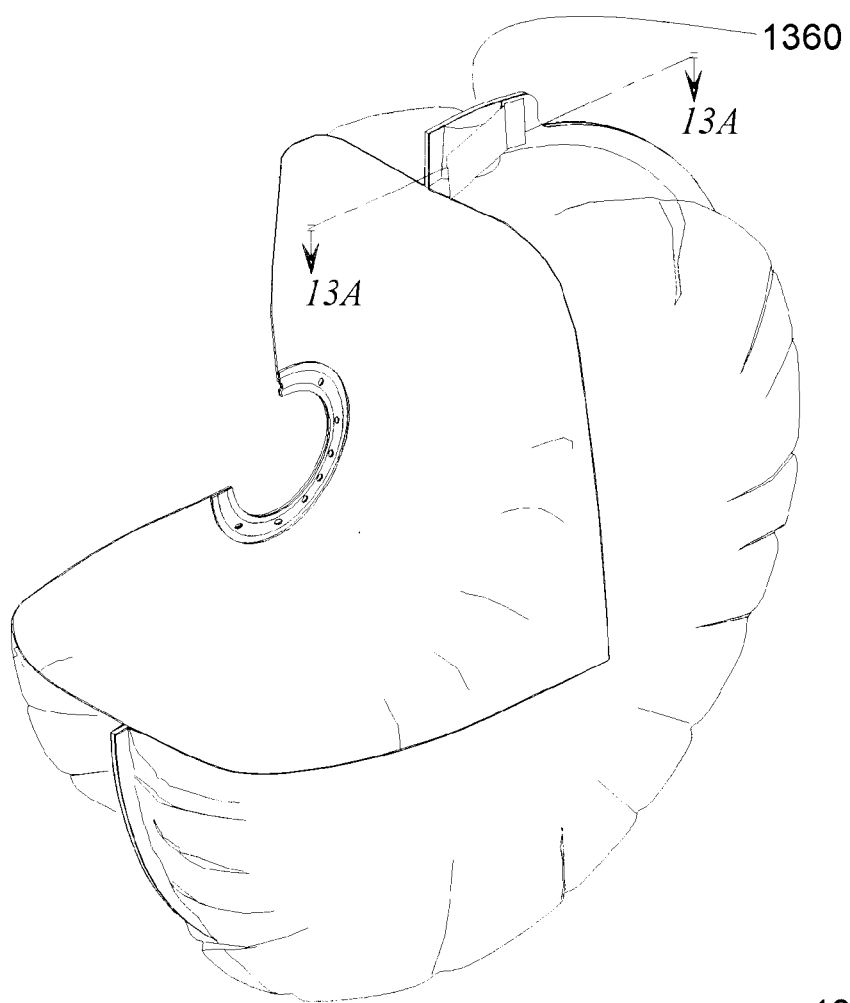
FIG. 13 is a partial cutaway perspective view of a driver side air bag made from plastic film having a variable vent in the seam of the air bag.
Figure 13A:
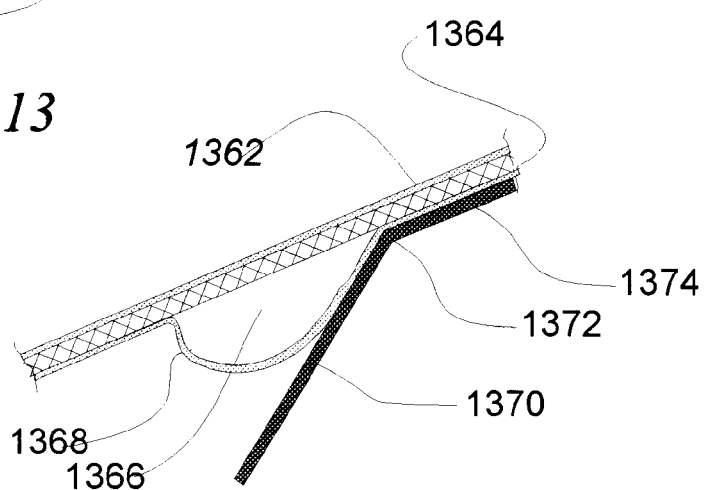
FIG. 13A is an enlargement of the variable vent of FIG. 13 taken along line 13A—13A of FIG. 13.

As an alternate to providing a fixed vent hole as illustrated in the previous examples, a variable vent hole can be provided as shown in FIGS. 13 and 13A (discussed below). Alternately this variable vent function can be incorporated within the inflator as illustrated in U.S. Pat. No. 5,772,238.

In a conventional air bag module, when the inflator is initiated, gas pressure begins to rise in the air bag which begins to press on the deployment door. When sufficient force is present, the door breaks open along certain well-defined weakened seams permitting the air bag to emerge from its compartment. The pressure in the air bag when the door opens, about 10 to 20 psi, is appropriate for propelling the air bag outward toward the occupant, the velocity of which is limited by the mass of the air bag. In the case of a film air bag, this mass is substantially less, perhaps by as much as a factor of ten, causing it to deploy at a much higher velocity if subjected to these high pressures. This will place unnecessary stresses in the material and the rapid movement of the air bag past the deployment door could induce abrasion and tearing of the film by the deployment door. A film air bag, therefore, must be deployed at a substantially lower pressure. However, conventional deployment doors require this higher pressure to open. This problem is discussed in detail in the above-referenced patents and patent applications where, in one implementation, a pyrotechnic system is used to cut open the door according to the teachings of the Barnes et al. patent (U.S. Pat. No. 5,390, 950).

Figure 7:
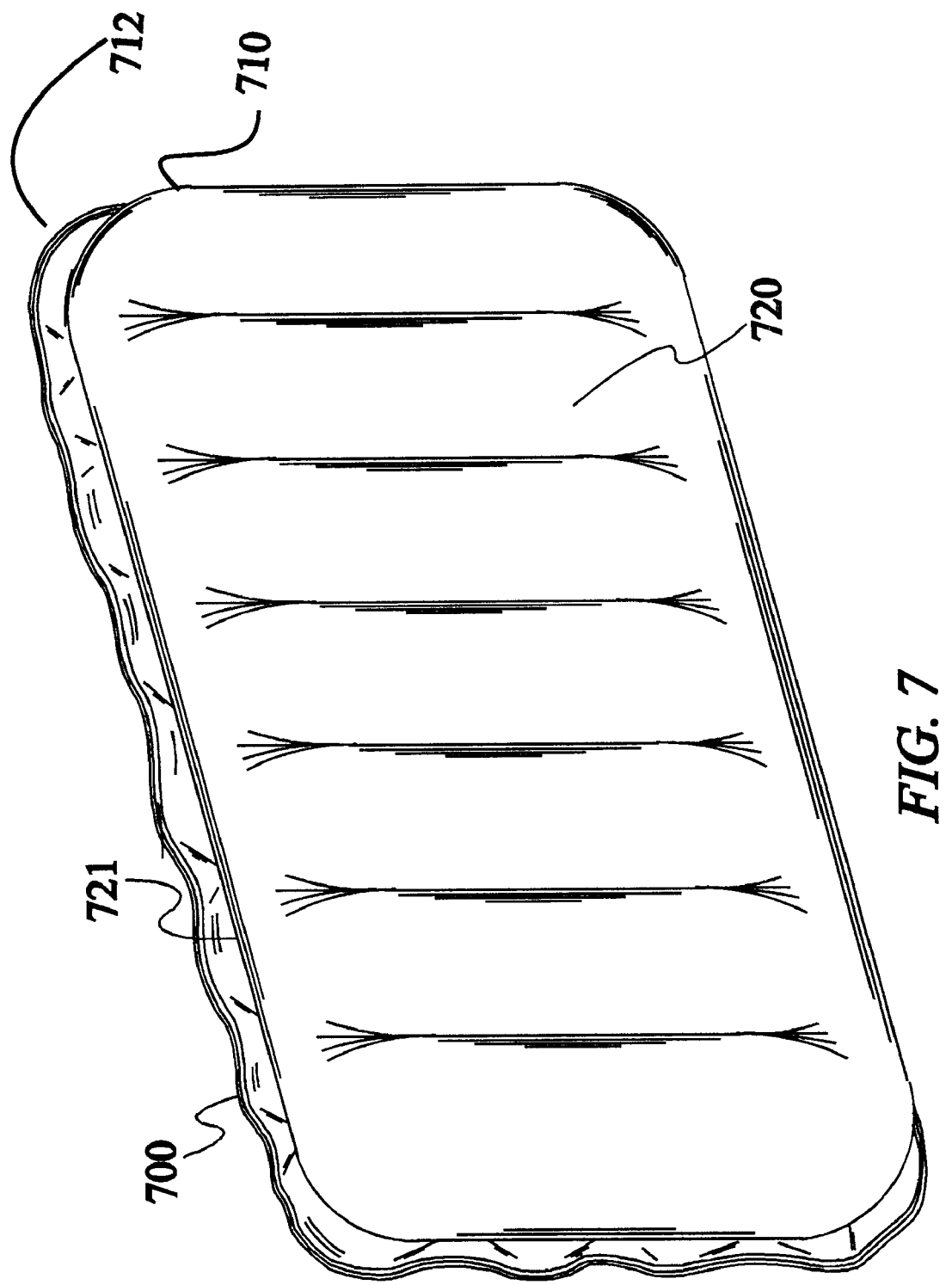
FIG. 7 is a perspective view of an air bag and inflator system where the air bag is formed from tubes.

One method of forming a film air bag is illustrated generally at 700 in FIG. 7. In this implementation, the air bag is formed from two flat sheets or layers of film material 710,712 which have been heat or adhesive sealed at joints 721 to form long tubular shaped mini-air bags 720 (also referred to herein as compartments or cells) in much the same way that an air mattress is formed. In FIG. 7, a single layer of mini-air bags 720 is shown. It should be understood that the mini-air bags 720 are interconnected to one another to allow the inflating gas to pass through all of the interior volume of the air bag 700. Also, the joints 721 are formed by joining together selected, opposed parts of the sheets of film material 710,712 along parallel lines whereby the mini-air bags 720 are thus substantially straight and adjacent one another. In other implementations, two or more layers would be used. Also, although a tubular pattern has been illustrated, other patterns are also possible such as concentric circles, waffle-shaped or one made from rectangles, or one made from a combination of these geometries or others. The film air bag 700 may be used as either a side air bag extending substantially along the entire side of the vehicle or as a rear seat air bag extending from one side of the vehicle to the other behind the front seat (see FIG. 8).and may include any of the venting arrangements described herein.

Figure 8:
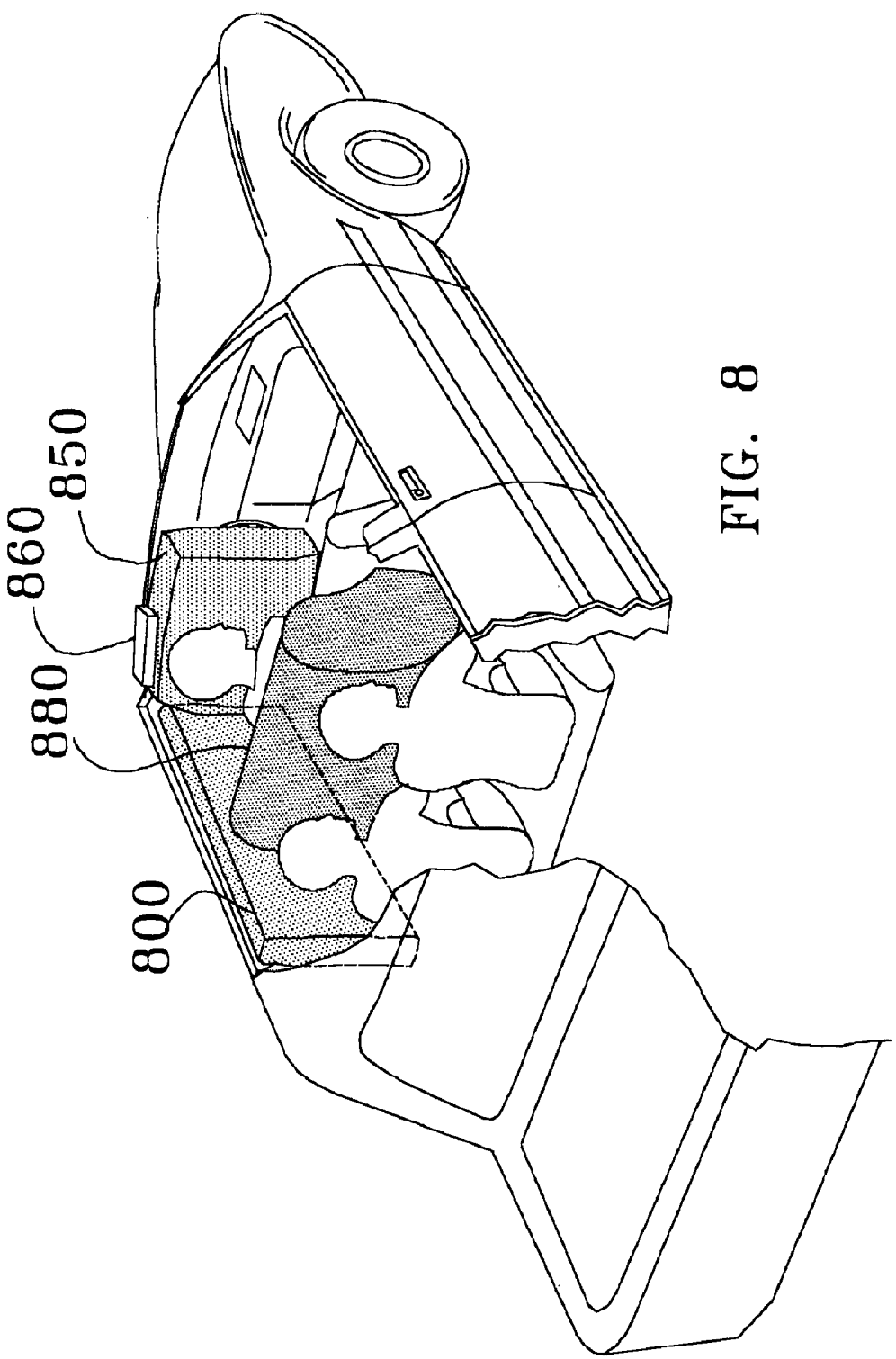
FIG. 8 is a perspective view with portions removed of a vehicle having several deployed film air bags.

FIG. 8 is a perspective view with portions removed of a vehicle having several deployed film air bags. Specifically, a single film air bag having several interconnected sections spans the left side of the vehicle and is deployed downward before being filled so that it fits between the front seat and the vehicle side upon inflation (an air bag spanning the right side of the vehicle can of course be provided). This provides substantial support for the air bag and helps prevent the occupant from being ejected from the vehicle even when the side window glass has broken. A system which also purports to prevent ejection is described in Bark (U.S. Pat. Nos. 5,322,322 and 5,480,181). The Bark system uses a small diameter tubular air bag stretching diagonally across the door window. Such a device lacks the energy absorbing advantages of an air bag since it does not have an exhaust vent. In fact, the device can act as a spring and can cause the head of the occupant to rebound and actually experience a higher velocity change than that of the vehicle. This can cause severe neck injury in high velocity crashes. It also is designed to protect primarily the head of the occupant, offering little protection for the other body parts. In contrast to the completely sealed air bag of Bark, the film air bag of the present invention has energy absorbing vents and thus dampens the motion of the occupant's head and other body parts upon impact with the film air bag. It covers the entire vehicle opening and receives support from the vehicle structure, e.g., it extends from one side of the B-pillar to the other so that the B-pillar supports the air bag 800. In contrast to the Bark tube, this support does not require complicated mounting apparatus going around the vehicle door and down the A-pillar but is only mounted to or in the ceiling above the side door(s). Also, by giving support to the entire body and adjusting the pressure between the body parts, the air bag of the present invention minimizes the force on the neck of the occupant and thus minimizes neck injuries.

In FIG. 8, the single side protection air bag for the driver side is illustrated at 800. A single front air bag spans the front seat for protection in frontal impacts and is illustrated at 850 with the ceiling mounted inflator at 860. A single air bag is also used for protection of each of the rear seat occupants in frontal impacts and is illustrated at 880. With respect to the positioning of the side air bag 800, the air bag 800 is contained within a housing 810 which is position entirely above the window of the side doors, i.e., no portion of it extends down the A-pillar or the B-pillar of the vehicle (as in Bark). The side air bag housing 810 thus includes mounting means (not shown) for mounting it above the window to the ceiling of the vehicle and such that it extends across both side doors (when present in a four-door vehicle) and thus protects the occupants sitting on that side of the vehicle from impacting against the windows in the side doors. To ensure adequate protection for the occupants from side impacts, as well as frontal impacts and roll-overs which would result in sideward movement of the occupants against the side doors, the air bag housing 810 is constructed so that the air bag 800 is initially projected in a downward direction from the ceiling prior to inflation and extends at least substantially along the entire side of the ceiling. This initial projection may be designed as a property of the module 810 which houses the air bag 800, e.g., by appropriate construction and design of the module and its components such as the dimensioning the module's deployment door and deployment mechanism.

Although any type of air bag can be used as the side impact protection air bag, one preferred implementation is when the air bag comprises first and second attached non-perforated sheets of film and tear propagation arresting means arranged in connection with each of the film sheets for arresting the propagation of a tear therein. A net may also be used as described above. The net would constrict or tension the air bag if it were to be designed to retain an interior volume less than the volume of the air bag (as discussed above).

The air bag should include venting means (e.g., a venting aperture as shown in FIGS. 3A and 3B) arranged in connection with the air bag for venting the air bag after inflation thereof. In certain embodiments, the air bag is arranged to extend at least along a front portion of the ceiling such that the air bag upon inflation is interposed between a passenger in the front seat of the vehicle and the dashboard (this aspect being discussed below with respect to FIG. 12).

Figure 9:
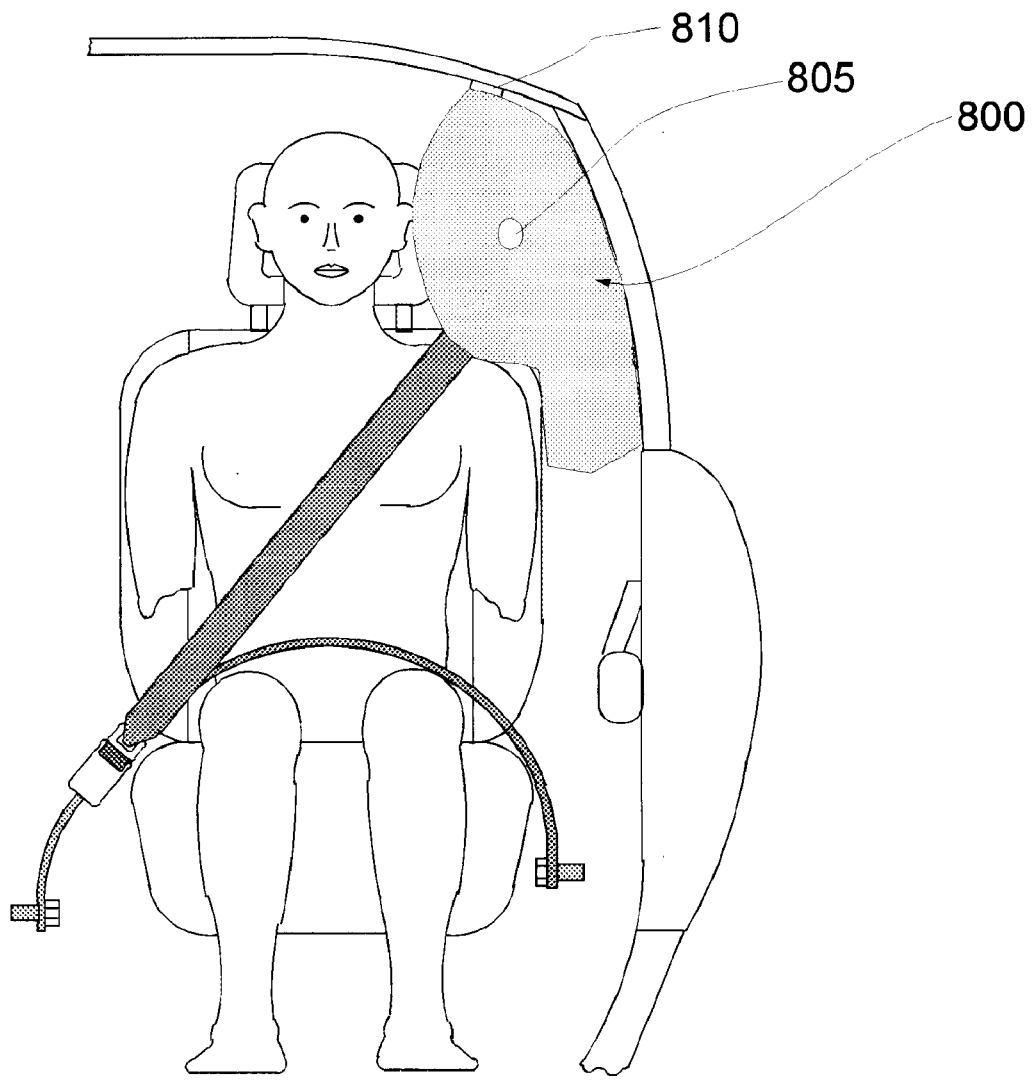
FIG. 9 is a view of another preferred embodiment of the invention shown mounted in a manner to provide protection for a front and a rear seat occupant in side impact collisions and to provide protection against impacts to the roof support pillars in angular frontal impacts.

FIG. 9 is a view looking toward the rear of the vehicle of the deployed side protection air bag of FIG. 8 where like numbers represent the same parts in both drawings. Here the air bag vent is illustrated as a fixed opening 805. Naturally, other ventings are possible including venting through the air bag inflator as disclosed in the above-referenced patents and patent applications as well as the variable vent described below with reference to FIGS. 13 and 13A.

It can be seen that the lower edge of the air bag 810 tapers and that the air bag 810 covers the height of the window in the door.

Figure 9A:
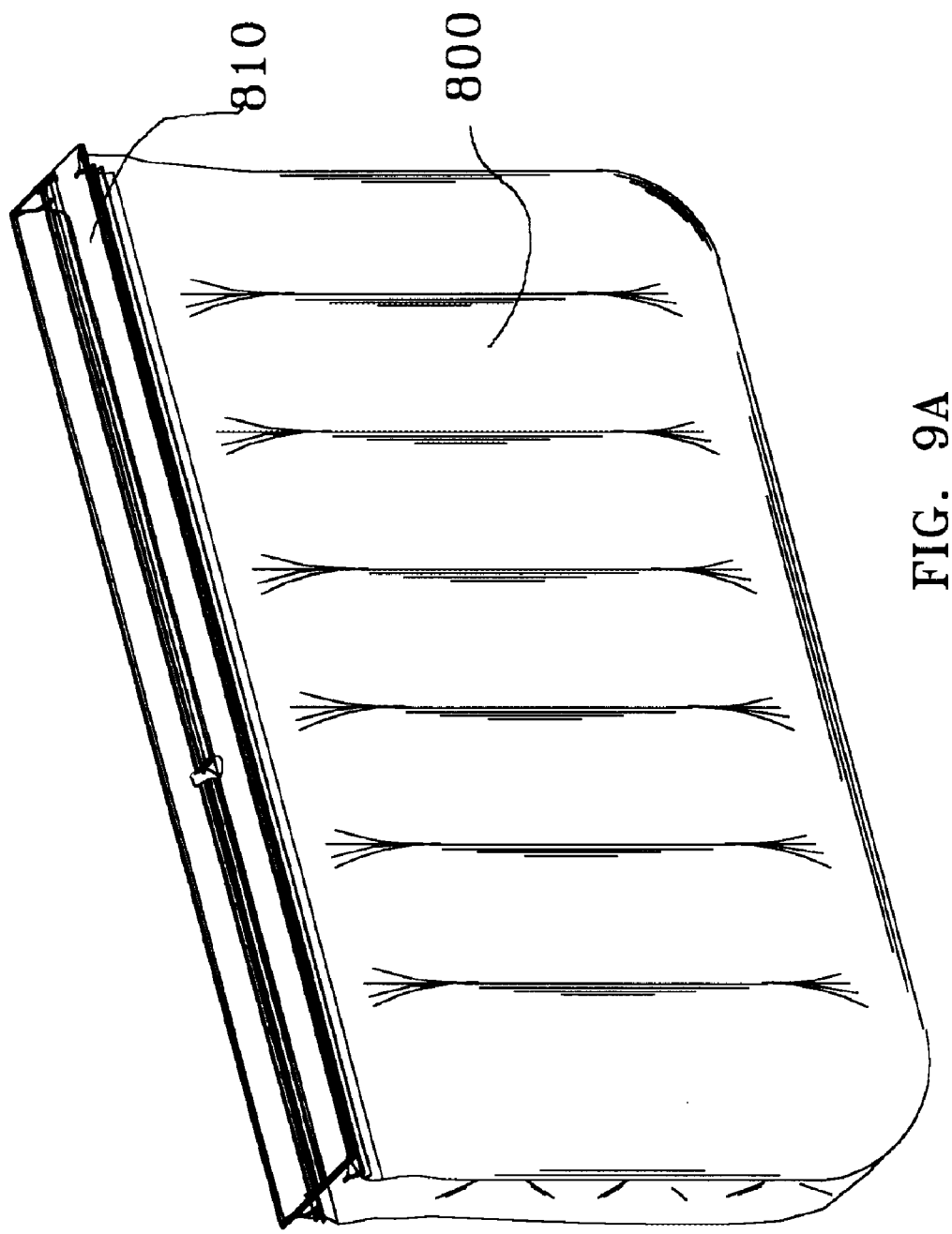
FIG. 9A is a view of the side air bag of FIG. 9 of the side air bag with the air bag removed from the vehicle.

FIG. 9A is a view of the side air bag of FIG. 9 with the air bag removed from the vehicle where like numbers represent like parts. The parallel compartments or cells can be seen. This aspect is discussed below with reference to FIGS. 17–19.

FIGS. 10, 11 and 11A–11D illustrate the teachings of this invention applied in a manner similar to the air bag system of Ohm in U.S. Pat. No. 5,322,326. The air bag of the Ohm patent is a small limited protection system designed for the aftermarket. It uses a small compressed gas inflator and an unvented thin air bag which prevents the occupant from contacting with the steering wheel but acts as a spring causing the occupants head to rebound from the air bag with a high velocity. The system of FIG. 10 improves the performance of and greatly simplifies the Ohm design by incorporating the sensor and compressed gas inflator into the same mounting assembly which contains the air bag. The system is illustrated generally at 900 in FIG. 10 where the mounting of the system in the vehicle is similar to that of Ohm.

Figure 10:
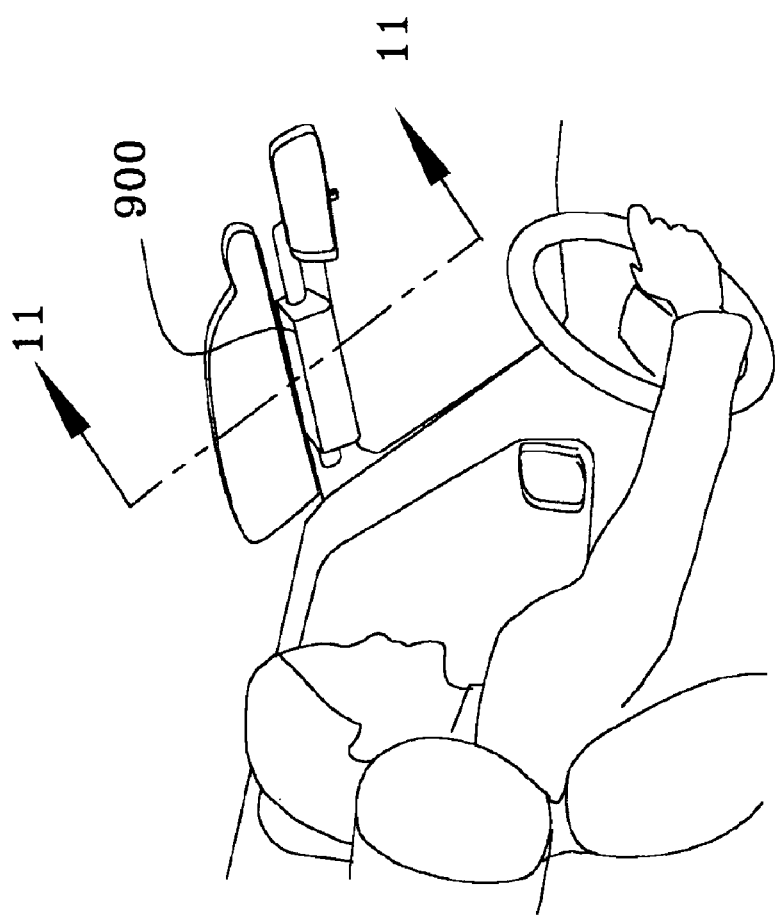
FIG. 10 is a partial view of the interior driver area of a vehicle showing a self-contained air bag module containing the film air bag of this invention in combination with a stored gas inflator.
Figure 11:
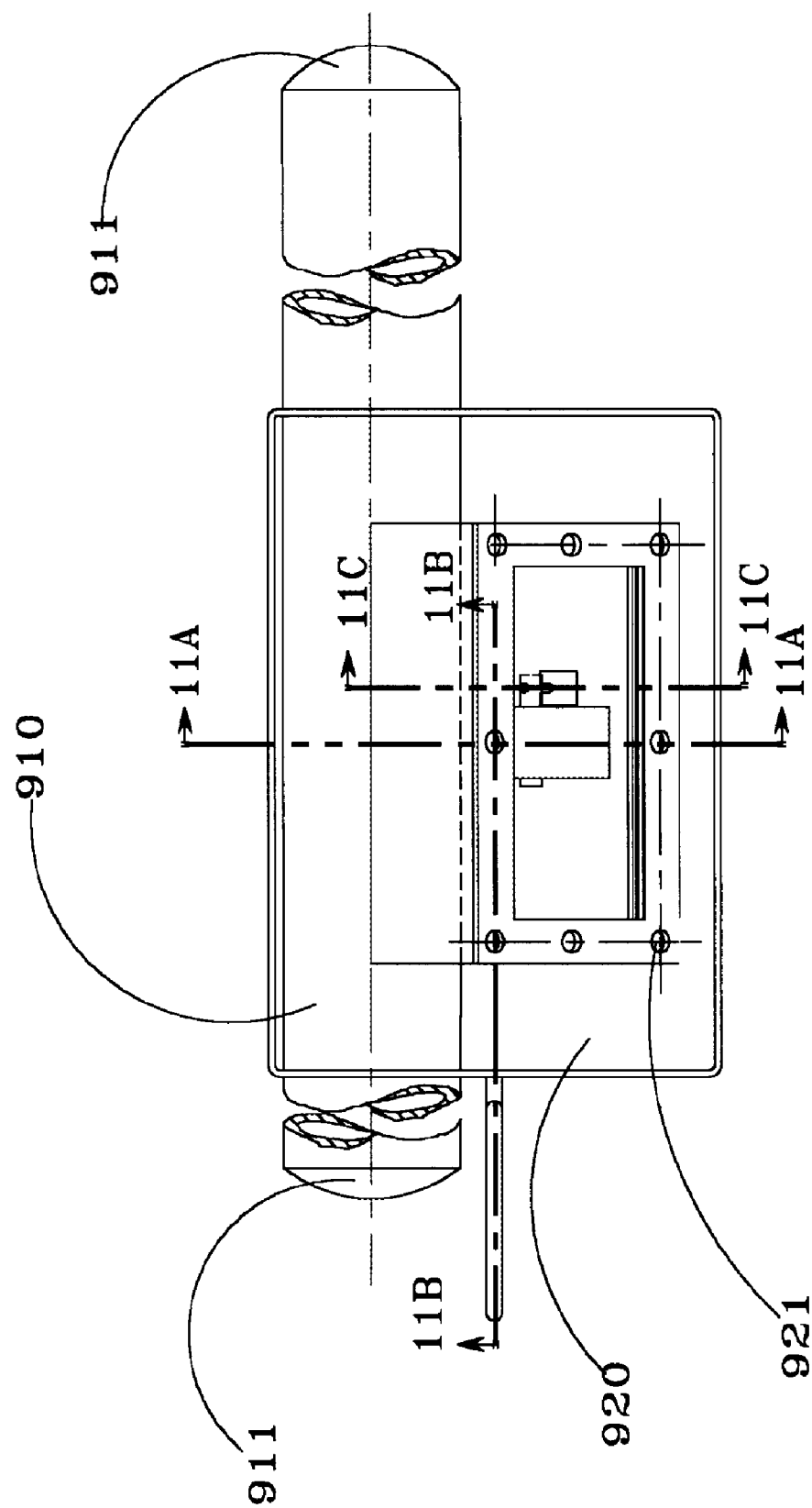
FIG. 11 is a view looking toward the rear of the air bag module of FIG. 10 with the vehicle removed taken at 11—11 of FIG. 10.

In FIG. 11, the module assembly is illustrated from a view looking toward the rear of the air bag module of FIG. 10 with the vehicle removed, taken at 11—11 of FIG. 10. The module 900 incorporates a mounting plate 901, a high pressure small diameter tube constituting an inflator 910 and containing endcaps 911 which are illustrated here as having a partial spherical surface but may also be made from flat circular plates. The mounting plate 901 is attached to the vehicle using screws, not illustrated, through mounting holes 921. An arming pin 985 is illustrated and is used as described below.

Figure 11A:
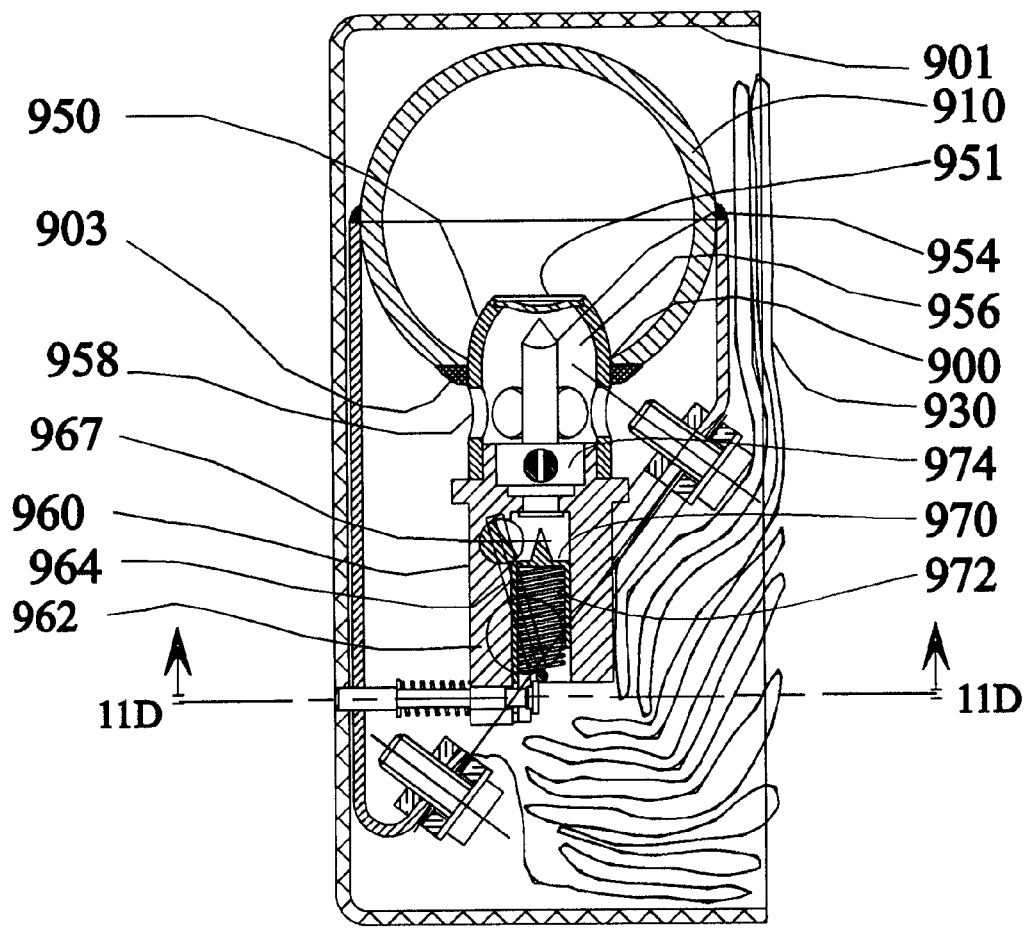
FIG. 11A is a cross sectional view of the air bag module of FIG. 11 taken at 11A—11A.

FIG. 11A is a cross section view of the air bag module of FIG. 11 taken at 11A—11A and illustrates the inflator initiation system of this invention. The inflator 910 is illustrated as a cylindrical tube, although other cross section shapes can be used, which contains a hole 900 therein into which is welded by weld 903 an initiation assembly 950. This assembly 950 has a rupture disk 951 welded into one end which will now be described in more detail. A rupture pin 954 is positioned adjacent rupture disk 951 which will be propelled to impact the rupture disk in the event of an accident as described below. When disk 951 is impacted by pin 954 it fails opening essentially all of the orifice covered by disk 951 permitting the high pressure gas which is in inflator tube 910 to flow out of the tube into cavity 956 of initiator assembly 950 and then through holes 958 into cavity 960. Cavity 960 is sealed by the air bag 930 which now deploys due to the pressure from the gas in cavity 960.

When the vehicle experiences a crash of sufficient severity to require deployment of the air bag 930, sensing mass 962, shown in phantom, begins moving to the left in the drawing toward the front of the vehicle. Sensing mass 962 is attached to shaft 964 which in turn is attached to D-shaft 966. As mass 962 moves toward the front of the vehicle, D-shaft 966 is caused to rotate. Firing pin 970 is held and prevented from moving by edge 967 of D-shaft 966. However, when D-shaft 966 rotates sufficiently, edge 967 rotates out of the path of firing pin 970 which is then propelled by spring 972 causing the firing pin point 973 to impact with primer 974 causing primer 974 to produce high pressure gas which propels pin 954 to impact disk 951 releasing the gas from inflator tube 910 inflating the air bag as described above. This sensor, D-shaft and primer mechanism is similar to mechanisms described in U.S. Pat. No. 5,842,716 which is included herein by reference and therefore will not be described in more detail here.

Figure 11B:
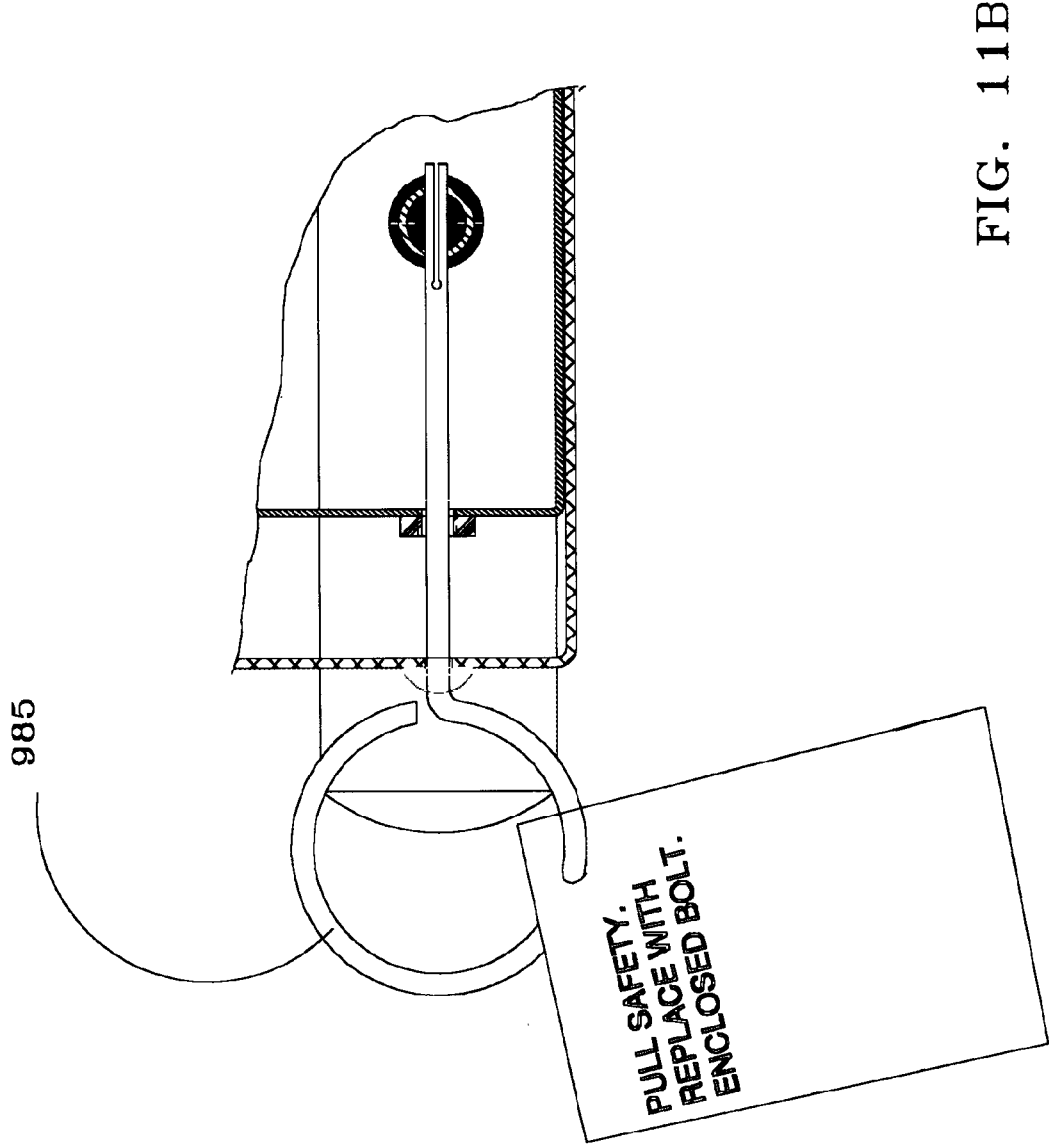
FIG. 11B is a cross sectional view, with portions cutaway and removed, of the air bag module of FIG. 11 taken at 11B—11B.
Figure 11C:
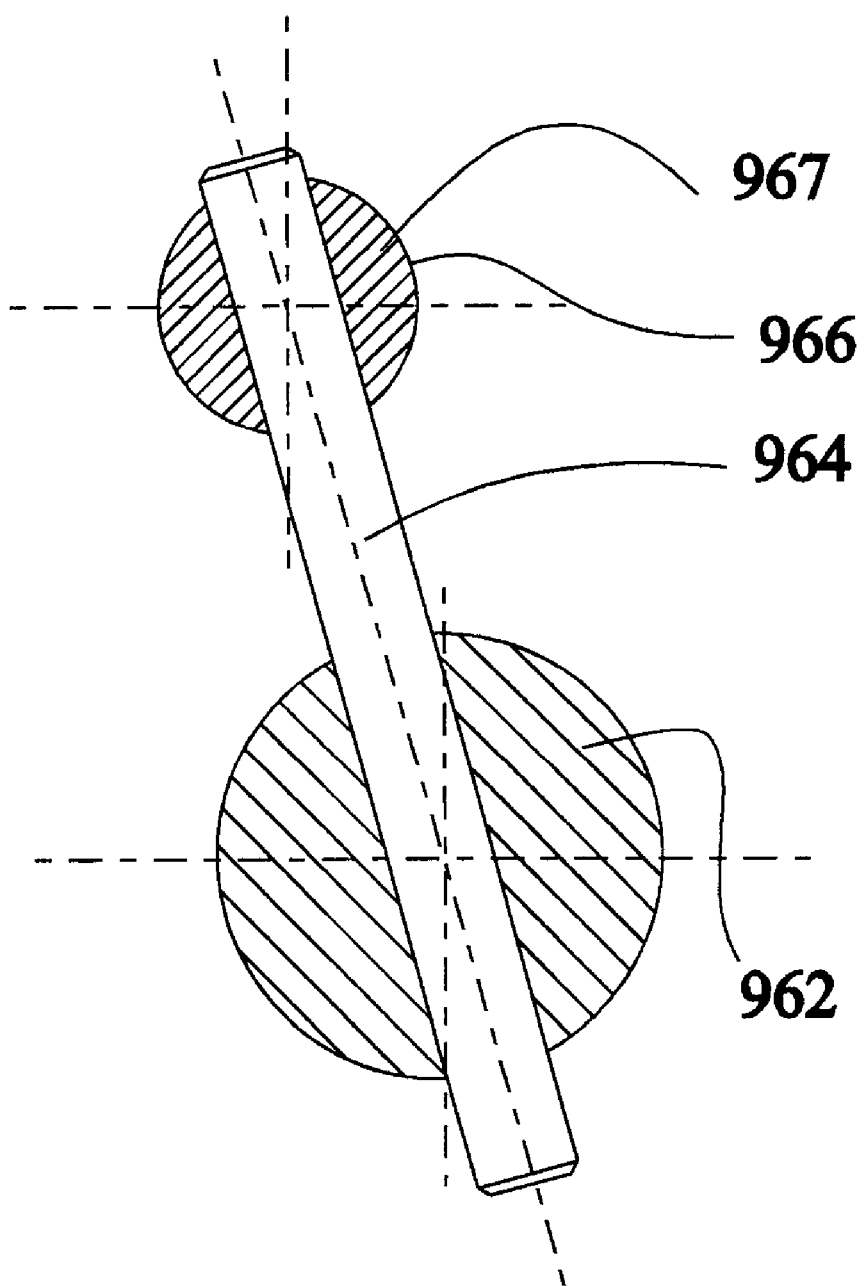
FIG. 11C is a cross sectional view of the air bag module of FIG. 11 taken at 11C—11C.
Figure 11D:
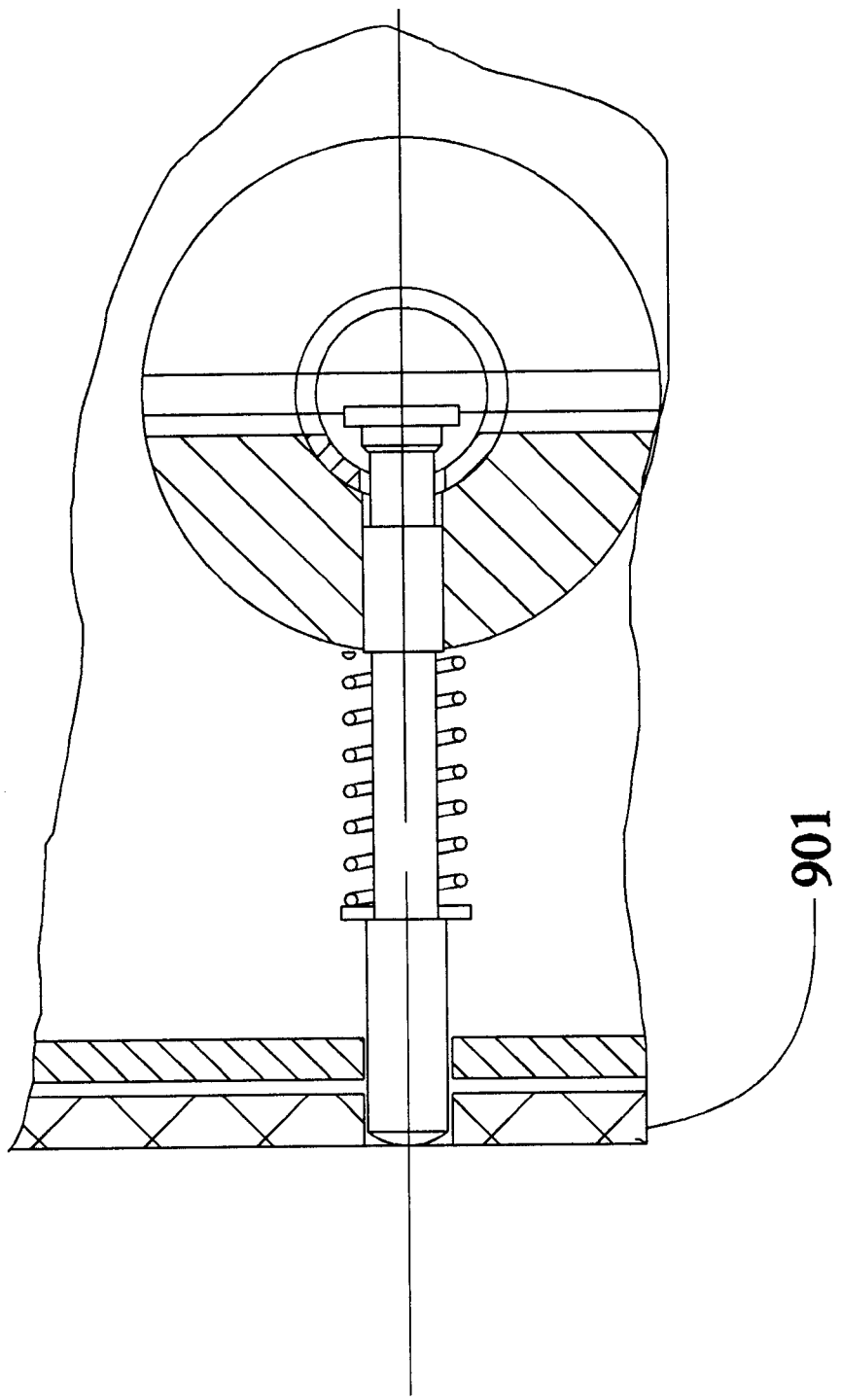
FIG. 11D is a cross sectional view of the air bag module of FIG. 11A taken at 11D—11D.

FIG. 11B is a cross section view, with portions cutaway and removed, of the air bag module of FIG. 11 taken at 11B—11B and illustrates the arming pin 985 which is removed after the module is mounted onto the vehicle. If the module were to be dropped accidentally without this arming pin 985, the sensor could interpret the acceleration from an impact with the floor, for example, as if it were a crash and deploy the air bag. The arming system prevents this from happening by preventing the sensing mass from rotating until the pin 985 is removed.

Figure 12:
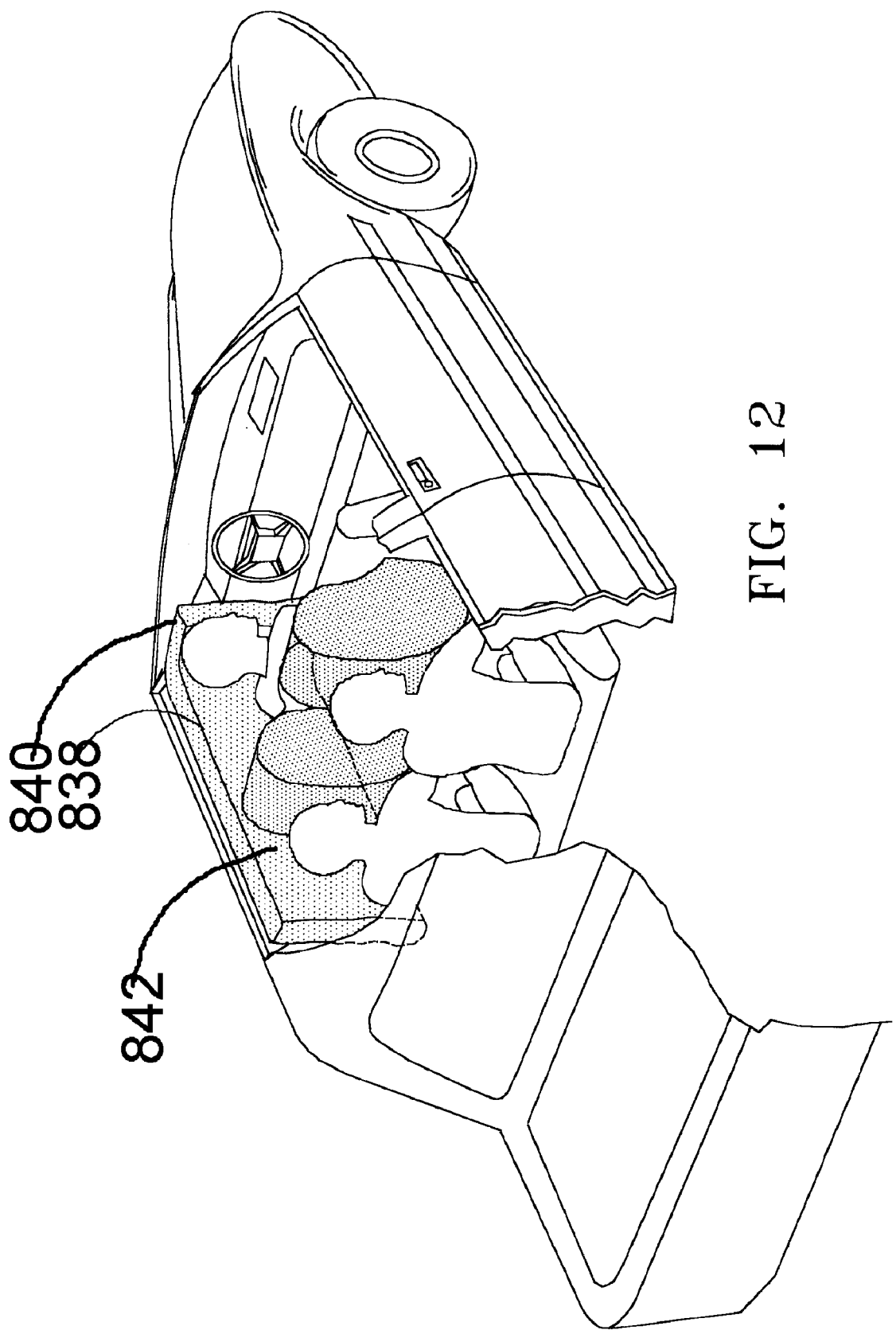
FIG. 12 is a perspective view of another preferred embodiment of the invention shown mounted in a manner to provide protection for a front and a rear seat occupant in side impact collisions, to provide protection against impacts to the roof support pillars in angular frontal impacts and to offer some additional protection against ejection of the occupant or portions of the occupant.

FIG. 12 is a perspective view of another preferred embodiment of the air bag of this invention 838 shown mounted in a manner to provide protection for a front and a rear seat occupant in side impact collisions and to provide protection against impacts to the roof support pillars in angular frontal impacts and to offer some additional protection against ejection of the occupant.

More particularly, in this embodiment, an air bag system for protecting at least the front-seated occupant comprises a single integral air bag 838 having a frontal portion 840 sized and shaped for deploying in front of the front-seated occupant and a side portion 842 sized and shaped for deploying to the side of the front-seated occupant. In this manner, air bag 838 wraps around the front-seated occupant during deployment for continuous front to side coverage. An inflator (not shown) is provided for inflating the single integral air bag with gas. As shown, the side portion 842 may be sized and shaped to deploy along an entire side of the vehicle, the side portion 842 is longer than the frontal portion 840 and the frontal portion 840 and side portion 842 are generally 90 degrees relative to each other. As with the other side curtain air bags discussed in connection with FIGS. 8, 9, 9A and 12, the air bag 838 may be housed in the ceiling. Also, as noted throughout this application, air bag 838 may comprise one or more sheets of film and the tear propagation arresting means or a net may be provided to tension or constrict the deployment of the air bag 838.

As an alternate to providing a fixed vent hole as illustrated in the previous examples, a variable vent hole can be provided as shown in FIGS. 13 and 13A, FIG. 13 being a partial cutaway perspective view of a driver side air bag made from film having a variable vent in the seam of the air bag. In this embodiment of an air bag, a hinged elastic member or flap 1370 is biased so that it tends to maintain vent 1360 in a closed position. As pressure rises within the air bag, the vent 1360 is forced open as shown in FIG. 13 and FIG. 13A, which is a detail of the vent 1360 shown in FIG. 13 taken along line 13A—13A of FIG. 13. This construction enables the use of a smaller inflator and also reduces the maximum chest acceleration of the occupant in a crash and more accurately controls the deceleration of the occupant. In FIGS. 13 and 13A, vent 1360 contains a opening 1366 formed between film layer 1368 and reinforcement member 1364. Film layer 1362 is also sealed to reinforcing member 1364. Member 1370 is attached to reinforcing member 1364 through film 768. A weakened section 1372 is formed in member 1370 to act as a hinge. The elasticity of the material, which may be either metal or fiber reinforced plastic or other suitable material, is used to provide the biasing force tending to hold the variable opening closed.

Figure 14:
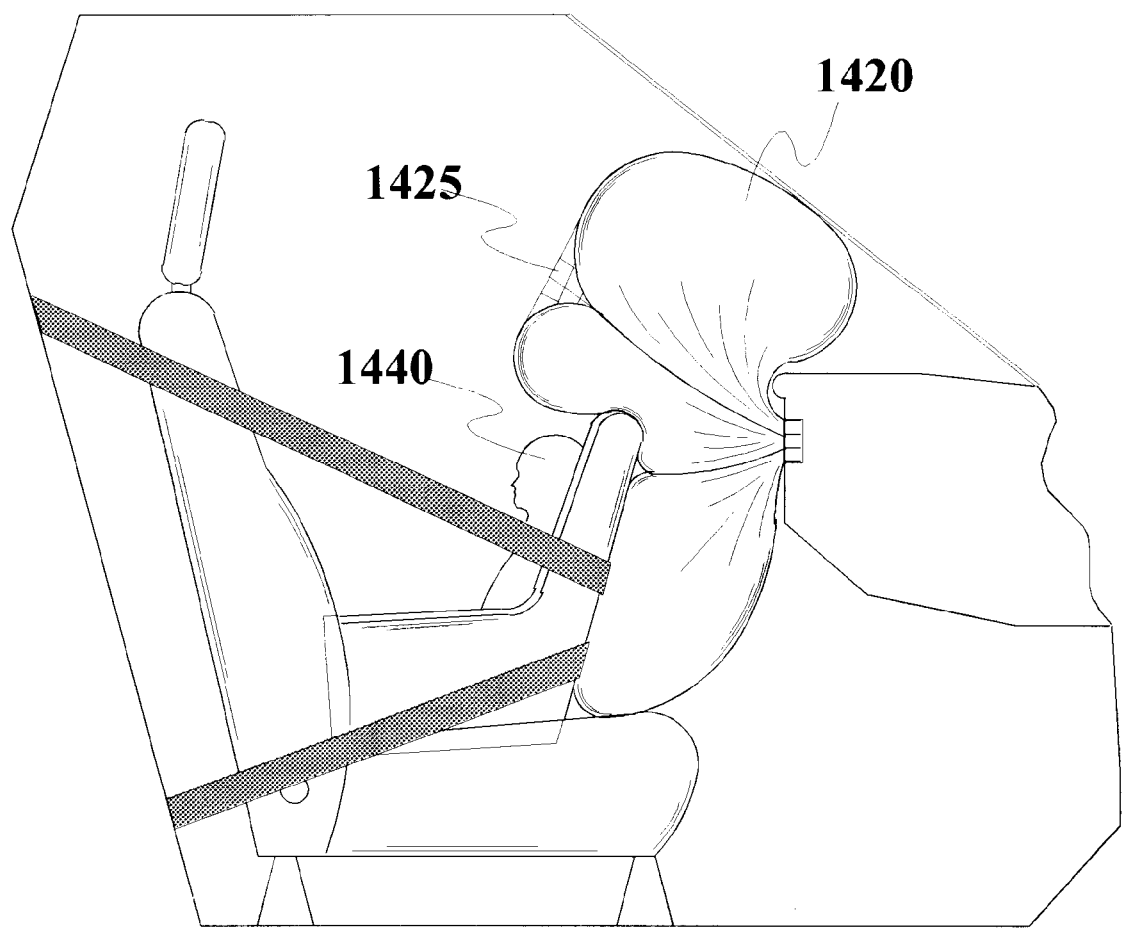
FIG. 14 is a perspective view of a self limiting air bag system composed of a multiplicity of air bags surrounded by a net, most of which has been cutaway and removed, designed to not cause injury to a child in a rear facing child seat.

In FIG. 14, the advantages of the self limiting air bag system disclosed herein and in more detail in U.S. Pat. No. 5,772,238 and with reference to FIG. 8 above, when used with a rear facing child seat, are illustrated. In this case, where multiple film air bags are illustrated, the air bags deploy but the deployment process stops when each of the film air bags interacts with the child seat and the pressure within each bag rises to where the flow is stopped. In this case, the child 1440 is surrounded by air bags 1420 and further protected from the accident rather than being injured as is the case with current design air bags. The air bags 1420 are additionally surrounded by a net 1425 most of which has been cutaway and removed in the figure. Naturally, in other implementations a single air bag will be used in place of the multiple air bags illustrated here.

The self-limiting feature is illustrated here by either a variable orifice exhaust port in the air bag or, preferably, provision is made in the air bag inflator itself as illustrated in the referenced '238 patent where a close-down of the aspiration system is used during the deployment portion of the process and a smaller variable orifice is used during the deflation portion. The aspiration cutoff can be designed so that the air bag deploys until the pressure begins to rise within the bag which then stops the inflation process, closes the aspiration ports and the air bag then becomes stiffer to absorb the kinetic energy of the impacting occupant. Thus, during the deployment phase, very little force is placed in the occupant, or the child seat, but as the occupant begins to move into and load the air bag, substantial force is provided to limit his or her motion.

Figure 15:
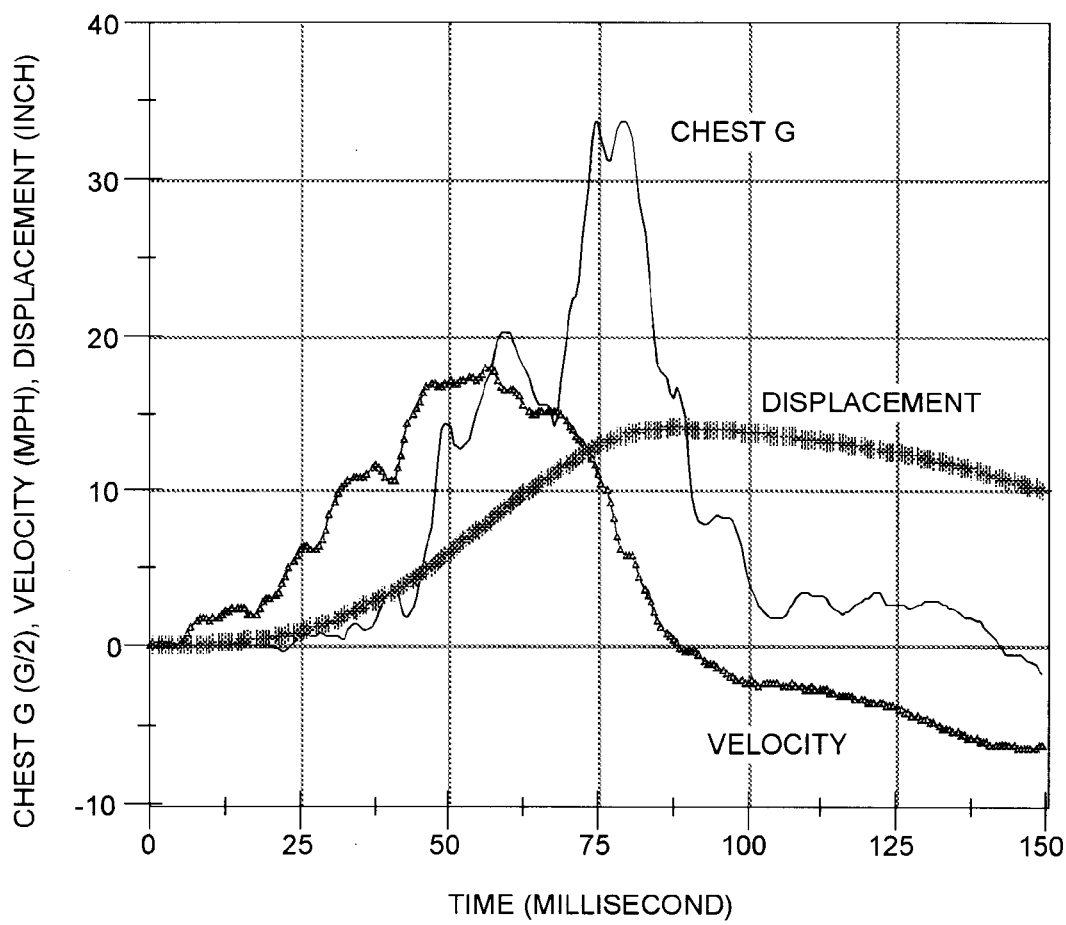
FIG. 15 shows a plot of the chest acceleration of an occupant and the occupant motion using a conventional air bag.
Figure 16:
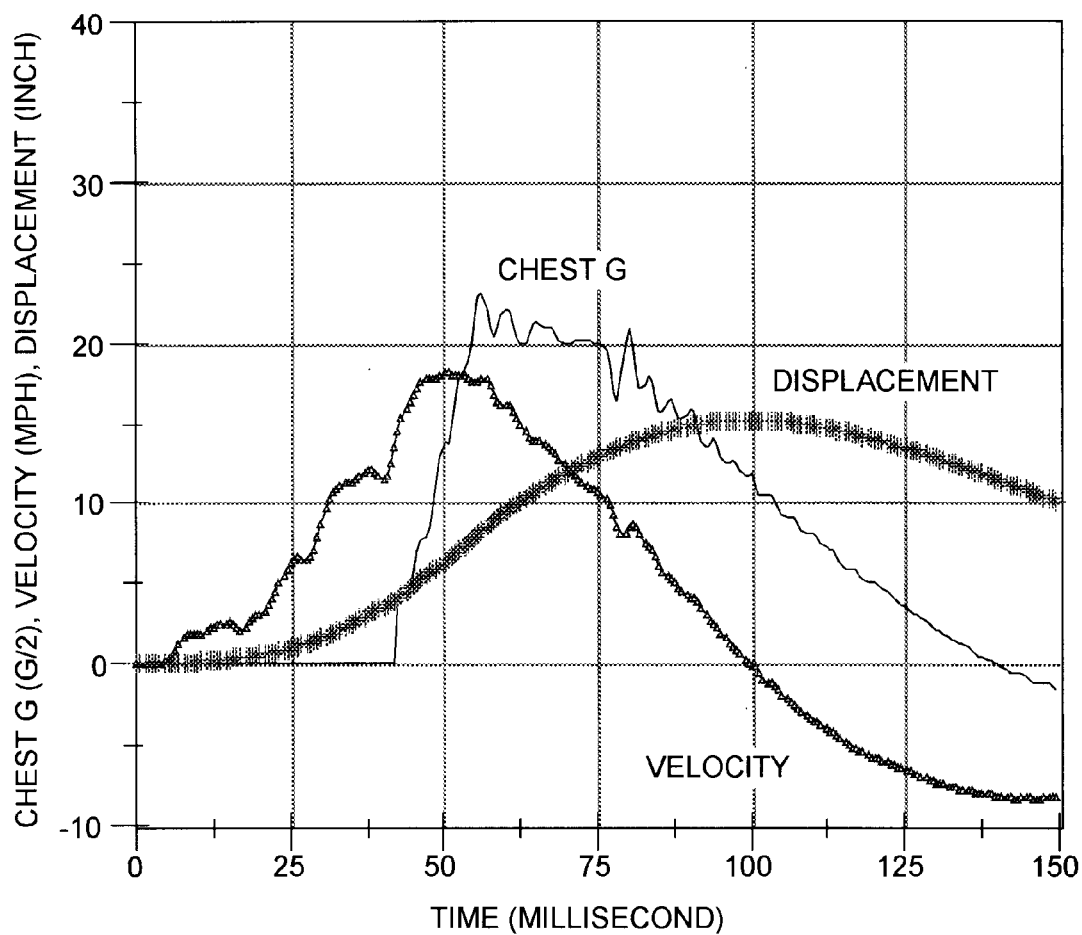
FIG. 16 shows the chest acceleration of an occupant and the resulting occupant motion when the variable orifice of this invention is utilized.

FIG. 15 shows a typical chest G pulse experienced by an occupant and the resulting occupant motion when impacting an air bag during a 35-MPH frontal impact in a small vehicle. When the variable orifice air bag is used in place of the conventional air bag, the chest acceleration curve is limited and takes the shape similar to a simulation result shown in FIG. 16. Since it is the magnitude of the chest acceleration that injures the occupant, the injury potential of the air bag in FIG. 16 is substantially less than that of FIG. 15.

Since the variable exhaust orifice remains closed as long as the pressure in the air bag remains below the set value, the inflator need only produce sufficient gas to fill the air bag once. This is approximately half of a gas which is currently produced by standard inflators. Thus, the use of a variable orifice significantly reduces the total gas requirement and therefore the size, cost and weight of the inflator. Similarly, since the total amount of gas produced by all inflators in the vehicle is cut approximately in half, the total amount of contaminants and irritants is similarly reduced or alternately each inflator used with the variable orifice air bag is now permitted to be somewhat dirtier than current inflators without exceeding the total quantity of contaminants in the environment. This in turn, permits the inflator to be operated with less filtering, thus reducing the size and cost of the inflator.

The characteristics of inflators vary significantly with temperature. Thus, the mass flow rate of gas into the air bag similarly is a significant function of the temperature of the inflator. In conventional fixed orifice air bags, the gas begins flowing out of the air bag as soon as positive pressure is achieved. Thus, the average pressure in the air bag similarly varies significantly with temperature. The use of a variable orifice system as taught by this invention however, permits the bags to be inflated to the same pressure regardless of the temperature of the inflator. Thus, the air bag system will perform essentially the same whether operated at cold or hot temperature, removing one of the most significant variables in air bag performance. The air bag of this invention provides a system which will function essentially the same at both cold and hot temperatures.

The variable orifice air bag similarly solves the dual impact problem where the first impact is sufficient to trigger the crash sensors in a marginal crash where the occupant is wearing a seatbelt and does not interact with the air bag. A short time later in a subsequent more serious accident, the air bag will still be available to protect the occupant. In conventional air bags using a fixed orifice the gas generator may have stopped producing gas and the air bag may have become deflated.

Since the total area available for exhausting gas from the air bag can be substantially larger in the variable orifice air bag, a certain amount of protection for the out-of-position occupant is achieved even when the aspiration system of the referenced '238 patent is not used. If the occupant is close to the air bag when it deploys, the pressure will begin to build rapidly in the air bag. Since there is insufficient time for the gas to be exhausted through the fixed orifices, this high pressure results in high accelerations on the occupant's chest and can cause injury. In the variable orifice embodiment, however, the pressure will reach a certain maximum in the air bag and then the valve would open to exhaust the gas as fast as the gas generator is pumping gas into the air bag thus maintaining a constant and lower pressure than in the former case. Naturally, the bag must be sufficiently deployed for the valve to be uncovered so that it can operate. Alternately, the valving system can be placed in the inflator and caused to open even before the cover opens thereby handling the case where the occupant is already against the deployment door when the air bag deployment is initiated.

Many geometries can be used to achieve a variable orifice in an air bag. These include very crude systems such as slits placed in the bag in place of round exhaust vents, rubber patches containing one or more holes which are sewn into the bag such that the hole diameter gets larger as the rubber stretches in response to pressure in the bag, plus a whole variety of flapper valves similar to that disclosed in this invention. Slit systems, however, have not worked well in experiments and rubber patches are effected by temperature and thus are suitable only for very crude systems. Similarly, the bag itself could be made from a knitted material, which has the property that its porosity is a function of the pressure in the bag. Thus, once again, the total amount of gas flowing through the bag becomes a function of the pressure in the bag.

Although the case where the pressure is essentially maintained constant in the bag through the opening of a valve has been illustrated, it is possible that for some applications a different function of the pressure in the bag may be desirable. Thus, a combination of a fixed orifice and variable valve might be desirable. The purpose of adjusting the opening area of an air bag vent hole is to control the gas flow rate out of the vent hole according to the pressure inside the air bag. If the pressure is higher, then the area of the vent hole becomes larger and allows more gas to flow out. By regulating the pressure inside an air bag, the force applied on an occupant is minimized.

Figure 17:
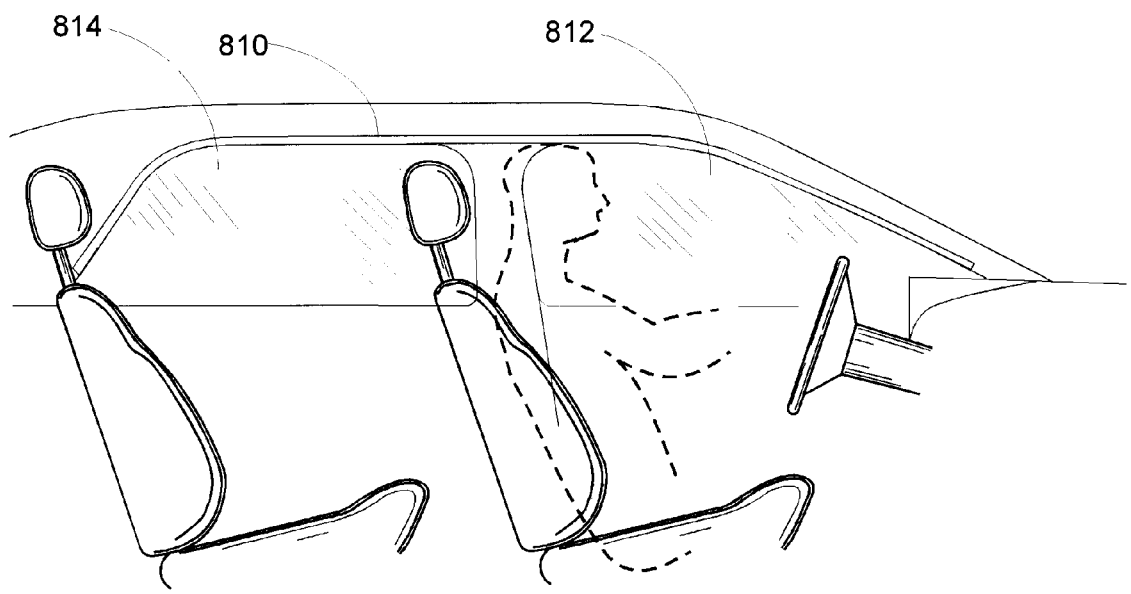
FIG. 17 is a side view of the interior of a motor vehicle provided with another form of safety device in accordance with the invention, before the safety device moves to the operative state.
Figure 18:
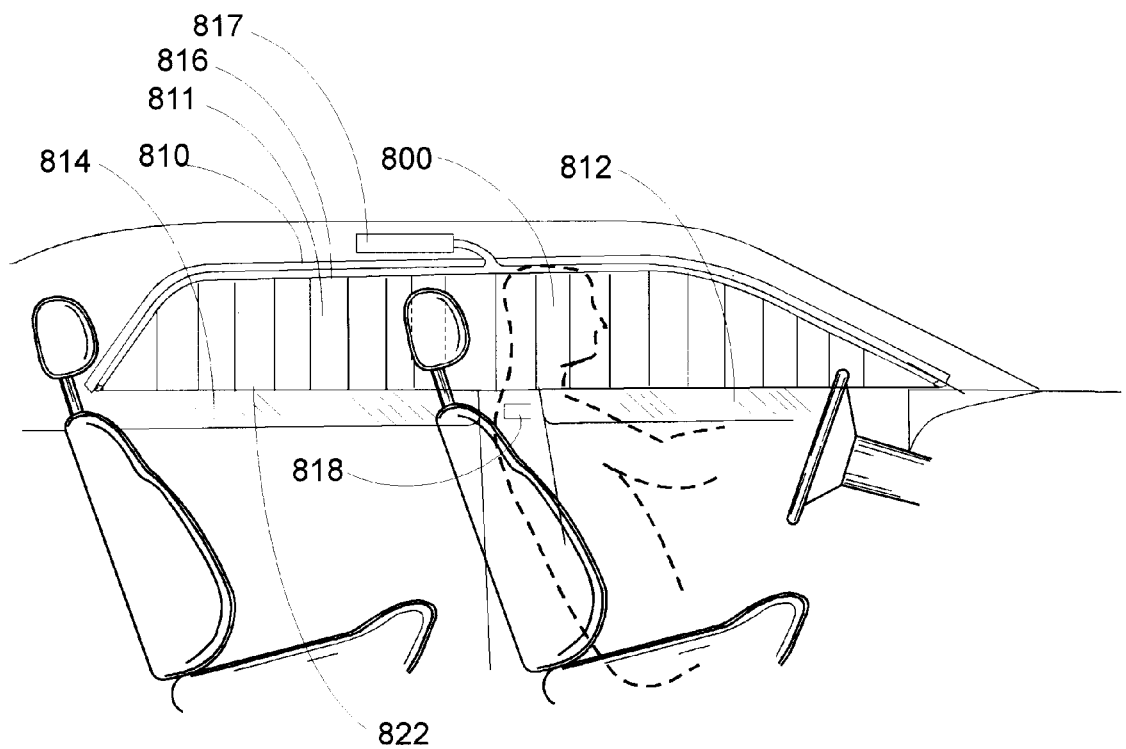
FIG. 18 illustrates the vehicle of FIG. 17 when the safety device is in the operative state.

FIGS. 17 and 18 illustrate another embodiment of the invention intended to provide protection not only for a person in the front seat of a motor vehicle such as a motor car, but also for a person in the rear seat of the vehicle (similar to that shown in FIGS. 8, 9 and 9A).

Referring to FIG. 17, the housing 810 is provided over both the front door 812 and the rear door 814. The air bag or other type of inflatable element 811 is shown in the inflated state in FIG. 18. The inflatable element 811 has its top edge 816 secured to a part of the housing 810 or ceiling of the passenger compartment that extends above the doors 812, 814 of the motor vehicle (see, e.g., FIG. 9A). The design of the inflatable element is similar to that shown in FIG. 7 or 9A, with the inflatable element presenting a plurality of parallel cells or compartments 822, which when inflated are substantially cylindrical. A gas generator 817 is provided which is connected to the inflatable element 811 in such a way that when the gas generator 817 is activated by a sensor 818 that may be separate as shown or formed integrally with the gas generator 817, or which is otherwise associated with the gas generator 817, and which responds to a crash condition requiring deployment of the inflatable element 811 to activate the gas generator 817, gas is supplied to the cells 822. Thus, as the inflatable element 811 inflates, the cells 822 inflate in a downward direction until the inflatable element 811 extends across the windows in the doors 812,814 of the motor vehicle (see FIG. 9). As the inflatable element 811 inflates, the length of the lower edge thereof decreases by as much as 30% as a consequence of the inflation of the cells 822. This reduction in the length of the lower edge ensures that the inflated element is retained in position as illustrated in FIG. 18 after it has been inflated.

As noted, the inflatable element 811 incorporates a plurality of parallel substantially vertical, substantially cylindrical cells 822. The inflatable element 811 may be made of interwoven sections of material such as film. Such a interweaving of material comprises a first layer that defines the front of the inflatable element 811, i.e., the part that is visible in FIGS. 17 and 18, and a second layer that defines the back part, i.e., the part that is adjacent the window in FIGS. 17 and 18, whereby selected parts of the first region and the second region are interwoven to define links in the form of lines where the front part and the back part of the inflatable element are secured together. A technique for making an inflatable element of inter-woven sections of material is described in more detail in International Patent Publication No. WO 90/09295.

Figure 19:
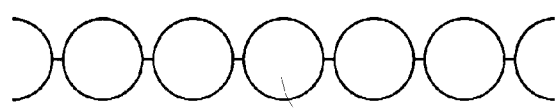
FIG. 19 is a sectional view of one form of safety device as shown in FIGS. 17 and 18 in a plane perpendicular to the vertical direction.

FIG. 19 is a cross section showing the nature of the cells 822 of the inflated element 811 of FIGS. 17 and 18. It can be seen that the cells 822 are immediately adjacent to each other and are only separated by narrow regions where the section of material, e.g., film, forming the front part of the inflated element has been woven with the section of material forming the back part of the inflated element.

Also, as noted throughout this application, inflatable element 811 may have any of the disclosed air bag constructions. For example, inflatable element 811 may comprise one or more sheets of film and the tear propagation arresting means or a net may be provided to tension or constrict the deployment of the inflatable element 811.

There has thus been shown and described an air bag system with a self-limiting and self-shaping air bag which fulfills all the objects and advantages sought after. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims. For example, the present invention describes numerous different air bag constructions as well as different methods for fabricating air bags. It is within the scope of the invention that all of the disclosed air bags can, for the most part, be made by any of the methods disclosed herein. Thus, in one typical process for constructing a film air bag having at least two compartments, either isolated from one another, within one another or in flow communication with each other, at least one flat panel of film air bag material is provided and then manipulated, processed or worked to form the different compartments. More particularly, the flat panel is joined at appropriate locations to form the different compartments, e.g., by heat sealing or an adhesive. The compartments may be any shape disclosed herein, e.g., tubular-shaped.

Further, there has been shown and described an air bag system with a film air bag utilizing a film material which comprises at least one layer of a thermoplastic elastomer film material which fulfills all the objects and advantages sought after. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims. For example, the present invention describes numerous different air bag constructions as well as different methods for fabricating air bags and different applications of the resulting air bags. It is within the scope of the invention that all of the disclosed air bags can, for the most part, be made by any of the methods disclosed herein. Thus, in one typical process for constructing a film air bag having at least two compartments, either isolated from one another, within one another or in flow communication with each other, at least one flat panel of film air bag material is provided and then manipulated, processed or worked to form the different compartments. More particularly, the flat panel is joined at appropriate locations to form the different compartments, e.g., by heat sealing or an adhesive. The compartments may be any shape disclosed herein, e.g., tubular-shaped.

With respect to the construction of the air bag as shown in FIGS. 3C and 3D, another method of obtaining the air bag with a variable thickness is to provide an initial, substantially uniformly thick film substrate (inelastic film) and thereafter applying a coating (a thermoplastic elastomer) thereon in predetermined locations on the substrate, preferably in an organized predetermined pattern, such that it is possible to obtain thicker portions in comparison to other uncoated portions. In this manner, the film air bag can be provided with distinct thicknesses at different locations, e.g., thicker portions which constitute rings and ribs (i.e., the polar symmetric pattern of FIG. 3C), or only at specific locations where it is determined that higher stresses arise during deployment for which reinforcements by means of the thicker film is desired. An alternative fabrication method would be to produce the air bag from thermoplastic elastomeric material with an initial varying thickness as well as a layer of inelastic film to provide the air bag with the desired shape. In this regard, plastic-manufacturing equipment currently exists to generate a plastic sheet with a variable thickness. Such equipment could be operated to provide an air bag having thicker portions arranged in rings and ribs as shown in FIG. 3C.

Lastly, the limiting net described above may be used to limit the deployment of any and all of the air bags described herein, including embodiments wherein there is only a single air bag.

What is claimed is:

1. In a vehicle, a side curtain air bag system comprising:
a side air bag arranged to deploy at least along an entire side of the vehicle, said air bag comprising at least one sheet of film and tear propagation arresting means arranged in connection with said at least one sheet of film for arresting the propagation of a tear in said at least one sheet of film; and
an inflator for inflating said side air bag with an inflating fluid,
said side airbag comprising a plurality of sections of material, said sections of material being joined to one another to form a plurality of substantially straight, interconnected compartments receivable of the inflating fluid.

2. The vehicle of claim 1, wherein said tear propagation arresting means comprise a thermoplastic elastomeric material arranged on said film sheet.

3. The vehicle of claim 1, wherein the vehicle has a ceiling, further comprising a housing mounted in the ceiling for housing said side air bag.

4. The vehicle of claim 1, wherein at least two of said sections of material are at least partially in opposed relationship to one another, said at least two sections of material being joined to one another at locations other than at a periphery of any of said at least two sections of material to form the interconnected compartments between said at least two sections of material.

5. The vehicle of claim 1, further comprising an adhesive for joining said sections of material to one another.

6. The vehicle of claim 1, wherein said sections of material are joined to one another along parallel lines to thereby form the substantially straight interconnected compartments, the interconnected compartments being adjacent to one another.

7. The vehicle of claim 1, wherein said sections of material are each formed from a discrete sheet of material.

8. A lateral impact protective device for a front vehicle occupant and a rear vehicle occupant in a vehicle, the vehicle having side windows with a bottom part, said lateral impact protective device comprising:
an elongated air bag which is convertible from a folded state to an inflated state, said air bag having two opposite lateral ends and being adapted to extend, in the inflated state, from sidewards of the front vehicle occupant as far as sidewards of the rear vehicle occupant;
said air bag extending, in the inflated state thereof, as far as the bottom part of the side windows,
said air bag, in the inflated state thereof, tapering towards its lower end.

9. The lateral impact protective device of claim 8, wherein said air bag comprises at least one sheet of film.

10. The lateral impact protective device of claim 8, wherein said air bag comprises a plurality of sections of material, said sections of material being joined to one another to form a plurality of substantially straight, interconnected compartments receivable of a gas.

11. The lateral impact protective device of claim 10, wherein at least two of said sections of material are at least partially in opposed relationship to one another, said at least two sections of material being joined to one another at locations other than at a periphery of any of said at least two sections of material to form the interconnected compartments between said at least two sections of material.

12. The lateral impact protective device of claim 10, wherein said sections of material are joined to one another along parallel lines to thereby form the substantially straight interconnected compartments, the interconnected compartments being adjacent to one another.

13. The lateral impact protective device of claim 10, wherein said sections of material are each formed from a discrete sheet of material.

14. A lateral impact protective device for a front vehicle occupant and a rear vehicle occupant in a vehicle, the vehicle having side windows with a bottom part, said lateral impact protective device, comprising:
    an elongated air bag which is convertible from a folded state to an inflated state, said air bag having two opposite lateral ends and being adapted to extend, in the inflated state, from sidewards of the front vehicle occupant as far as sidewards of the rear vehicle occupant:
    said air bag extending, in the inflated state thereof, as far as the bottom part of the side windows,
    said air bag comprising at least one sheet of film and tear propagation arresting means arranged in connection with said at least one sheet of film for arresting the propagation of a tear in said at least one sheet of film.

15. The lateral impact protective device of claim 14, wherein said air bag is housed in a ceiling of a passenger compartment of the vehicle.

16. A safety device for a motor vehicle having a door, comprising:
    an inflatable element having a non-inflated mode and an inflated mode and adapted to be positioned adjacent the door in the inflated mode;
    an inflator for supplying gas for inflating said inflatable element; and
    a sensor operatively coupled to said inflator for sensing a crash condition requiring deployment of said inflatable element and activating said inflator to supply gas for inflating said inflatable element upon sensing such a crash condition;
    said inflatable element comprising a plurality of sections of material, said section of material being joined to one another to form a plurality of compartments receivable of the gas from said inflator,
    said inflatable element being arranged to deploy at least along an entire side of the vehicle,
    said inflatable element comprising at least one sheet of film and tear propagation arresting means arranged in connection with said at least one sheet of film for arresting the propagation of a tear in said at least one sheet of film.

17. The device of claim 16, wherein said inflatable element is housed in a ceiling of the passenger compartment of the vehicle.

18. The device of claim 16, wherein at least two of said sections of material are at least partially in opposed relationship to one another, said at least two sections of material being joined to one another at locations other than at a periphery of any of said at least two sections of material to form the interconnected compartments between said at least two sections of material.

19. The device of claim 16, wherein said sections of material are joined to one another along parallel lines to thereby form the substantially straight interconnected compartments, the interconnected compartments being adjacent to one another.

20. The device of claim 16, wherein said sections of material are each formed from a discrete sheet of material.

21. The device of claim 16, wherein said compartments are configured to be in gas flow communication with one another.

22. The device of claim 16, further comprising means for constricting expansion of said air bag.

23. The device of claim 22, wherein said means for constricting expansion of said air bag comprise a network of interlaced material strips.

24. In a vehicle having a passenger compartment having a ceiling and front and rear doors, a safety device comprising:
    a gas generator;
    a sensor associated with said gas generator for sensing a crash condition and activating said gas generator upon sensing of the crash condition; and
    an inflatable element connected to said gas generator to be inflated by gas from said gas generator upon activation of said gas generator,
    said inflatable element comprising:
        a first layer to define a front part of said inflatable element;
        a second layer to define a back part of said inflatable element, with selected parts of said first layer and said second layer being interconnected to define points where said front part and said back part of said inflatable element are secured together forming elongated cells;
    said inflatable element being housing in the ceiling of the passenger compartment such that said inflatable element extends over both the front and rear doors, whereby, when inflated, said inflatable element is positioned adjacent the front and rear doors.

25. The vehicle of claim 24, wherein the selected parts of said first layer and said second layer are interconnected in a plurality of predetermined areas for defining a plurality of links, the elongated cells being defined between the links, each of said cells defining a longitudinal axis, the cells being positioned so that the longitudinal axes of said cells extend generally transversely to a lower edge of said inflatable element such that, upon inflation of said inflatable element with gas from said gas generator, the length of the lower edge of said inflatable element is reduced.

26. The vehicle of claim 25, wherein said inflatable element is made of interwoven film layers, said links being constituted by selected parts of said first layer and selected parts of said second layer, with the selected parts of said first layer and said second layer being interwoven.

27. The vehicle of claim 25, wherein the axes of said cells are substantially parallel.

28. The vehicle of claim 24, wherein said cells are configured to be in gas flow communication with one another.

29. The vehicle of claim 24, wherein said cells are immediately adjacent each other.

30. A safety device for a motor vehicle having a door frame and a door contained within the door frame, the safety device comprising:
    a gas generator;
    a sensor operatively connected to the gas generator for sensing a crash condition for activating the gas generator; and an inflatable element connected to the gas generator for being inflated with gas from said gas generator upon activation of said gas generator, said inflatable element thereby being adapted to be in a non-inflated mode and in an inflated mode and further being adapted to be positioned adjacent the door in the inflated mode thereof, said inflatable element comprising:

a first layer of material defining a front part thereof;

a second layer of material defining a back part thereof, selected parts of said first and second layers being interconnected for defining linear links where said first and second layers are directly secured together, said inflatable element thereby incorporating a plurality of substantially parallel elongated cells defined between said links, said cells being configured such that, upon inflation of said inflatable element with the gas from said gas generator, a lower edge portion of said inflatable element is tensioned; and said cells being configured to extend substantially from an upper edge portion of said inflatable element to a lower edge portion of said inflatable element.

31. The device of claim 30, wherein said inflatable element, in its non-inflated mode, is adapted to be stored in a housing in a ceiling of a passenger compartment of the vehicle.

32. The device of claim 30, wherein said first layer and said second layer are interconnected at the selected parts thereof by being interwoven with one another at the respective links.

33. The device of claim 30, wherein said cells are configured to be in gas flow communication with one another.

34. The device of claim 30, wherein said cells are immediately adjacent each other.

35. The device of claim 30, wherein said inflatable element, in its inflated mode, is adapted to extend past a B-post of the vehicle.

36. The device of claim 30, further comprising a tensioning element for applying tension to said inflatable element when said inflatable element is in its inflated mode.

37. The device of claim 36, wherein said tensioning element is a net arranged in connection with said inflatable element.

38. The device of claim 30, wherein said inflatable element is made up of only said parallel elongated cells.

39. The device of claim 30, wherein said cells extend from a front end of said inflatable element to a rear end of said inflatable element.

40. The device of claim 30, wherein at least one of said cells is configured to extend from an upper edge of said inflatable element to a lower edge of said inflatable element.

41. The device of claim 30, wherein all of said cells are configured to extend from an upper edge of said inflatable element to a lower edge of said inflatable element.

42. The device of claim 30, wherein at least one of said cells is vertically oriented.

43. The device of claim 30, wherein all of said cells are vertically oriented.

44. A safety device for a motor vehicle having a door frame and both a front door and a rear door contained within the door frame, the safety device comprising:

a gas generator;

a sensor operatively connected to the gas generator for sensing a crash condition for activating the gas generator; and an inflatable element connected to the gas generator for being inflated with gas from said gas generator upon activation of said gas generator, said inflatable element thereby being adapted to be in a non-inflated mode and in an inflated mode and further being adapted to be positioned adjacent both the front door and the rear door in the inflated mode thereof, the inflatable element comprising:

a first layer of material defining a front part thereof;

a second layer of material defining a back part thereof, selected parts of said first and second layers being interconnected for defining linear links where said first and second layers are directly secured together, said inflatable element thereby incorporating a plurality of substantially parallel elongated cells defined between said links, said cells being configured such that, upon inflation of said inflatable element with the gas from said gas generator, a lower edge portion of said inflatable element is tensioned; and said cells being configured to extend substantially from an upper edge portion of said inflatable element to a lower edge portion of said inflatable element.

45. The device of claim 44, wherein said inflatable element is made up of only said parallel elongated cells.

46. The device of claim 44, wherein said cells extend from a front end of said inflatable element to a rear end of said inflatable element.

47. The device of claim 44, wherein at least one of said cells is configured to extend from an upper edge of said inflatable element to a lower edge of said inflatable element.

48. The device of claim 44, wherein all of said cells are configured to extend from an upper edge of said inflatable element to a lower edge of said inflatable element.

49. The device of claim 44, wherein at least one of said cells is vertically oriented.

50. The device of claim 44, wherein all of said cells are vertically oriented.

51. A safety device for a motor vehicle having a door frame and a door contained within the door frame, the safety device comprising:

a gas generator;

a sensor operatively connected to the gas generator for sensing a crash condition for activating the gas generator; and an inflatable element connected to the gas generator for being inflated with gas from said gas generator upon activation of said gas generator, said inflatable element thereby being adapted to be in a non-inflated mode and in an inflated mode and further being adapted to be positioned adjacent the door in the inflated mode thereof, said inflatable element comprising:

a first layer of material defining a front part thereof;

a second layer of material defining a back part thereof, selected parts of said first and second layers being interconnected for defining linear links where said first and second layers are directly secured together, said inflatable element thereby incorporating a plurality of substantially parallel elongated cells defined between said links, said cells being configured such that, upon inflation of said inflatable element with the gas from said gas generator, a lower edge portion of said inflatable element is tensioned; and said cells being configured to extend substantially from an upper edge portion of said inflatable element to a lower edge portion of said inflatable element, said inflatable element, in its inflated mode, being adapted to extend past a B-post of the vehicle.

* * * * *